(12) United States Patent
Park

(10) Patent No.: US 11,558,083 B2
(45) Date of Patent: Jan. 17, 2023

(54) DEVICE AND METHOD FOR PERFORMING AUTHENTICATION IN WIRELESS POWER TRANSFER SYSTEM

(71) Applicant: LG ELECTRONICS INC., Seoul (KR)

(72) Inventor: Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/538,549

(22) Filed: Nov. 30, 2021

(65) Prior Publication Data

US 2022/0085668 A1    Mar. 17, 2022

Related U.S. Application Data

(63) Continuation of application No. 16/905,218, filed on Jun. 18, 2020, now Pat. No. 11,218,032, which is a continuation of application No. 16/406,762, filed on May 8, 2019, now Pat. No. 11,114,902.

(30) Foreign Application Priority Data

Mar. 23, 2018   (KR) ........................ 10-2018-0033872

(51) Int. Cl.
*H04B 5/00* (2006.01)
*H02J 50/80* (2016.01)
*H02J 50/10* (2016.01)
*H02J 50/12* (2016.01)
*H02J 50/40* (2016.01)

(52) U.S. Cl.
CPC ............ *H04B 5/0037* (2013.01); *H02J 50/10* (2016.02); *H02J 50/12* (2016.02); *H02J 50/80* (2016.02); *H04B 5/0075* (2013.01); *H02J 50/40* (2016.02)

(58) Field of Classification Search
CPC .. H02J 50/80; H02J 50/10; H02J 50/12; H02J 50/40; H04B 5/0037; H04B 5/0075
See application file for complete search history.

(56) References Cited

U.S. PATENT DOCUMENTS

| 11,101,845 B2 * | 8/2021 | Teggatz ................... H02J 7/007 |
| 2016/0233728 A1 | 8/2016 | Park et al. |
| 2017/0346301 A1 | 11/2017 | Kwon et al. |

* cited by examiner

*Primary Examiner* — Carlos Amaya
(74) *Attorney, Agent, or Firm* — Birch, Stewart, Kolasch & Birch, LLP

(57) ABSTRACT

A wireless power transmitter including a power converter configured to transfer a wireless power to a wireless power receiver; and a communicator/controller configured to control the wireless power. Further, the communicator/controller is further configured to transmit, to the wireless power receiver, a bit pattern requesting permission to communicate; receive, from the wireless power receiver, a response packet granting the permission in response to the bit pattern; and transmit, to the wireless power receiver in a power transfer phase in which the wireless power is transferred, an auxiliary data transport (ADT) data packet after receiving the response packet. In addition, a header of the ADT data packet is set to a value informing a retransmission of a previous ADT data packet, based on receiving a not acknowledge (NAK) in response to the previous ADT data packet from the wireless power receiver.

12 Claims, 80 Drawing Sheets

FIG. 10

| Preamble | ZERO | Response | Type | Info | Parity |

Response
'00' : no comms
'01' : comms error
'10' : NAK
'11' : ACK

Type
ZERO : slot sync
ONE : frame sync

Parity : odd

Response
Info (Type is ZERO)
'00' : allocated
'01' : locked
'10' : free
'11' : reserved Info (Type is ONE)
'00' : slotted
'01' : frees format
'10' : reserved
'11' : reserved

FIG. 12

|     | b7 | b6 | b5 | b4 | b3 | b2 | b1 | b0 |
|-----|----|----|----|----|----|----|----|----|
| B0  | Certificate Type ||||||||
| B1<br>B2 | Length: 0050 (= 80 Bytes) ||||||||
| B3<br>...<br>B8 | ID (manufacturer code or WPID) ||||||||
| B9<br>...<br>B15 | Reserved ||||||||
| B16<br>...<br>B47 | Public Key ||||||||
| B48<br>...<br>B79 | Signature ||||||||

FIG. 13A

|  | b7 | b6 | b5 | b4 | b3 | b2 | b1 | b0 |
|---|---|---|---|---|---|---|---|---|
| B0 | Certificate Type | | | | | | 1 (PTx) | 1 (Leaf) |
| B1 | Length: 0050 (= 80 Bytes) | | | | | | | |
| B2 ... B7 | ID (manufacturer code or WPID) | | | | | | | |
| B8 ... B11 | Reserved | | | | | | | |
| B12 ... B43 | Public Key | | | | | | | |
| B44 ... B107 | Signature | | | | | | | |

FIG. 13B

| | b7 | b6 | b5 | b4 | b3 | b2 | b1 | b0 |
|---|---|---|---|---|---|---|---|---|
| B0 | | Qi Authentication Certificate Structure Version | | | | | Certificate Type | |
| B1 | | Reserved | | | | PTx Leaf | | |
| B2 | Signature Offset | | | | | | | |
| B3 ... B6 | MSB Serial Number | | | | | | | |
| B7 ... B12 | Issuer ID | | | | | | | LSB |
| B13 ... B18 | Subject ID | | | | | | | |
| B19 ... B51 | Public Key | | | | | | | |
| B52 ... B115 | Signature | | | | | | | |

FIG. 14

|    | b7 | b6 | b5 | b4 | b3 | b2 | b1 | b0 |
|----|----|----|----|----|----|----|----|----|
| B0 | Power Class | | | Guaranteed Power Value | | | | |
| B1 | Reserved | | | Potential Power Value | | | | |
| B2 | Reserved | | | Auth | NFCPP | NFCD | WPID | Not Res Sens |

FIG. 15

|  | b7 | b6 | b5 | b4 | b3 | b2 | b1 | b0 |
|---|---|---|---|---|---|---|---|---|
| B0 | Power Class | | Guaranteed Power Value | | | | | |
| B1 | Reserved | | Potential Power Value | | | | | |
| B2 | AI | AR | Reserved | | | | WPID | Not Res Sens |

FIG. 16

| | b7 | b6 | b5 | b4 | b3 | b2 | b1 | b0 |
|---|---|---|---|---|---|---|---|---|
| B0 | Power Class | | Maximum Power Value | | | | | |
| B1 | Reserved | | | | | | | |
| B2 | Prop | Reserved | | | ZERO | Count | | |
| B3 | Window Size | | | | | Window Offset | | |
| B4 | Neg* | Polarity* | Depth* | | Auth | Reserved | | |

* Applicable to the FOD extensions only. Without FOD extension support, theses bits are Reserved.

FIG. 17

|    | b7 | b6 | b5 | b4 | b3 | b2 | b1 | b0 |
|----|----|----|----|----|----|----|----|----|
| B0 | Power Class | | Maximum Power Value | | | | | |
| B1 | AI | AR | Reserved | | | | | |
| B2 | Prop | | Reserved | | ZERO | | | |
| B3 | | | Window Size | | | Count | | |
| B4 | Neg* | Polarity* | Depth* | | | Window Offset | | Reserved |

FIG. 19

| b7 | b6 | b5 | b4 | b3 | b2 | b1 | b0 |
|----|----|----|----|----|----|----|----|
|    | Request (= Header of PTx's Digest Packet) |  |  |  |  |  |  |
| B0 |  |  |  |  |  |  |  |

FIG. 20

| b7 | b6 | b5 | b4 | b3 | b2 | b1 | b0 |
|----|----|----|----|----|----|----|----|
| Reserved | | | | | Slot number | | |
| B0 | | | | | | | |

FIG. 22

| | b7 | b6 | b5 | b4 | b3 | b2 | b1 | b0 |
|---|---|---|---|---|---|---|---|---|
| B0 | | | Offset[11..8] | | Offset [7..0] | | | |
| B1 | | | | | Length-1 | | | |

FIG. 25

| | b7 | b6 | b5 | b4 | b3 | b2 | b1 | b0 |
|---|---|---|---|---|---|---|---|---|
| B0 | | | | | Nonce [0] | | | |
| ... | | | | | ... | | | |
| B31 | | | | | Nonce [31] | | | |

FIG. 28

| | b7 | b6 | b5 | b4 | b3 | b2 | b1 | b0 |
|---|---|---|---|---|---|---|---|---|
| B0 | Reserved | | | | | Slot number | | |

FIG. 29

| | b7 | b6 | b5 | b4 | b3 | b2 | b1 | b0 |
|---|---|---|---|---|---|---|---|---|
| B0 | | | | Offset [7.0] | | | | |
| B1 | | | | Length-1 | | | | |

FIG. 31

| | b7 | b6 | b5 | b4 | b3 | b2 | b1 | b0 |
|---|---|---|---|---|---|---|---|---|
| B0 | | | | Nonce [0] | | | | |
| ... | | | | ... | | | | |
| B3 | | | | Nonce [3] | | | | |

FIG. 36

| Preamble | Header | Message | Checksum |

FIG. 40

| | b7 | b6 | b5 | b4 | b3 | b2 | b1 | b0 |
|---|---|---|---|---|---|---|---|---|
| B0 | | Reserved | | Stop | Control Error Value | | | |
| B1 | | | | | ACK/NACK | | | |

FIG. 41

| b7 | b6 | b5 | b4 | b3 | b2 | b1 | b0 |
|----|----|----|----|----|----|----|----|
| B0 | End Power Transfer Code ||||||||

FIG. 42

| | b7 | b6 | b5 | b4 | b3 | b2 | b1 | b0 |
|---|---|---|---|---|---|---|---|---|
| B0 | (MSB) | Reserved | | | Received Power Value | | Mode | |
| | | | | | | | | (LSB) |
| B1 | Reserved | | | | Stop | | ACK/NACK | |

FIG. 46

| b7 | b6 | b5 | b4 | b3 | b2 | b1 | b0 |
|----|----|----|----|----|----|----|----|
|    | Payload |  |  |  |  |  |  |
| B0 | ... | Bn |

FIG. 47

| b7 | b6 | b5 | b4 | b3 | b2 | b1 | b0 |
|----|----|----|----|----|----|----|----|
| B0 | ACK/NAK/RFA | | | | | | |

FIG. 48

| b7 | b6 | b5 | b4 | b3 | b2 | b1 | b0 |
|----|----|----|----|----|----|----|----|
| B0 | ACK/NAK/SOD/EOD | | | | | | |

FIG. 49

| b7 | b6 | b5 | b4 | b3 | b2 | b1 | b0 |
|----|----|----|----|----|----|----|----|
|    |    |    | Payload |  |    |    |    |
| B0 | ... | B n | | | | | |

FIG. 50

| b7 | b6 | b5 | b4 | b3 | b2 | b1 | b0 |
|----|----|----|----|----|----|----|----|
|    | ACK/NAK/RFA ||||||||
| B0 |   |   |   |   |   |   |   |

FIG. 51

| b7 | b6 | b5 | b4 | b3 | b2 | b1 | b0 |
|----|----|----|----|----|----|----|----|
|    |    |    |    ACK/RFA |    |    |    |    |
| B0 |    |    |    |    |    |    |    |

FIG. 52

| b7 | b6 | b5 | b4 | b3 | b2 | b1 | b0 |
|----|----|----|----|----|----|----|----|
|    | ACK/NAK/SOD/EOD |||||||
| B0 |    |    |    |    |    |    |    |

FIG. 78

| b7 | b6 | b5 | b4 | b3 | b2 | b1 | b0 |
|----|----|----|----|----|----|----|----|
|    |    |    |    Request |    |    |    |
| B0 |    |    |    |    |    |    |    |

DEVICE AND METHOD FOR PERFORMING AUTHENTICATION IN WIRELESS POWER TRANSFER SYSTEM

CROSS REFERENCE TO RELATED APPLICATIONS

This application is a Continuation of U.S. patent application Ser. No. 16/905,218, filed on Jun. 18, 2020, which is a Continuation of U.S. patent application Ser. No. 16/406,762 filed on May 8, 2019 (now U.S. Pat. No. 11,114,902, issued on Sep. 7, 2021), which claims the benefit under 35 U.S.C. § 119(a) to Korean Patent Application No. 10-2018-0033872, filed in the Republic of Korea on Mar. 23, 2018, all of these applications are hereby expressly incorporated by reference into the present application.

BACKGROUND OF THE INVENTION

Field of the Invention

The present invention relates to wireless power transfer, and more particularly, to a device and method for performing authentication in a wireless power transfer system.

Related Art

The wireless power transfer (or transmission) technology corresponds to a technology that can wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transmission system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

Wireless power systems implemented to follow specific standard technology may solve a safety problem when being overheated due to foreign objects. However, non-authenticated products that do not receive product authentication on technical standards or specifications have been distributed in the market, whereby users may be exposed at risk. Therefore, in a process before and after wireless charging, by enabling a wireless power transmitting device and a wireless power receiving device to perform mutual authentication on genuine products, it is necessary to secure stability and reliability.

SUMMARY OF THE INVENTION

The present invention provides a device and method for performing authentication in a wireless power transfer system.

The present invention further provides a wireless power transmitting device and method for performing authentication of a wireless power receiving device.

The present invention further provides a wireless power receiving device and method for performing authentication of a wireless power transmitting device.

In an aspect, there is provided a method of performing authentication of a target device in a wireless power transfer system. The method includes receiving a first packet including indication information on whether the target device supports an authentication function from the target device; transmitting, when the target device supports an authentication function, an authentication request message to the target device; receiving an authentication response message including a certificate on wireless charging from the target device in response to the authentication request message; and confirming authentication of the target device based on the authentication response message. Here, a format of the certificate may include a certificate type indicating that the certificate is which type of a root certificate, an intermediate certificate, and a leaf certificate and PTx and leaf indicating whether the certificate is a certificate on a wireless power transmitting device PTx and is a leaf certificate.

In another aspect, the target device may be a wireless power transmitting device, the first packet may be a capability packet of the wireless power transmitting device, and the indication information may be configured with 1 bit and may indicate support or non-support of an authentication function of the wireless power transfer device.

In another aspect, the target device may be a wireless power receiving device, the first packet may be a configuration packet of the wireless power receiving device, and the indication information may be configured with 1 bit and may indicate support or non-support of an authentication function of the wireless power receiving device.

In another aspect, the first packet may include at least one of first information on whether the target device may operate as an authentication initiator (AI) and second information on whether the target device may operate as an authentication responder (AR).

In another aspect, the authentication request message and the authentication response message may be transmitted based on an auxiliary data transport (ADT) data transaction protocol of a low level.

In another aspect, the authentication request message or the authentication response message may be sequentially divided and transmitted into a plurality of ADT data packets and whenever every new ADT data packet is transmitted, a header value may be toggled.

In another aspect, when transmission of the ADT data packet is failed, a header value may not be toggled upon retransmitting the ADT data packet.

In another aspect, in at least one of the receiving of a first packet, the transmitting of an authentication request message, and the receiving of an authentication response message, wireless charging may be performed with power according to a baseline power profile.

In another aspect, the plurality of ADT data packets may include a first ADT data packet indicating the start of data stream (SOD) and a second ADT data packet indicating the end of data stream (EOD) at the start and the end thereof, respectively, and the first and second ADT data packets may have an ADT control packet structure and may be configured with 1 byte.

In another aspect, the method may further include polling whether there is a message in which the wireless power transmitting device is to transmit, and the polling may include setting and transmitting, by the wireless power receiving device, a request field of 1 byte of general packet request (GRP) to a specific value to the wireless power transmitting device.

In another aspect, the method may further include transmitting, by the wireless power transmitting device, a request for communication (RFC) bit pattern in response to a received power packet (RPP) of the wireless power receiving device and transmitting, by the wireless power receiving device, a general request packet (GRP) in response to the RFC bit pattern to obtain target power of the wireless power transmitting device.

In another aspect, another ADT data packet instead of ACK may be used in response to successful reception of the ADT data packet.

In another aspect, there is provided a device that performs authentication of a target device in a wireless power transfer system. The device includes a communication unit that receives a first packet including indication information on whether the target device supports an authentication function from the target device and that transmits an authentication request message to the target device when the target device supports an authentication function and that receives an authentication response message including a certificate on wireless charging from the target device in response to the authentication request message and that confirms authentication of the target device based on the authentication response message and a coil that performs wireless charging based on magnetic coupling to the target device. Here, a format of the certificate may include a certificate type indicating that the certificate is which type of a root certificate, an intermediate certificate, and a leaf certificate and PTx and leaf indicating whether the certificate is a certificate on a wireless power transmitting device PTx and is a leaf certificate.

In one aspect, the target device may be a wireless power transmitting device, the first packet may be a capability packet of the wireless power transmitting device, and the indication information may be configured with 1 bit and may indicate support and non-support of an authentication function of the wireless power transmitting device.

In another aspect, the target device may be a wireless power receiving device, the first packet may be a configuration packet of the wireless power receiving device, and the indication information may be configured with 1 bit and may indicate support and non-support of an authentication function of the wireless power receiving device.

In another aspect, the first packet may include at least one of first information on whether the target device may operate as an authentication initiator (AI) and second information on whether the target device may operate as an authentication responder (AR).

In another aspect, the communication unit may transmit the authentication request message and the authentication response message based on an auxiliary data transport (ADT) data transaction protocol of a low level.

In another aspect, the communication unit may sequentially divide and transmit the authentication request message or the authentication response message into a plurality of ADT data packets and may toggle a header value whenever transmitting every new ADT data packet.

In another aspect, when transmission of the ADT data packet is failed, the communication unit may not toggle a header value when retransmitting the ADT data packet.

In another aspect, in at least one of the receiving of a first packet, the transmitting of an authentication request message, and the receiving of an authentication response message, the coil may perform wireless charging with power according to a baseline power profile.

BRIEF DESCRIPTION OF THE DRAWINGS

FIG. 10 is a structure of a sync pattern according to an exemplary embodiment of the present invention.

FIG. 12 is a block diagram illustrating a wireless charging certificate format according to an embodiment.

FIG. 13a is a block diagram illustrating a wireless charging certificate format according to another embodiment.

FIG. 13b is a block diagram illustrating a wireless charging certificate format according to another embodiment.

FIG. 14 illustrates a capability packet structure of a wireless power transmitting device according to an embodiment.

FIG. 15 illustrates a capability packet structure of a wireless power transmitting device according to another embodiment.

FIG. 16 illustrates a configuration packet structure of a wireless power receiving device according to an embodiment.

FIG. 17 illustrates a configuration packet structure of a wireless power receiving device according to another embodiment.

FIG. 19 illustrates an example of a message structure of GET_DIGESTS.

FIG. 20 illustrates another example of a message structure of GET_DIGESTS.

FIG. 22 illustrates an example of a message structure of GET_CERTIFICATE.

FIG. 25 illustrates an example of a CHALLENGE message structure.

FIG. 28 illustrates an example of a message structure of GET_DIGESTS transmitted by a wireless power transmitting device.

FIG. 29 illustrates an example of a GET_CERTIFICATE message structure transmitted by a wireless power transmitting device.

FIG. 31 illustrates an example of a CHALLENGE message structure transmitted by a wireless power transmitting device.

FIG. 36 illustrates a structure of a packet in which a wireless power receiving device transmits to a wireless power transmitting device in-band communication.

FIG. 40 illustrates a structure of an extended control error packet according to an embodiment.

FIG. 41 illustrates a structure of an end power transfer (EPT) packet according to an embodiment.

FIG. 42 illustrates a structure of an extended received power packet according to an embodiment.

FIG. 46 illustrates a structure of an ADT data packet (ADT_PRx data packet) on a wireless power receiving device according to an embodiment.

FIG. 47 illustrates a structure of an ADT response packet (ADT_PRx response packet) of a wireless power receiving device according to an embodiment.

FIG. 48 illustrates a structure of an ADT control packet (ADT_PRx control packet) of a wireless power receiving device according to an embodiment.

FIG. 49 illustrates a structure of an ADT data packet (ADT_PTx data packet) of a wireless power transmitting device according to an embodiment.

FIG. 50 illustrates a structure of an ADT response packet (ADT_PTx response packet) of a wireless power transmitting device according to an embodiment.

FIG. 51 illustrates a structure of an ADT response/control packet (ADT_PTx response/control packet) of a wireless power transmitting device according to an embodiment.

FIG. 52 illustrates a structure of an ADT control packet (ADT_PTx control packet) of a wireless power transmitting device according to an embodiment.

FIG. 78 illustrates a structure of a GRP according to an embodiment.

DESCRIPTION OF EXEMPLARY EMBODIMENTS

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
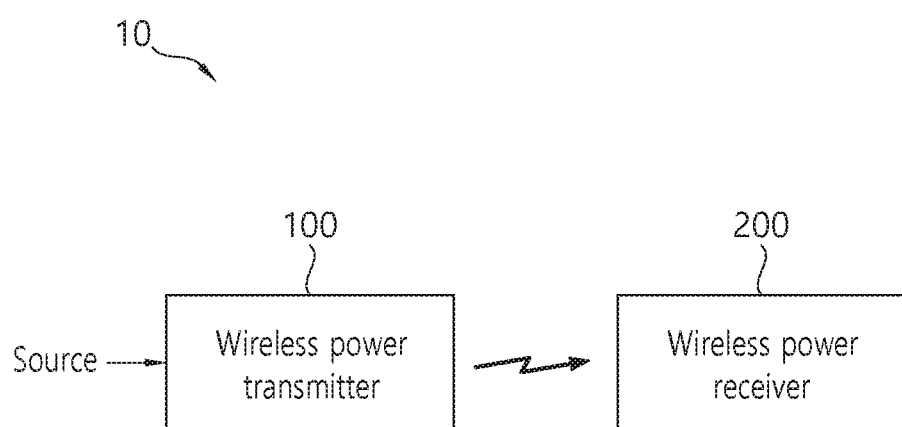
FIG. 1 is a block diagram of a wireless power system (10) according to an exemplary embodiment of the present invention.

FIG. 1 is a block diagram of a wireless power system (10) according to an exemplary embodiment of the present invention.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
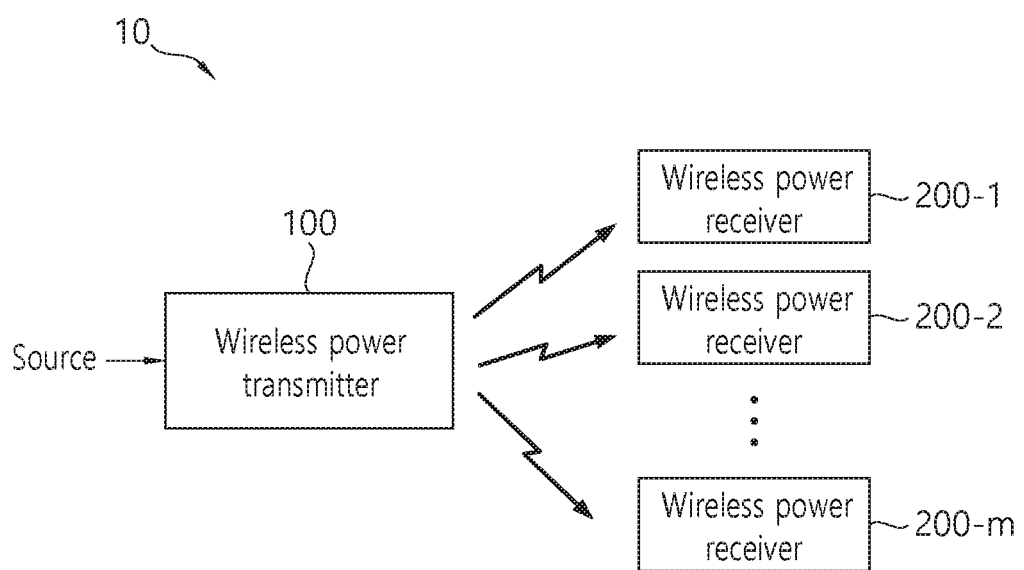
FIG. 2 is a block diagram of a wireless power system (10) according to another exemplary embodiment of the present invention.

In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3:
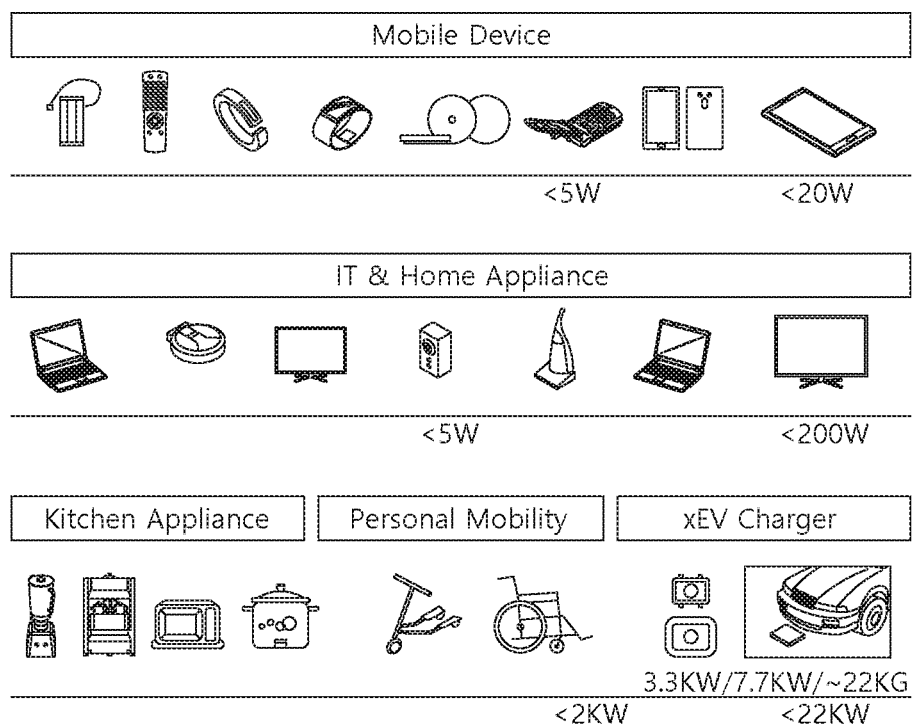
FIG. 3 shows an exemplary embodiment of diverse electronic devices adopting a wireless power transmission system.

FIG. 3 shows an exemplary embodiment of diverse electronic devices adopting a wireless power transmission system.

As shown in FIG. 3, the electronic devices included in the wireless power transmission system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present invention will be described based on a mobile device adopting the wireless power charging method, this is merely exemplary. And, therefore, it shall be understood that the wireless charging method according to the present invention may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC−1, PC0, PC1, and PC2, and the WPC may provide a standard document (or specification) for each power class (PC). The PC−1 standard relates to wireless power transmitters and receivers providing a guaranteed power of less than 5 W. The application of PC−1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OBB) communication that is used as an optional backup channel may also be used for PC0. The wireless power receiver may be identified by setting up an OOB flag, which indicates whether or not the OOB is supported, within a configuration packet. A wireless power transmitter supporting the OOB may enter an OOB handover phase by transmitting a bit-pattern for an OOB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OOB corresponds to a mandatory communication channel for PC1, and IB is used for initialization and link establishment to OOB. The wireless power transmitter may enter an OOB handover phase by transmitting a bit-pattern for an OOB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transmission/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transmission/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

The wireless power transmitter and the wireless power receiver may provide a highly convenient user experience and user experience (UX/UI). More specifically, a smart wireless charging service may be provided. The smart wireless charging service may be implemented based on the UX/UI of a smartphone including a wireless power transmitter. For such application, an interface between the processor and the wireless power receiver of the smartphone authorizes a "drop and play" two-way communication between the wireless power transmitter and the wireless power receiver.

For example, the user may experience a smart wireless charging service in a hotel. When the user enters his (or her) room and places his (or her) smartphone on a wireless charger, which is provided in the hotel room, the wireless charging device transmits wireless power to the smartphone, and the smartphone receives the transmitted wireless power. During this process, information related to the wireless charging service is transmitted to the smartphone. If the smartphone detects that it is being placed on a wireless charger, if the smartphone detects the reception of wireless power, or if the smartphone detects receives information related to a smart wireless charging service from the wireless charger, the smartphone enters a phase (or state) of inquiring an agreement (opt-in) to an additional feature. For this, the smartphone may display a message on a screen by using a method that includes an alarm tone or by using a method that does not include an alarm tone. An example of the message may include phrases, such as "Welcome to ###hotel. Select "Yes" to activate smart charging functions: Yes|No Thanks." The smartphone receives the user input selecting any one of Yes and No Thanks, and the next procedure that is selected by the user is performed. If Yes is selected, the smartphone transmits the corresponding information to the wireless charger. Thereafter, the smartphone and the wireless charger collectively perform the smart charging function.

The smart wireless charging service may also include receiving an automatic input Wi-Fi credentials. For example, the wireless charger transmits Wi-Fi credentials to the smartphone, and the smartphone executes a suitable application and automatically inputs the Wi-Fi credentials that are received from the wireless charger.

The smart wireless charging service may also include executing a hotel application providing hotel promotion information, performing remote controlled check-in/check-out, or acquiring contact information.

As another example, the user may experience a smart wireless charging service in a car. When the user gets in a car (or vehicle) and places his (or her) smartphone on a wireless charger, which is provided in the vehicle, the wireless charging device transmits wireless power to the smartphone, and the smartphone receives the transmitted wireless power. During this process, information related to the wireless charging service is transmitted to the smartphone. If the smartphone detects that it is being placed on a wireless charger, if the smartphone detects the reception of wireless power, or if the smartphone detects receives information related to a smart wireless charging service from the wireless charger, the smartphone enters a phase (or state) of inquiring the identity of the user.

In this state, the smartphone may be automatically connected to the vehicle via Wi-Fi or Bluetooth. Then, the smartphone may display a message on a screen by using a method that includes an alarm tone or by using a method that does not include an alarm tone. An example of the message may include phrases, such as "Welcome to your car. Select "Yes" to synch device with in-car controls: Yes|No Thanks." The smartphone receives the user input selecting any one of Yes and No Thanks, and the next procedure that is selected by the user is performed. If Yes is selected, the smartphone transmits the corresponding information to the wireless charger. Thereafter, by operating an application/display software within the vehicle, the smartphone and the wireless charger may collectively perform a smart control function within the vehicle. The user may enjoy listening to music as desired and may also confirm his (or her) regular map location. An application/display software within the vehicle may include a capability of providing synchronized access for pedestrians.

As yet another example, the user may experience a smart wireless charging service in his (or her) home. When the user enters his (or her) room at home and places his (or her) smartphone on a wireless charger, the wireless charging device transmits wireless power to the smartphone, and the smartphone receives the transmitted wireless power. During this process, information related to the wireless charging service is transmitted to the smartphone. If the smartphone detects that it is being placed on a wireless charger, if the smartphone detects the reception of wireless power, or if the smartphone detects receives information related to a smart wireless charging service from the wireless charger, the smartphone enters a phase (or state) of inquiring an agreement (opt-in) to an additional feature. For this, the smartphone may display a message on a screen by using a method that includes an alarm tone or by using a method that does not include an alarm tone. An example of the message may include phrases, such as "Hi xxx, Would you like to activate night mode and secure the building?: Yes|No Thanks." The smartphone receives the user input selecting any one of Yes and No Thanks, and the next procedure that is selected by the user is performed. If Yes is selected, the smartphone transmits the corresponding information to the wireless charger. Thereafter, the smartphone and the wireless charger at least acknowledges (or recognizes) a pattern of the user and may recommend the user to lock the doors and windows or to turn off the lights, or to set up an alarm.

According to the above-described exemplary embodiment of the present invention, in the wireless power transmitting method and wireless power transmitter, or in the wireless power receiving method and wireless power receiver, not all of the configuration elements or process steps are mandatory. And, therefore, all or part of the above-described configuration elements or process steps of the wireless power transmitting method and wireless power transmitter or the wireless power receiving method and wireless power receiver may be included and performed. Additionally, the exemplary embodiments of the wireless power transmitting method and wireless power transmitter or the wireless power receiving method and wireless power receiver may be performed and implemented by being combined with one another. Furthermore, each of the above-described configuration elements or process steps is not mandatorily required to be performed in accordance with the above-described order. And, therefore, it may be possible to perform a process step that was described later prior to a process step, which has been described above to precede the later process.

Hereinafter, 'profiles' will be newly defined based on indexes/reference standards representing/indicating the compatibility. More specifically, it may be understood that by maintaining compatibility between wireless power transmitters and receivers having the same 'profile', stable power transmission/reception may be performed, and that power transmission/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OOB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transmission only to the wireless power receiving corresponding to the same profile as the wireless power transmitter, thereby being capable of performing a more stable power transmission. Additionally, since the load (or burden) of the wireless power transmitter may be reduced and power transmission is not attempted to a wireless power receiver for which compatibility is not possible, the risk of damage in the wireless power receiver may be reduced.

PC1 of the 'Mobile' profile may be defined by being derived from an optional extension, such as OOB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4:
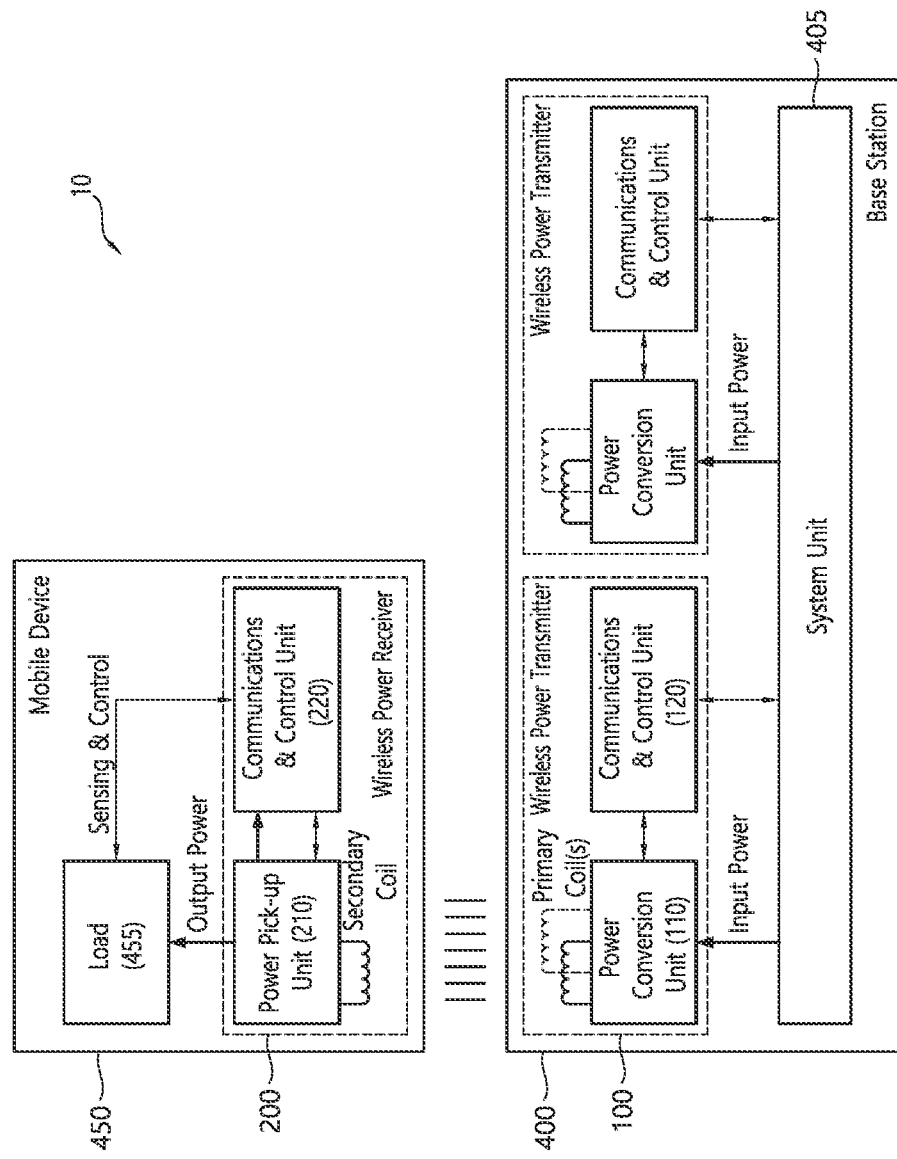
FIG. 4 is a block diagram of a wireless power transmission system according to another exemplary embodiment of the present invention.

FIG. 4 is a block diagram of a wireless power transmission system according to another exemplary embodiment of the present invention.

Referring to FIG. 4, the wireless power transmission system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a primary core, a primary winding, a primary loop antenna, and so on. Meanwhile, the secondary coil may also be referred to as a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OOB communication module.

The IB communication module may transmit and/or receive information by using a magnetic wave, which uses a specific frequency as its center frequency. For example, the communications & control unit (120) may perform in-band (IB) communication by loading information in the magnetic wave and by transmitting the information through the primary coil or by receiving a magnetic wave carrying information through the primary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OOB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operation point, the communications & control unit (120) may control the transmitted power. The operation point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OOB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OOB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that can execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Hereinafter, the coil or coil unit includes a coil and at least one device being approximate to the coil, and the coil or coil unit may also be referred to as a coil assembly, a coil cell, or a cell.

Figure 5:
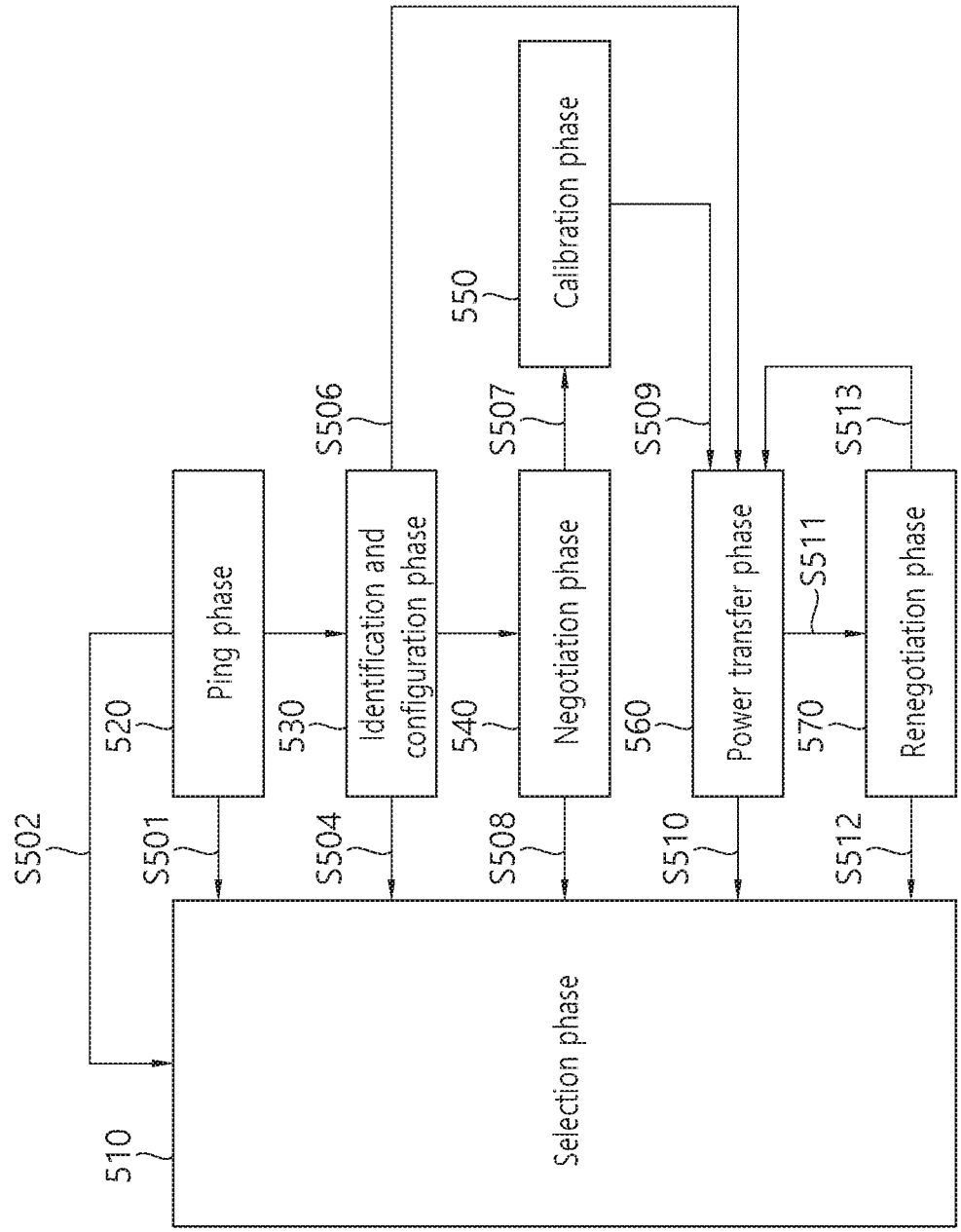
FIG. 5 is a state transition diagram for describing a wireless power transfer procedure.

FIG. 5 is a state transition diagram for describing a wireless power transfer procedure.

Referring to FIG. 5, the power transmission (or transfer) from the wireless power transmitter to the wireless power receiver according to an exemplary embodiment of the present invention may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)-reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having an extremely short pulse and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transmission coil and/or resonance capacitor). According to the exemplary embodiment of the present invention, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present invention, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present invention will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present invention will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present invention may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

The above-described power transfer contract may be configured based on the status and characteristic information of the wireless power transmitter and receiver. For example, the wireless power transmitter status information may include information on a maximum amount of transmittable power, information on a maximum number of receivers that can be accommodated, and so on. And, the receiver status information may include information on the required power, and so on.

Figure 6:
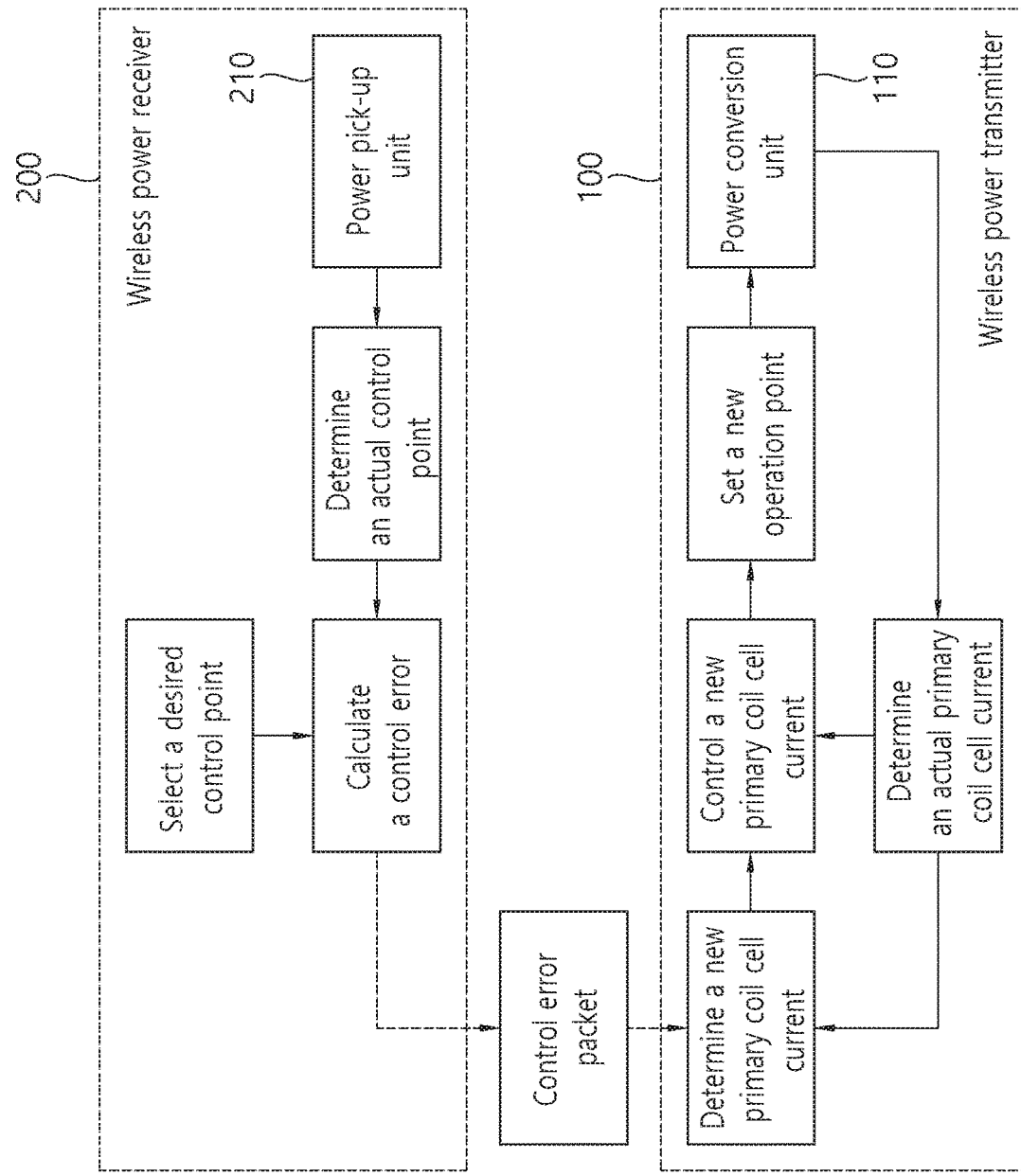
FIG. 6 shows a power control method according to an exemplary embodiment of the present invention.

FIG. 6 shows a power control method according to an exemplary embodiment of the present invention.

As shown in FIG. 6, in the power transfer phase (560), by alternating the power transmission and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operation point-amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present invention, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
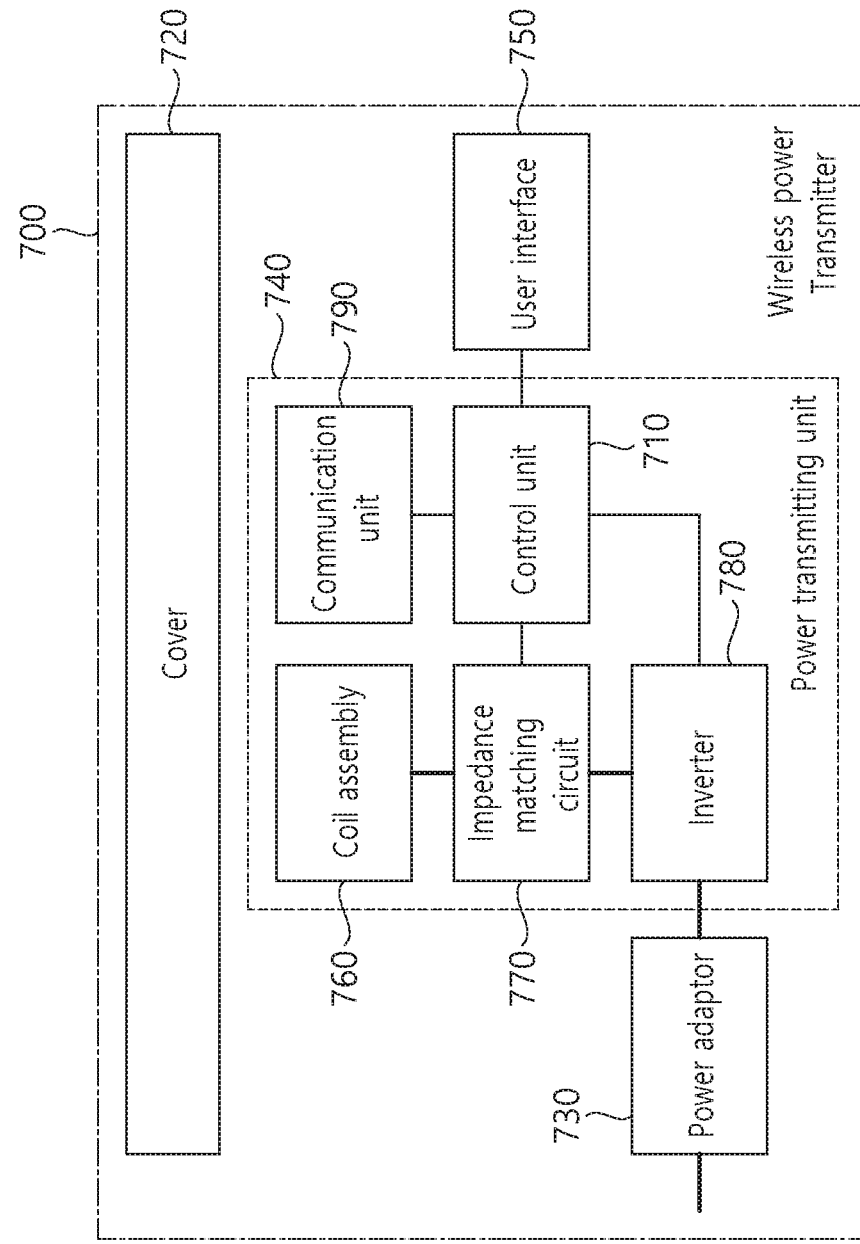
FIG. 7 is a block diagram of a wireless power transmitter according to another exemplary embodiment of the present invention.

FIG. 7 is a block diagram of a wireless power transmitter according to another exemplary embodiment of the present invention. This may belong to a wireless power transmission system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data can be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operation point. The operation point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
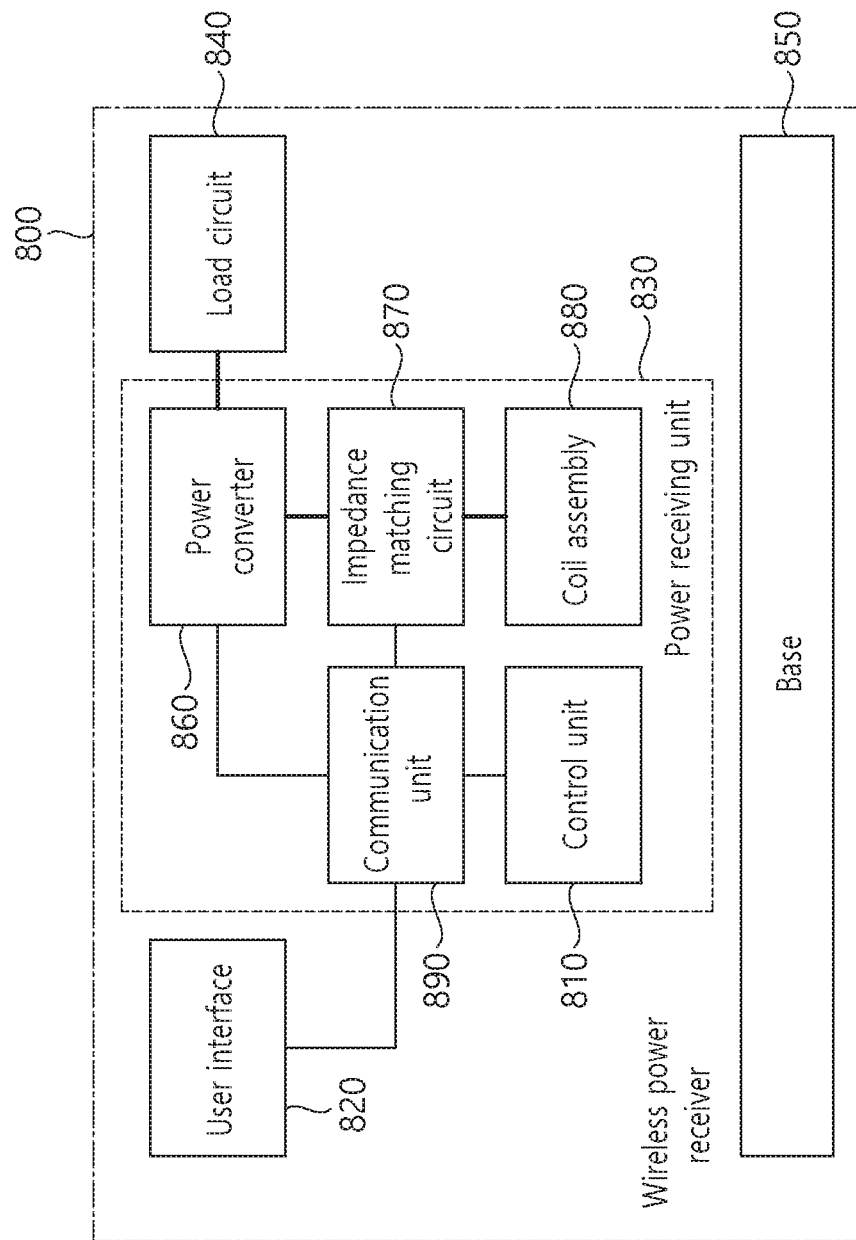
FIG. 8 shows a wireless power receiver according to another exemplary embodiment of the present invention.

FIG. 8 shows a wireless power receiver according to another exemplary embodiment of the present invention. This may belong to a wireless power transmission system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which can reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operation point and a desired operation point of the power receiver (830). Thereafter, by performing a request for adjusting the reflected impedance of the power transmitter and/or for adjusting an operation point of the power transmitter, the difference between the actual operation point and the desired operation point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
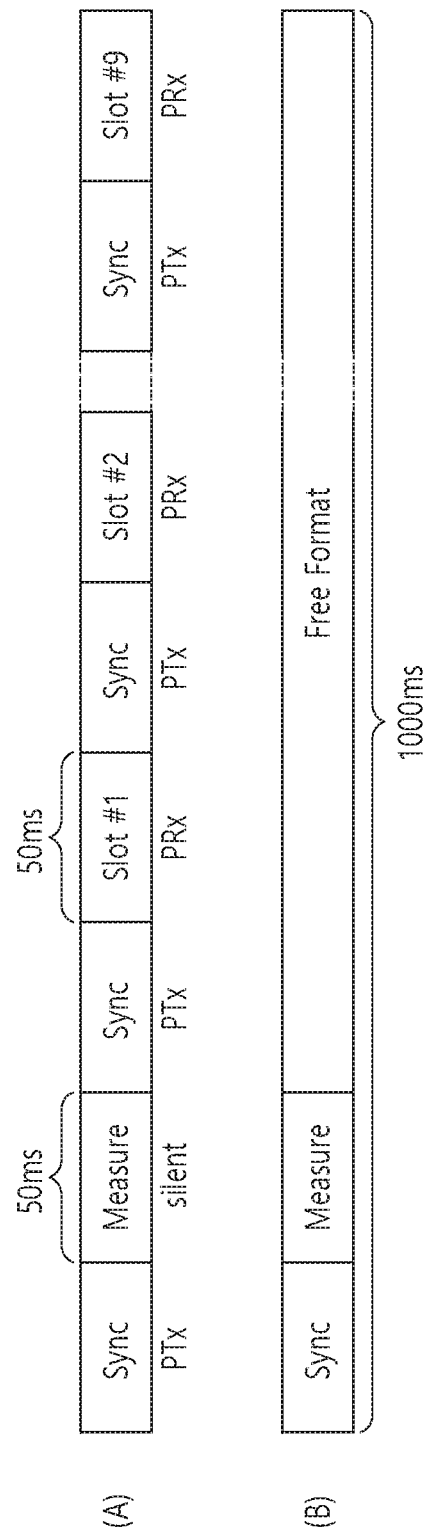
FIG. 9 shows a communication frame structure according to an exemplary embodiment of the present invention.

FIG. 9 shows a communication frame structure according to an exemplary embodiment of the present invention. This may correspond to a communication frame structure in a shared mode.

Referring to FIG. 9, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a message frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 10 is a structure of a sync pattern according to an exemplary embodiment of the present invention.

Referring to FIG. 10, the sync pattern may be configured of a preamble, a start bit, a response field, a type field, an info field, and a parity bit. In FIG. 10, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern can be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10—not acknowledge (NAK)). And, in case the wireless power transmitter has confirmed the data packet, the response field may have a value of "11" (11—acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '01', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that can be freely used by a random wireless power receiver, the information field is given a value of '10'.

Figure 11:
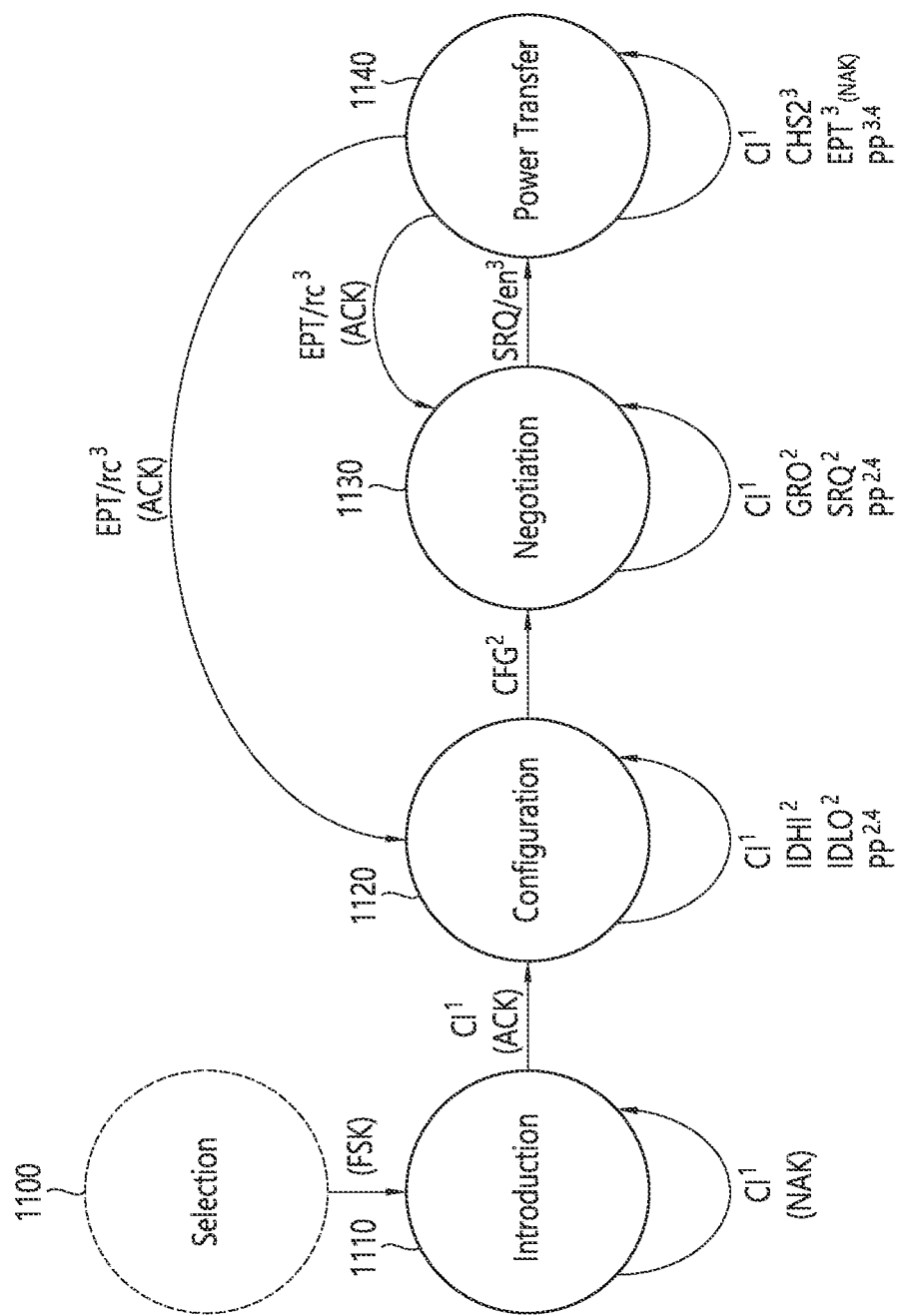
FIG. 11 shows operation statuses of a wireless power transmitter and a wireless power receiver in a shared mode according to an exemplary embodiment of the present invention.

FIG. 11 shows operation statuses of a wireless power transmitter and a wireless power receiver in a shared mode according to an exemplary embodiment of the present invention.

Referring to FIG. 11, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the exemplary embodiment of the present invention may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power transmitter enters the configuration phase. If the wireless power transmitter transmits a NACK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

Hereinafter, authentication between a wireless power transmitting device and a wireless power receiving device will be described. When the wireless power transmitting device and the wireless power receiving device are implemented by the same predefined power transfer interface and communication interface, the wireless power transmitting device and the wireless power receiving device may be compatible, and power transfer may be performed normally. Even if the wireless power transmitting device and receiving device are not made by the same manufacturer, when the wireless power transmitting device and receiving device are produced by the same technical standard or specification, the wireless power transmitting device and receiving device may be compatible with each other. However, even if the wireless power transmitting device and receiving device follow the same technical standard, each manufacturer has a different implementation quality, and when manufacturers do not follow faithfully and accurately the standard, wireless charging of the wireless power transmitting device and receiving device is not smoothly performed. In particular, in a product having a problem in foreign object detection (FOD) and overheating protection function, there is a risk of a safety accident such as explosion. Therefore, a standardization organization operating technical standards provides a service that tests whether a wireless power transmitting device or a wireless power receiving device of each manufacturer accurately complies standard technology and whether device interoperability is kept and a genuine product authentication service through an authorized authentication organization.

Nevertheless, because it is actually difficult to fundamentally block that non-authorized products are circulated in the market, in a process before and after wireless charging, by performing mutual authentication on whether wireless power transmitting devices and wireless power receiving devices already circulated in the market are genuine products, it is necessary to ensure stability and reliability. That is, when it is a pre-authentication procedure that an authorized authentication organization grants genuine product authentication before product launch, but it may be referred to as a post-authentication procedure to perform an authentication procedure between products in an operation of wireless charging after product launch. For example, mutual authentication between products may be performed through an in-band communication channel and may be compatible with USB-C authentication. When authentication is failed, the wireless power receiving device may warn a user to perform charging in a low power mode or remove a power signal.

In the present specification, Qi standard of WPC as standard technology is exemplified, but the technical scope of the present invention includes an embodiment of authentication based on other standards as well as Qi standard.

When introducing USB-C authentication in a wireless power transfer system using in-band communication, a capability index of the following table is derived. That is, USB-C may be a model for wireless charging authentication.

TABLE 3

| Type of authentication | Authentication of PTx by PRx | Authentication of PRx by PTx |
|---|---|---|
| Full authentication | 176,607.5 msec (~2.9 min) | 26,922.5 msec (~27 sec) |
| Quick authentication | 18,564.5 msec (~18 sec) | 5,842.5 msec (~6 sec) |

In Table 3, PRx means a wireless power receiving device, and PTx means a wireless power transmitting device. Authentication includes authentication of the wireless power transmitting device by the wireless power receiving device and authentication of the wireless power receiving device by the wireless power transmitting device.

When authenticating the wireless power transmitting device using full authentication, a long time of maximum about 3 minutes may be consumed, and this is because a large size of a USB-C certificate and a communication protocol of a low bit rate in which the wireless power transfer system employs. In particular, a situation in which such full authentication occurs every time in a public venue in which the user frequently changes a wireless charging spot may give inconvenience to the user. Therefore, it is necessary to compactly or simply define a size of a chain or a packet related to authentication. It is preferable to maintain a security level (ECDSA with SHA256) of 128 bits in USB-C authentication while maintaining a full authentication time to a reasonable time (within 60 seconds). A time required for authentication may be increased because of repeated transmission of data due to a traffic error.

Hereinafter, specific embodiments of a certificate, an authentication procedure, an authentication message, and a communication protocol of a lower level that executes an authentication procedure used for authentication of standard technology will be disclosed. Communication, protocols, messages, and packets related to all authentication described hereinafter may be generated, handled, stored, transmitted, and processed by communication and control units 220 and 120 and communication units 790 and 890 described in the present specification.

1. Wireless Charging Certificate

In terms of a chain level of the certificate, a level of a certificate chain may be limited. For example, the level of the certificate chain may be 3. Even when a minimum chain level is operated, manufacturers may issue certificates for products thereof, and a burden of the manufacturers and a certificate authority (CA) may also be reduced. The certificate chain is a series of two or more certificates, and each certificate is signed by a preceding certificate in the chain.

In terms of a certificate type, it may be defined that two types of certificates are transmitted between the wireless power transmitting device and receiving device. Here, two types of certificates may include an intermediate certificate and a leaf certificate. A root certificate is the same to both that support mutual authentication. The root certificate is a first certificate in the certificate chain and is self-signed. The leaf certificate is a final certificate in the certificate chain, and the intermediate certificate is neither a root certificate nor a leaf certificate in the certificate chain.

In terms of the certificate format, the format of the certificate may be defined to a reduced or simplified format. Here, the "reduced" or "simplified" format may mean a reduced or simplified format for wireless charging, compared with a certificate format (X509v3 format) of USB-C. For example, the simplified certificate format for the intermediate certificate and the leaf certificate may be smaller than 100 bytes (e.g., 80 bytes). In this case, the root certificate may still follow a certificate format of USB-C. Hereinafter, the simplified certificate format may be referred to as a wireless charging certificate format or a Qi certificate format. Because a wireless power transfer system that supports out-of-band (OOB) communication, as in PC1 may use a wider bandwidth, a wireless charging certificate according to a USB-C format may be provided.

FIG. 12 is a block diagram illustrating a wireless charging certificate format according to an embodiment.

Referring to FIG. 12, the wireless charging certificate format includes a certificate type, a certificate length, identification information (ID), a reserved bit (reserved), a public key, and a signature.

The certificate type is configured with, for example, 1 byte, may represent that the corresponding certificate is any one of a root certificate/intermediate certificate/leaf certificate, represent that the certificate is a certificate of the wireless power transmitting device or a certificate of the wireless power receiving device, and represent all of two information. For example, when bit strings b0 to b3 of the certificate type are '0000'b, it may represent that the certificate is an intermediate certificate, and when bit strings b0 to b3 of the certificate type are '0001'b, it may represent that the certificate is a leaf certificate. When bit strings b7 to b4 of the certificate type are '0001'b, it may represent that the certificate is a certificate of the wireless power transmitting device, and when bit strings b7 to b4 of the certificate type are '0000'b, it may represent that the certificate is a certificate of the wireless power receiving device. Therefore, when the bit string of the certificate type becomes a particular value, the corresponding certificate is a certificate of the wireless power transmitting device and may be a leaf certificate.

The certificate length is configured with, for example, 2 bytes and may be indicated in a byte unit.

The ID is configured with, for example, 6 bytes and may indicate a manufacturer code of the wireless power transmitting device or a manufacturer code of the wireless power receiving device or may represent wireless power ID (WPID).

The reserved may be configured with, for example, 7 bytes. The public key may be configured with, for example, 32 bytes. The signature may be configured with, for example, 32 bytes or 64 bytes.

When authentication is performed with in-band communication based on the wireless charging certificate format of FIG. 12, mutual full authentication may be completed within a minute, as shown in Table 4.

TABLE 4

| Type of authentication | Authentication of PTx by PRx | Authentication of PRx by PTx |
|---|---|---|
| Full authentication | 34,830 msec (~35 sec) | 8,002.5 msec (~8 sec) |
| Quick authentication | 18,564.5 msec (~18 sec) | 5,842.5 msec (~6 sec) |

FIG. 12 exemplifies a case where a size of the certificate format is 80 bytes, but this is merely an illustration and embodiments in which each field is defined to different bit numbers are apparent to those skilled in the art and correspond to the technical scope of the present invention.

FIG. 13a is a block diagram illustrating a wireless charging certificate format according to another embodiment.

Referring to FIG. 13a, the wireless charging certificate format includes a certificate type, PTx and leaf indicator (PTx and leaf), a certificate length, identification information (ID), a reserved, a public key, and a signature.

In the wireless charging certificate format of FIG. 13a, PTx and leaf are separated from the certificate type to be allocated to a bit different from that of the certificate type within the same byte B0.

The certificate type is configured with, for example, 6 bits, may represent that the corresponding certificate is any one of a root certificate/intermediate certificate/leaf certificate, represent a certificate of the wireless power transmitting device or a certificate of the wireless power receiving device, and represent all of two information.

The PTx and leaf indicate whether the corresponding certificate is a certificate of the wireless power transmitting device and is a leaf certificate. That is, the PTx and leaf may indicate whether the corresponding certificate is a leaf certificate of the wireless power transmitting device.

The PTx and leaf may be configured with, for example, 2 bits and may be configured in a form including a PTx indicator of 1 bit and a leaf indicator of 1 bit. In this case, the PTx indicator indicates 1 when the corresponding certificate is a certificate of the wireless power transmitting device and indicates 0 when the corresponding certificate is a certificate of the wireless power receiving device. Further, the leaf indicator is configured with 1 bit, and when the corresponding certificate is a leaf certificate, a value thereof may be set to 1 and when the corresponding certificate is not a leaf certificate, a value thereof may be set to 0. FIG. 13a represents that the corresponding certificate is a PTx leaf certificate because each bit is set to 1.

The PTx and leaf are included within the same byte B0 as that of the certificate type, are configured in a right next bit string of the certificate type, and are allocated to a bit different from that of the certificate type.

The certificate length is configured with, for example, 1 byte and may indicate a length of the corresponding certificate in a byte unit.

The identification information is configured with, for example, 6 bytes and may indicate a manufacturer code of the wireless power transmitting device or a PRx manufacturer code (PRMC) of the wireless power receiving device or may represent wireless power ID (WPID). Alternatively, when the certificate type is an intermediate certificate, identification information may represent a manufacturer code of the wireless power transmitting device or a manufacturer code of the wireless power receiving device, and when the certificate type is a leaf certificate, identification information may represent WPID.

The reserved may be configured with, for example, 4 bytes. The public key may be configured with, for example, 32 bytes. The signature may be configured with, for example, 64 bytes.

When authentication is performed with in-band communication based on the wireless charging certificate format of FIG. 13a, mutual full authentication may be completed within 60 seconds, as shown in Table 5.

TABLE 5

| Type of authentication | Authentication of PTx by PRx | Authentication of PRx by PTx |
|---|---|---|
| Full authentication | 39,782.5 msec (~40 sec) | 8,761.5 msec (~9 sec) |
| Quick authentication | 18,564.5 msec (~18 sec) | 5,842.5 msec (~6 sec) |

FIG. 13a exemplifies a case where a size of the certificate format is 108 bytes, but this is merely an illustration and embodiments in which each field is defined to different bit numbers are apparent to those skilled in the art and correspond to the technical scope of the present invention.

As commercial capability requirements, it is preferable that in the authentication procedure, authentication by an initiator of a responder in an environment using in-band communication is completed within 60 seconds. Further, in the authentication procedure, it is preferable to provide a mechanism for secure recognition of a previously authenticated responder within 20 seconds in an environment using in-band communication.

FIG. 13b is a block diagram illustrating a wireless charging certificate format according to another embodiment.

Referring to FIG. 13b, the wireless charging certificate format includes a wireless charging standard certificate structure version (Qi Authentication Certificate Structure Version), a reserved bit (reserved), a PTx and leaf indicator (PTx leaf), a certificate type, a signature offset, a serial number, issuer ID, subject ID, a public key, and a signature.

In the wireless charging certificate format, the PTx and leaf indicator is separated from the certificate type to be allocated to a bit different from that of a certificate type within the same byte B0.

The PTx leaf indicates whether the corresponding certificate is a certificate of the wireless power transmitting device and is a leaf certificate. That is, the PTx leaf may indicate whether the corresponding certificate is a leaf certificate of the wireless power transmitting device.

The PTx leaf may be configured with 1 bit unlike that of FIG. 13a. If the PTx leaf is 0, it may indicate that the corresponding certificate is not a leaf certificate or is a leaf certificate of the wireless power receiving device. If the PTx leaf is 1, it may indicate that the corresponding certificate is a leaf certificate of the wireless power transmitting device.

The certificate type may be configured with, for example, 2 bits and may represent that the corresponding certificate is any one of a root certificates/intermediate certificate/leaf certificate and may represent all of a root certificates/intermediate certificate/leaf certificate.

2. Indication Information on Authentication Function Support

When any one of the wireless power transmitting device and the wireless power receiving device does not support an authentication function (e.g., already launched legacy products may not support a new authentication function), an authentication procedure therebetween cannot be performed. That is, in order to perform an authentication procedure, both the wireless power transmitting device and the wireless power receiving device need to support an authentication function. However, because an authentication function may be supported or may not be supported according to a version of the product and according to the manufacturer, a procedure of determining support of the authentication function and a message to be used for the procedure are required. Further, when only one device of the wireless power transmitting device and receiving device supports an authentication function and when the other device is a legacy product, backward compatibility for a minimum charge function should be satisfied. A device that does not support authentication according to a system policy should support 5 W (or minimum power of 5 W or less, i.e. 3 W).

The wireless power transmitting device may notify the wireless power receiving device using a capability packet whether an authentication function is supported (authentication of the wireless power transmitting device by the wireless power receiving device (authentication of PTx by PRx)). The wireless power receiving device may notify the wireless power transmitting device using a configuration packet whether an authentication function is supported (authentication of the wireless power receiving device by the wireless power transmitting device (authentication of PRx by PTx)). Hereinafter, a structure of indication information (capability packet and configuration packet) on whether an authentication function is supported will be described in detail.

FIG. 14 illustrates a capability packet structure of a wireless power transmitting device according to an embodiment.

Referring to FIG. 14, a capability packet in which a corresponding header value is 0X31 is configured with 3 bytes, and a first byte $B_0$ thereof includes a power class and a guaranteed power value, a second byte $B_1$ thereof includes reserved and a potential power value, and a third byte $B_2$ thereof includes reserved, Auth, NFCPP, NFCD, WPID, and Not Res Sens. Specifically, the Auth is configured with 1 bit and for example, when a value thereof is 0, it indicates that the wireless power transmitting device does not support an authentication function, and when a value thereof is 1, it indicates that the wireless power transmitting device supports an authentication function.

FIG. 15 illustrates a capability packet structure of a wireless power transmitting device according to another embodiment.

Referring to FIG. 15, a capability packet in which a corresponding header value is 0X31 is configured with 3 bytes, and a first byte $B_0$ thereof includes a power class and a guaranteed power value, a second byte $B_1$ thereof includes reserved and a potential power value, and a third byte $B_2$ thereof includes an authentication initiator (AI), an authentication responder (AR), reserved, WPID, and Not Res Sens. Specifically, the AI is configured with 1 bit and for example, when a value thereof is '1b', it indicates that the corresponding wireless power transmitting device operates as an authentication initiator. Further, the AR is configured with 1 bit and for example, when a value thereof is '1b', it indicates that the corresponding wireless power transmitting device operates as an AR.

FIG. 16 illustrates a configuration packet structure of the wireless power receiving device according to an embodiment.

Referring to FIG. 16, a configuration packet in which a corresponding header value is 0X51 is configured with 5 bytes, a first byte $B_0$ thereof includes a power class and a maximum power value, a second byte $B_1$ thereof includes reserved, a third byte $B_2$ thereof includes Prop, reserved, ZERO, and Count, a fourth byte $B_3$ thereof includes a window size and a window offset, and a fifth byte $B_4$ thereof includes Neg, polarity, depth, Auth, and reserved. Specifically, the Auth is configured with 1 bit, and for example, when a value thereof is 0, it indicates that the corresponding power receiving device does not support an authentication function, and when a value thereof is 1, it indicates that the wireless power receiving device supports an authentication function.

FIG. 17 illustrates a configuration packet structure of a wireless power receiving device according to another embodiment.

Referring to FIG. 17, a configuration packet in which a corresponding header value is 0X51 is configured with 5 bytes, a first byte $B_0$ thereof includes a power class and a maximum power value, a second byte $B_1$ thereof includes AI, AR, and reserved, a third byte $B_2$ thereof includes Prop, reserved, ZERO, and Count, a fourth byte $B_3$ thereof includes a window size and a window offset, and a fifth byte $B_4$ thereof includes Neg, polarity, depth, Auth, and reserved. Specifically, the AI is configured with 1 bit, and for example, when a value thereof is '1b', it indicates that the corresponding power receiving device operates as an AI. Further, the AR is configured with 1 bit, and for example, when a value thereof is '1b', it indicates that the wireless power receiving device operates as an AR.

3. Timing Between Authentication Related Procedures and Wireless Charging Phase

A procedure of determining whether the authentication function support and an authentication procedure may be performed over at least one or a plurality of phases of identification and configuration phases, a negotiation phase, a calibration phase, a power transfer phase, a renegotiation phase, and an introduction phase.

As an example, the authentication procedure may be performed in the negotiation phase. However, when quick authentication is performed in the negotiation phase, a process of reading and determining DIGESTS with in-band communication may take about 4 seconds. Therefore, in terms of user convenience, it may be considered to provide wireless charging with basic power even before authentication regardless of authentication rather than to start charging after authentication is complete. This is preferable in terms of backward compatibility for devices having no authentication function.

As another example, the authentication procedure may be performed over a negotiation phase and a power transfer phase. During the identification and configuration phase, a packet sequence is strictly controlled, and only one-way communication from the wireless power receiving device to the wireless power transmitting device is allowed, but during negotiation and power transfer phases, two-way communication is allowed. Therefore, in negotiation and power transfer phases in which two-way communication is allowed, an authentication procedure may be performed. In the negotiation phase, quick authentication is performed by the wireless power transmitting device or receiving device that exchanges {GET_DIGESTS, CHALLENGE} message. A power contract may be signed based on established trust. When the wireless power transmitting device and receiving device first meet by checking DIGESTS, in order to establish an initial power contract based on a system policy and to provide default low power to the wireless power receiving device as soon as possible, the wireless power transmitting device and receiving device enter the power transfer phase. During the power transfer phase, full authentication is performed by the wireless power transmitting device or receiving device that exchanges {GET_CERTIFICATE, CHALLENGE} message. When full authentication is completed successfully, the wireless power transmitting device and/or receiving device renew(s) a power contract.

As another example, the wireless power transmitting device and receiving device may perform an authentication procedure in the power transfer phase just after entering to the power transfer phase without authentication. When authentication is successful in the power transfer phase, the power contract may be renewed through the renegotiation phase or the wireless power transmitting device may support supportable target power or full power to a level in which the wireless power transmitting device/receiving device wants. Therefore, user convenience may be increased.

As another example, in the case of authentication (authentication of PTx by PRx) of the wireless power transmitting device by the wireless power receiving device, a procedure of determining whether the wireless power receiving device supports an authentication function of the wireless power transmitting device may be performed in the negotiation phase. In this case, before the negotiation phase, power transfer may be already in progress based on an initial power contract. In the negotiation phase, by transmitting a query packet and determining a response to the query packet, the wireless power receiving device may determine whether an authentication function of the wireless power transmitting device is supported according to the procedure. In an aspect, the query packet may be a general request packet (0x07), and in this case, when the wireless power receiving device transmits a general request packet to the wireless power transmitting device, the wireless power transmitting device transmits a capability packet including the auth of FIG. 14 or 15 as the response to the wireless power receiving device. In another aspect, the query packet may be a specific request packet (0x20), and in this case, when the wireless power receiving device transmits a specific request packet to the wireless power transmitting device, the wireless power transmitting device responds to ACK (when supporting an authentication function) or NACK (when not supporting an authentication function). In the negotiation phase, when it is determined that the wireless power transmitting device supports an authentication function, the wireless power receiving device may establish a power contract of 5 W or more with the wireless power transmitting device (PC0).

When the wireless power receiving device determines authentication function support of the wireless power transmitting device, the authentication procedure may be finally started. More specifically, after the wireless power receiving device reaches a normal or stable operation point that transmits a control error packet (CEP) in a period of about 250 ms, the wireless power receiving device may perform an authentication procedure with the wireless power transmitting device. During the power transfer phase, the authentication procedure may be used for renewing an existing power contract. That is, in order to increase a power level according to the existing power contract according to the result of the authentication procedure, the wireless power receiving device may renegotiate the contract power. In this case, by transmitting a renegotiation packet (0x09), the wireless power receiving device may renew the contract power according to a power management policy. For example, if the authentication procedure (with DIGEST) is successful, the wireless power receiving device may renew the contract power with increased power or may maintain a current power contract. If the authentication procedure is failed, the wireless power receiving device may renew the power contract with reduced power or may remove a power signal.

As another example, in the case of authentication of the wireless power receiving device (authentication of PRx by PTx) by the wireless power transmitting device, a procedure of determining whether the wireless power transmitting device supports an authentication function of the wireless power receiving device may be performed in an initialization phase. Here, the initialization phase may be a phase prior to a negotiation phase, for example, any one of a selection phase, a ping phase, and an identification and setting phase. In the initialization phase, in order to determine whether the wireless power receiving device supports an authentication function, the wireless power transmitting device receives a configuration packet including the auth of FIG. 16 or 17 from the wireless power receiving device.

When the wireless power transmitting device determines authentication function support of the wireless power receiving device, the authentication procedure may be initiated in the negotiation phase. In this case, an initial power contract is signed. More specifically, the wireless power transmitting device stands by reception of DIGESTS from the wireless power receiving device. When the wireless power transmitting device acknowledges that the wireless power receiving device has already authenticated, an authentication procedure is successful. When the wireless power transmitting device fails to acknowledge DIGESTS, the wireless power transmitting device continues the authentication procedure during the power transfer phase. According to a power management policy, the wireless power transmitting device establishes a power contract with the wireless power receiving device. In this case, the wireless power transmitting device may establish the contract power of 5 W or more with the wireless power receiving device (PC0), having passed through authentication as DIGESTS. During the power transfer phase, when the authentication procedure is completed, in order to increase a power level, the wireless power transmitting device may renegotiate the power contract.

In the power transfer phase, after the wireless power receiving device reaches a normal or stable operation point that transmits a CEP (0x03) in a period of about 250 ms, the wireless power transmitting device may perform an authentication procedure with the wireless power receiving device. During the power transfer phase, the authentication procedure may be used for renewing an existing power contract. That is, in order to increase a power level according to the existing power contract according to the result of the authentication procedure, the wireless power receiving device may renegotiate the contract power. In this case, by transmitting a renegotiation packet (0x09), the wireless power receiving device may renew the contract power according to a power management policy. For example, if the authentication procedure (with DIGEST) is successful, the wireless power receiving device may renew the contract power with increased power or may maintain a current power contract. However, if the authentication procedure is failed, the wireless power receiving device may renew the power contract with reduced power or may remove a power signal.

4. Authentication Procedures and Authentication Messages

Hereinafter, an authentication procedure and various messages used for the authentication procedure will be described.

A message used in the authentication procedure is referred to as an authentication message. The authentication message is used for carrying information related to authentication. There are two types of authentication messages. One message is an authentication request and the other message is an authentication response. The authentication request is transmitted by an authentication initiator, and the authentication response is transmitted by an authentication responder. Both the wireless power transmitting device and receiving device may be an authentication initiator and an authentication responder. For example, when the wireless power transmitting device is an authentication initiator, the wireless power receiving device becomes an authentication responder, and when the wireless power receiving device is an authentication initiator, the wireless power transmitting device becomes an authentication responder.

The authentication request message includes GET_DIGESTS (i.e. 4 bytes), GET_CERTIFICATE (i.e. 8 bytes), and CHALLENGE (i.e. 36 bytes).

The authentication response message includes DIGESTS (i.e. 4+32 bytes), CERTIFICATE (i.e. 4+certificate chain (3×512 bytes)=1540 bytes), CHALLENGE_AUTH (i.e. 168 bytes), and ERROR (i.e. 4 bytes).

The authentication message may be referred to as an authentication packet and may be referred to as authentication data and authentication control information. Further, messages such as GET_DIGEST and DIGESTS may be referred to as a GET_DIGEST packet and a DIGEST packet.

Hereinafter, a procedure in which the wireless power receiving device performs authentication of the wireless power transmitting device based on such authentication messages will be described.

(1) Authentication of the Wireless Power Transmitting Device by the Wireless Power Receiving Device (Authentication of PTx by PRx)

When authentication (authentication of PTx by PRx) of the wireless power transmitting device by the wireless power receiving device operates based on in-band communication, a required time for each step are represented in Table 6 or 7.

TABLE 6

| Authentication initiator = PRx | Authentication responder = PTx | Phases | Required time |
|---|---|---|---|
| GET_DIGESTS | | Negotiation phase | (4 + 3) × 11 × 0.5 = 38.5 msec |
| | DIGESTS | | (36 + 2) × 11 × 5 = 2,090 msec |
| GET_CERTIFICATE | | Power transmission phase | (8 + 3) × 11 × 0.5 = 60.5 msec |
| | CERTIFICATE | | (1) 515 × 4 × 11 × 5 = 113,300 msec = 1.8 min (for certificate) (2) 515 × (2B + 3) × 11 × 0.5 = 14,162.5 msec = 14 sec (for CE/ACK) |
| CHALLENGE | | | (36 + 3) × 11 × 0.5 = 214.5 msec |
| | CHALLENGE_AUTH | | (1) 57 × 4 × 11 × 5 = 12,540 msec (for challenge_auth) (2) 57 × (2B + 3) × 11 × 0.5 = 1,567.5 msec (for CE/ACK) |

Table 6 represents an example of a time required for each authentication message in the case where a power contract is made based on the results of GET_DIGESTS during the negotiation phase. When the wireless power receiving device already knows the DIGEST of the wireless power transmitting device, a transmitting/receiving step of GET_CERTIFICATE and CERTIFICATE may be omitted. Further, a power contract may be renewed in a renegotiation phase according to the authentication result.

TABLE 7

| Authentication initiator = PRx | Authentication responder = PTx | Phases | Required time |
|---|---|---|---|
| GET_DIGESTS | | Negotiation (or renegotiation) phase | (1 + 3) × 11 × 0.5 = 22 msec |
| | DIGESTS | | (32 + 2) × 11 × 5 = 1,870 msec |
| GET_CERTIFICATE [Offset: Length] | | Power transmission phase | (2 + 3) × 11 × 0.5 = 27.5 msec |

TABLE 7-continued

| Authentication initiator = PRx | Authentication responder = PTx | Phases | Required time |
|---|---|---|---|
| {CE/RPP if necessary} ... | CERTIFICATE ... | | (4 + 2) × 5 × 11 = 330 msec (for 4B reading) (1 + 3) × 11 × 0.5 = 22 msec + 30 msec = (for CE/delay/control time) = 55 msec 412. msec × (1536/4) = 158,208 msec = 2.6 min |
| | CHALLENGE | | (32 + 3) × 11 × 0.5 = 192.5 msec |
| GET_CHALLENGE_AUTH [Offset: Length] {CE/RPP if necessary} | CHALLENGE_AUTH ... | | 27.5 msec (for Get_challenge_auth) 330 msec (for 4B reading) 55 msec (for CE/delay/control time) 412 msec × (160/4) = 16,480 msec |

Table 7 represents another example of a time required for each authentication message in the case where a power contract is made based on the results of GET_DIGESTS during the negotiation phase. When the wireless power receiving device already knows DIGEST of the wireless power transmitting device, a transmitting/receiving step of GET_CERTIFICATE and CERTIFICATE may be omitted. Further, a power contract may be renewed in a renegotiation phase according to the authentication result. Hereinafter, an authentication procedure for satisfying the required time will be described.

Figure 18:
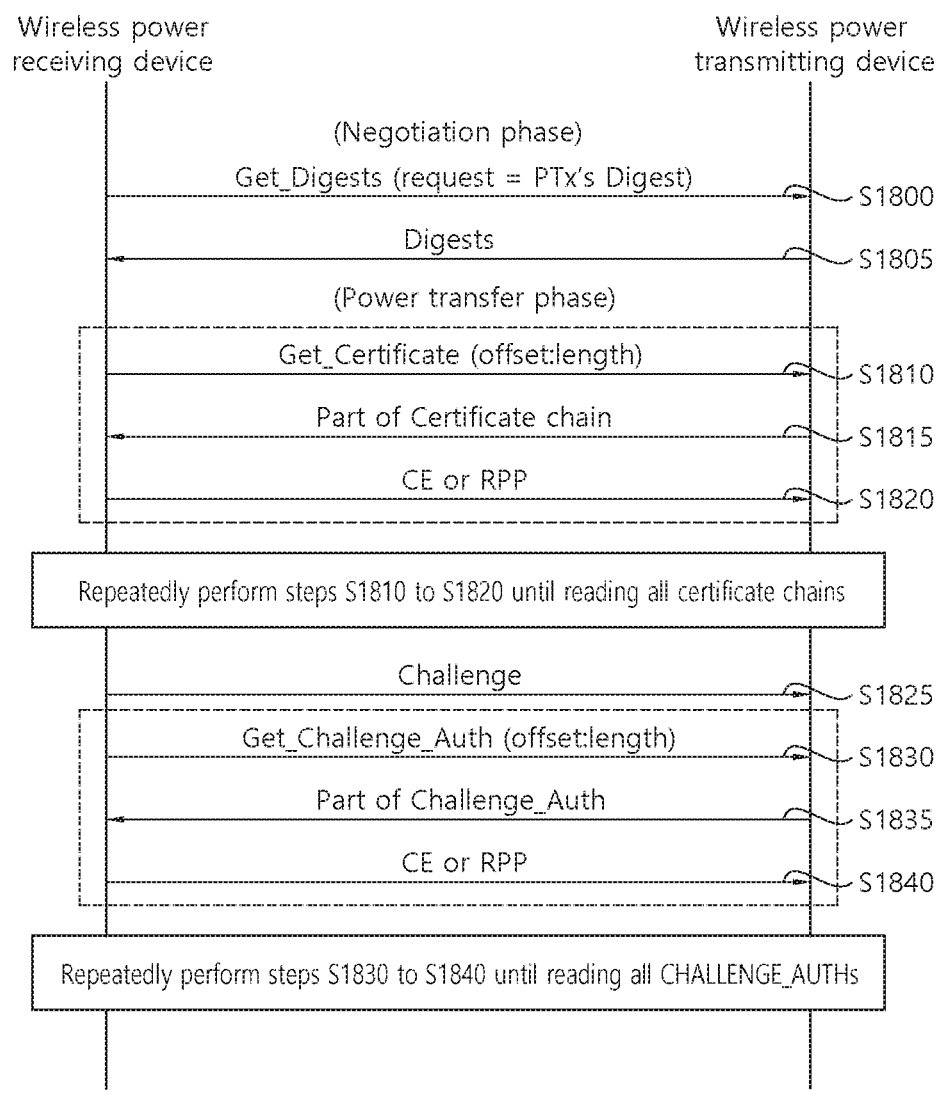
FIG. 18 is a flowchart illustrating a sequence of transmitted and received packets when a wireless power receiving device performs authentication (authentication of PTx by PRx) of a wireless power transmitting device according to an embodiment.

FIG. 18 is a flowchart illustrating a sequence of transmitted and received packets when the wireless power receiving device performs authentication (authentication of PTx by PRx) of the wireless power transmitting device according to an embodiment.

Referring to FIG. 18, in order to obtain or retrieve certificate chain DIGESTS of the wireless power transmitting device, the wireless power receiving device transmits GET_DIGESTS to the wireless power transmitting device (S1800). Here, it may be set to REQUEST=PTx's DIGEST. Predefined operations for step S1800 may include an operation of determining authentication function support in a capability packet in which the wireless power receiving device receives from the wireless power transmitting device. The wireless power receiving device may transmit GET_DIGESTS to the wireless power transmitting device using a general request packet during the negotiation phase or the renegotiation phase. That is, the GET_DIGESTS may be loaded and transmitted in the general request packet.

FIG. 19 illustrates an example of a message structure of GET_DIGESTS. Referring to FIG. 19, the GET_DIGESTS is configured with, for example, 1 byte and includes a request field. The request field may indicate, for example, a header of DIGEST of the wireless power transmitting device.

FIG. 20 illustrates another example of a message structure of GET_DIGESTS. Referring to FIG. 20, the GET_DIGESTS is configured with, for example, 1 byte and includes reserved and a slot number. The slot number may identify a slot in which the requested certificate chain is stored and may be configured with, for example, 3 bits.

Referring again to FIG. 18, the wireless power transmitting device transmits DIGESTS in response to the GET_DIGESTS to the wireless power receiving device (S1805). The DIGESTS is used when the authentication responder transmits a report on certificate chain digests and a slot including valid certificate chain digests. A parameter of the DIGESTS may be 32 bytes of a hash value of the certificate chain.

Figure 21:
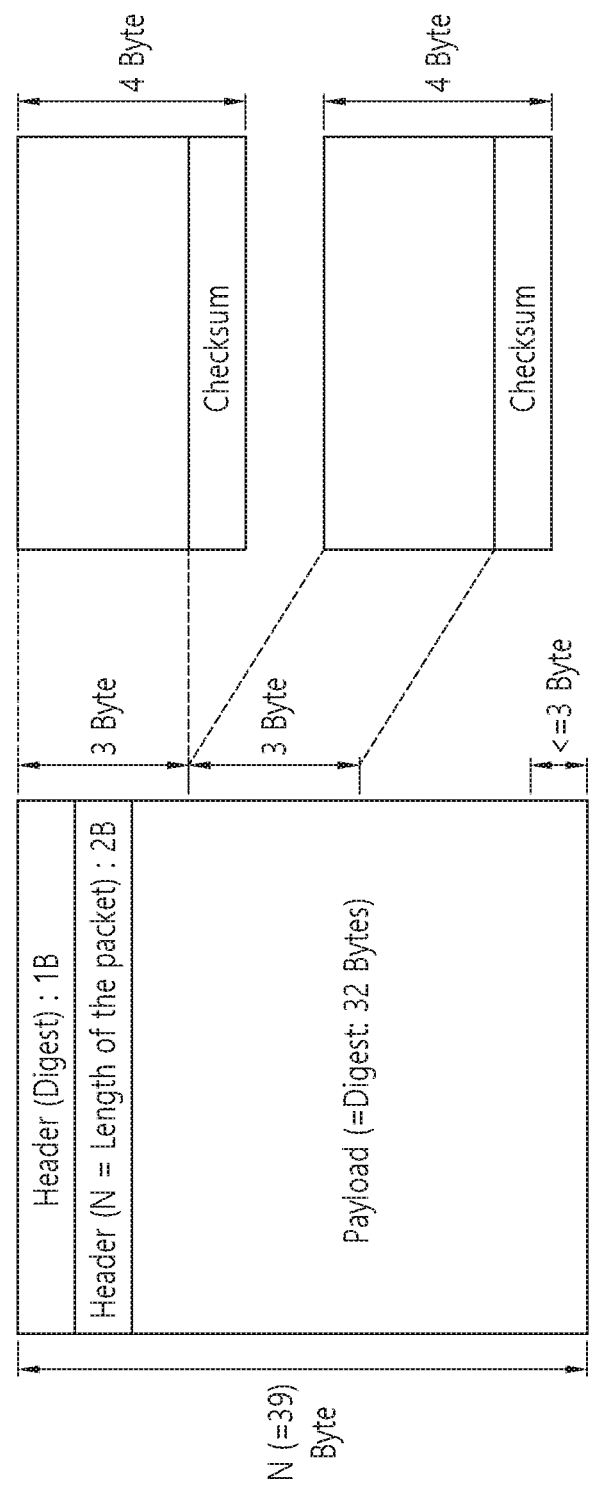
FIG. 21 illustrates a physical packet structure that transmits DIGESTS and a method of transmitting the physical packet structure.

FIG. 21 illustrates a physical packet structure that transmits DIGESTS and a method of transmitting the physical packet structure. Referring to FIG. 21, the DIGESTS packet includes 32 bytes of DIGESTS payload, 1 byte of header representing that the corresponding packet is a packet on DIGESTS, and 2 bytes of header representing a length of the corresponding packet. The wireless power transmitting device divides such a DIGESTS packet into a plurality of small packets of a specific length (e.g., 3 bytes) and adds a checksum to the end of the small packet to transmit the small packet to a sequence of 4 bytes of DIGESTS small packet. A size of a last small packet of such a sequence may be smaller than 4 bytes. The small packet may be referred to as a segment. An illustration of FIG. 21 is to limit a size of a transmission packet of the wireless power transmitting device such that a single authentication response is configured with maximum 4 bytes. In this way, to divide a single response message into a series of small packets is to allow transmitting timing of a (extended) control error packet (CEP) and a (extended) received power packet (RPP) to be periodically (about 250 ms) transmitted to the wireless power transmitting device by the wireless power receiving device, whereby foreign object detection and an operating point for power transfer of the wireless power transmitting device may be efficiently managed.

Referring again to FIG. 18, when it is acknowledged that the wireless power transmitting device has already previously authenticated, authentication is successful. When the wireless power receiving device does not acknowledge DIGESTS, the wireless power receiving device continues to perform authentication during the power transfer phase. Steps S1800 and S1805 may be performed in the negotiation or renegotiation phase. Alternatively, steps S1800 and S1805 may be performed in the power transfer phase.

Thereafter, in order to obtain a certificate chain of the wireless power transmitting device, the wireless power receiving device transmits GET_CERTIFICATE to the wireless power transmitting device (S1810). Here, the GET_

CERTIFICATE may be set by an offset and a length. The GET_CERTIFICATE is used for reading a segment of a target certificate chain.

FIG. 22 illustrates an example of a message structure of GET_CERTIFICATE. Referring to FIG. 22, the GET_CERTIFICATE is configured with, for example, two bytes and may include offset and length fields. Here, the offset is an offset from a start position of the certificate chain to a start position of a read request and an indication unit thereof is a byte. The length is a length of the read request and an indication unit thereof is a byte. For example, in order to read 4 bytes from a start position of the certificate chain, the offset [11 . . . 0] of the GET_CERTIFICATE may have a value of 00b, and a length thereof may have a value of 11b.

Referring again to FIG. 18, the wireless power transmitting device transmits at least a portion of the certificate chain to the wireless power receiving device in response to the GET_CERTIFICATE (S1815). In this case, a portion of the certificate chain may be initiated after an offset from a time point initiated in a length of a byte unit.

Figure 23:
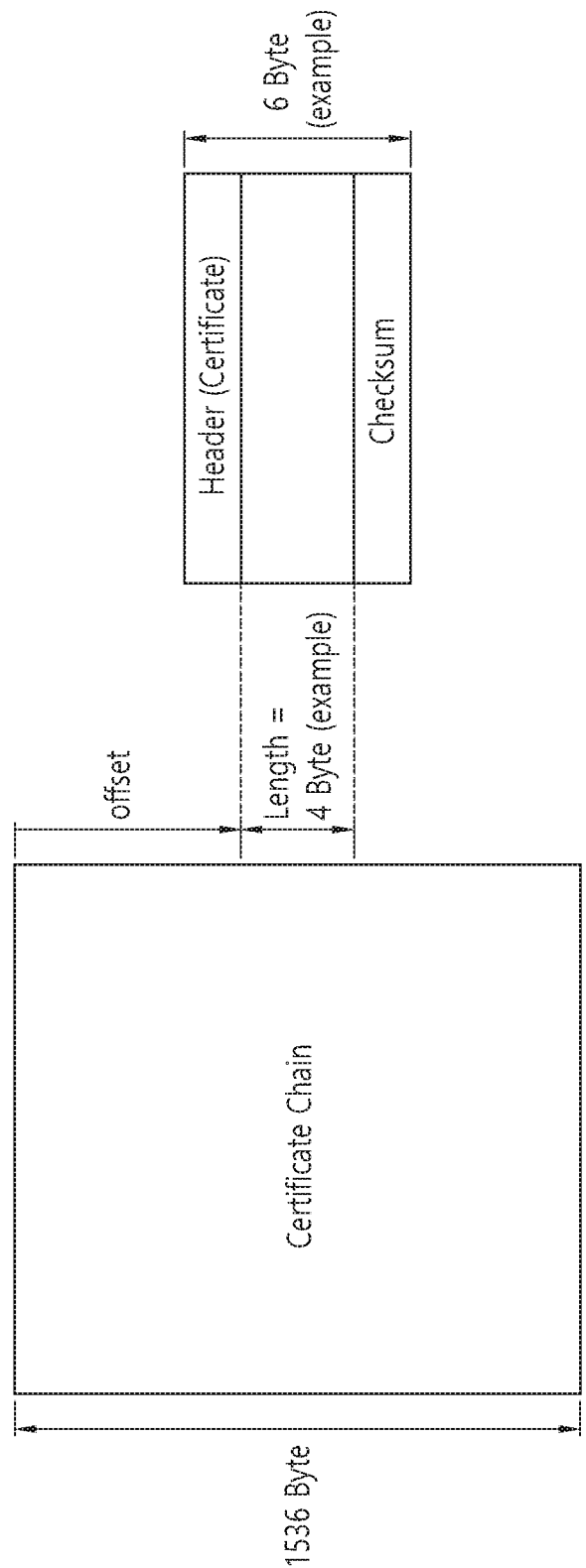
FIG. 23 illustrates an example of a physical packet structure that transmits a certificate and a method of transmitting the physical packet structure.

FIG. 23 illustrates an example of a physical packet structure that transmits a certificate and a method of transmitting the physical packet structure. Referring to FIG. 23, when transmitting 1536 bytes of certificate packet, the wireless power transmitting device extracts a certificate having a length of 4 bytes from an offset point of the certificate packet, adds a header indicating the certificate to the front end of the certificate, and adds a checksum to the rear end of the certificate to generate and transmit a certificate segment having total 6 bytes of length.

Figure 24:
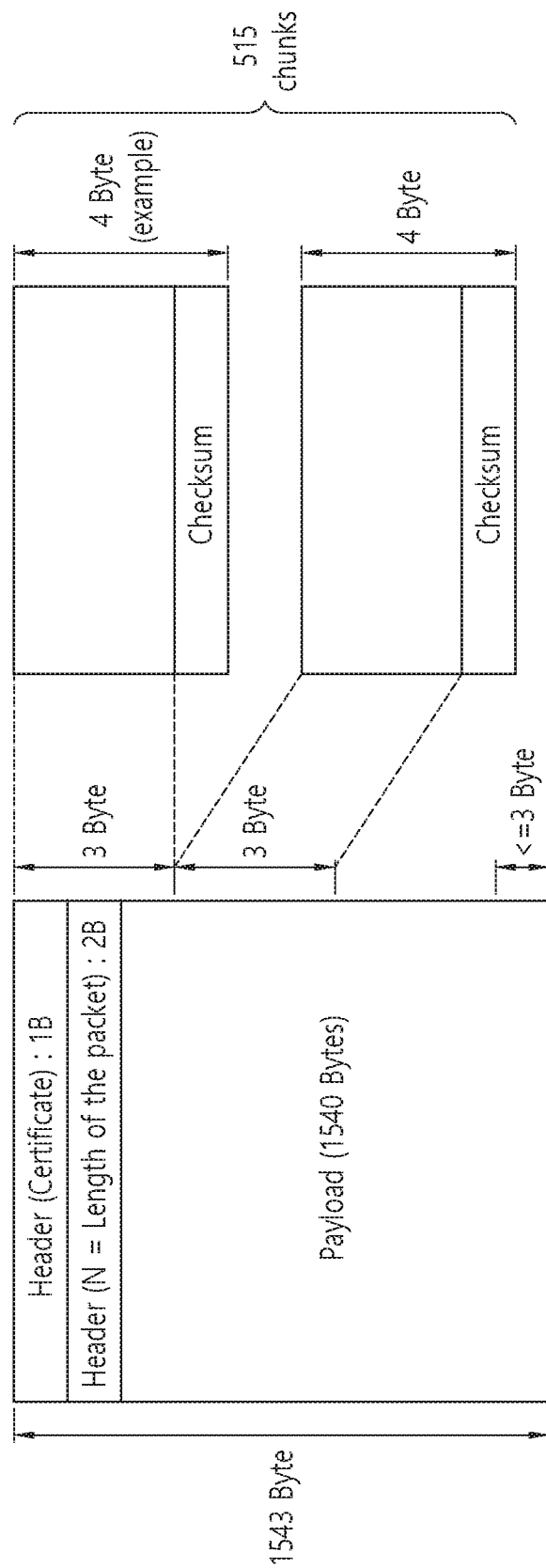
FIG. 24 illustrates an example of a physical packet structure that transmits an authentication response message of a wireless power transmitting device and a method of transmitting the physical packet structure.

FIG. 24 illustrates an example of a physical packet structure that transmits an authentication response message of the wireless power transmitting device and a method of transmitting the physical packet structure. Referring to FIG. 24, a certificate packet (i.e. 1543 bytes) may include a certificate chain (i.e. 1540 bytes), a header (i.e. 1 byte) indicating the certificate, and a header (i.e. 2 bytes) indicating a length of the certificate packet. The wireless power transmitting device divides such a certificate packet into a plurality of small packets of a specific length (e.g., 3 bytes) and adds a checksum to the end of the small packet to transmit the small packet to a sequence of 4 bytes of certificate small packets. In this case, each of total 515 data chunks is transmitted. A size of the last packet of the sequence may be smaller than 4 bytes. The small packet may be referred to as a segment. An illustration of FIG. 24 is to limit a size of a transmission packet of the wireless power transmitting device such that a single authentication response is configured with maximum 4 bytes. In this way, to divide a single response message into a series of small packets is to allow transmitting timing of a (extended) control error packet (CEP) and a (extended) received power packet (RPP) to be periodically (about 250 ms) transmitted to the wireless power transmitting device by the wireless power receiving device, whereby foreign object detection and an operating point for power transfer of the wireless power transmitting device may be efficiently managed.

Referring again to FIG. 18, if necessary, the wireless power receiving device may transmit a control error (CE) packet and/or a received power packet (RPP) to the wireless power transmitting device (S1820). Steps S1810 and S1820 may be performed, for example, in the power transfer phase.

Thereafter, the wireless power receiving device may perform repeatedly steps S1810 to S1820 until reading all certificate chains.

The wireless power receiving device transmits CHALLENGE to the wireless power transmitting device (S1825). The CHALLENGE is used for initiating authentication of a product.

Figure 25:
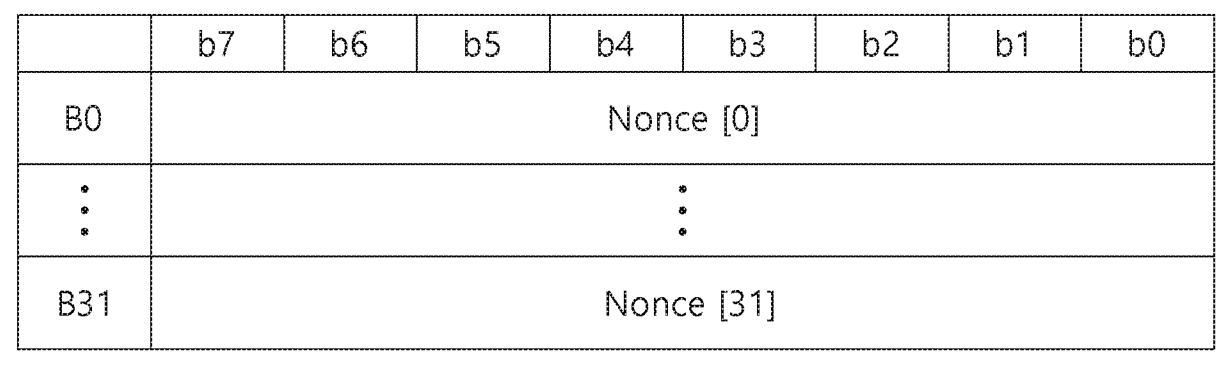

FIG. 25 illustrates an example of a CHALLENGE message structure. Referring to FIG. 25, the CHALLENGE is configured with, for example, 32 bits (4 bytes) and may include four Nonce fields. Nonce is a binary random number selected by the authentication initiator.

Referring again to FIG. 18, in order to obtain CHALLENGE_AUTH, the wireless power receiving device transmits GET_CHALLENGE_AUTH to the wireless power transmitting device (S1830). Here, the GET_CHALLENGE_AUTH may be set to an offset and a length.

The wireless power transmitting device transmits a portion of CHALLENGE_AUTH in response to the GET_CHALLENGE_AUTH to the wireless power receiving device (S1835). In this case, a portion of the CHALLENGE_AUTH may be initiated after an offset from a time point initiated in a length of a byte unit.

Figure 26:
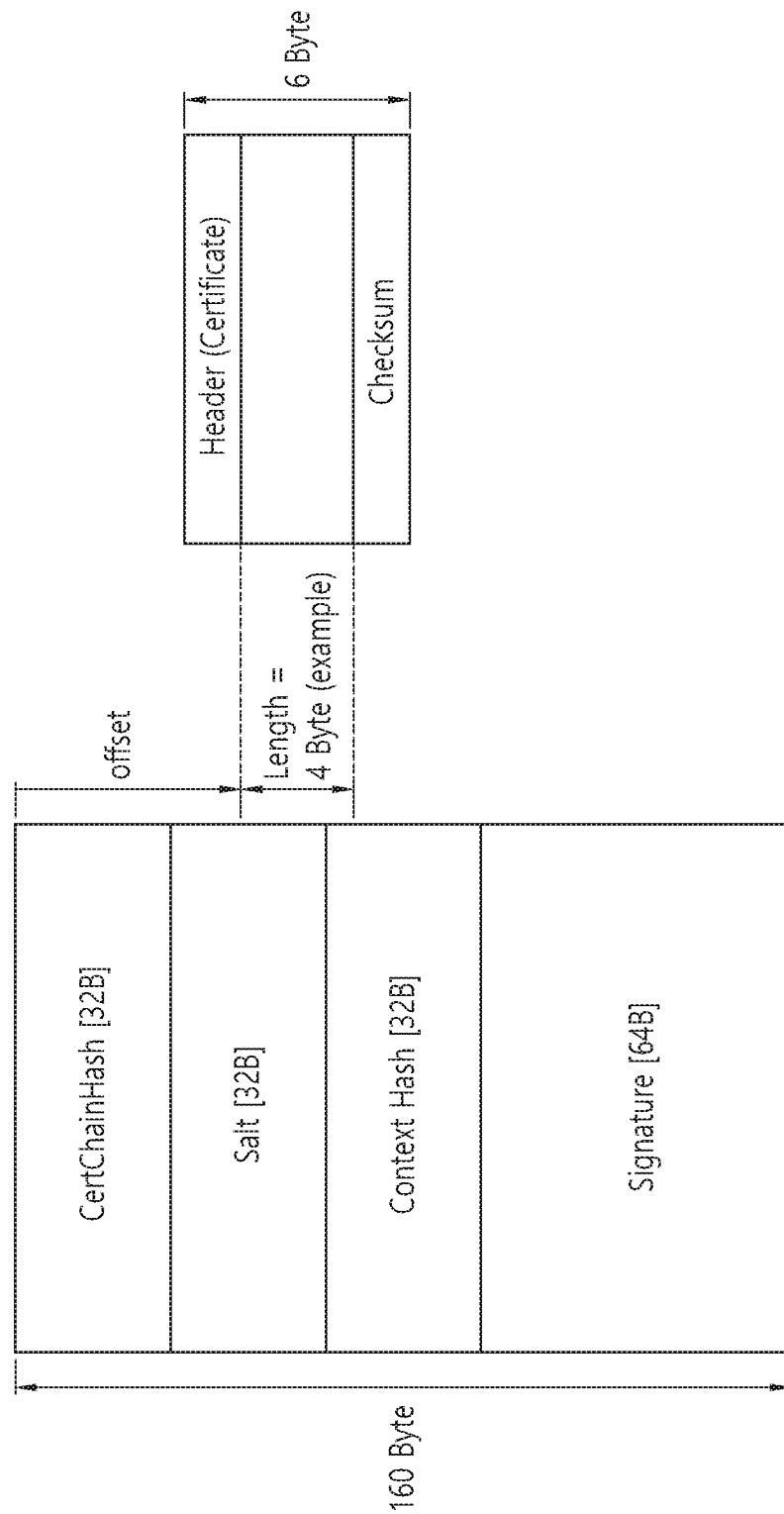
FIG. 26 illustrates an example of a physical packet structure that transmits CHALLENGE_AUTH and a method of transmitting the physical packet structure.

FIG. 26 illustrates an example of a physical packet structure that transmits CHALLENGE_AUTH and a method of transmitting the physical packet structure. Referring to FIG. 26, the CHALLENGE_AUTH packet (i.e. 160 bytes) may include a certificate chain hash (i.e. 32 bytes), Salt (i.e. 32 bytes), a context hash (i.e. 32 bytes), and a signature (i.e. 64 bytes). The wireless power transmitting device extracts a specific length (e.g., 4 bytes) from the offset of such a CHALLENGE_AUTH packet based on the offset and the length indicated in the CHALLENGE_AUTH packet, adds a header indicating the CHALLENGE_AUTH packet to the front end thereof, and adds a checksum to the rear end thereof to generate and transmit a certificate segment having total 6 bytes of length.

Referring again to FIG. 18, if necessary, the wireless power receiving device may transmit the control error (CE) packet and/or the received power packet (RPP) to the wireless power transmitting device (S1840).

Thereafter, the wireless power receiving device may perform repeatedly steps S1830 to S1840 until reading all CHALLENGE_AUTHs.

Hereinafter, a procedure in which the wireless power transmitting device performs authentication of the wireless power receiving device based on the authentication message will be described.

(2) Authentication of the Wireless Power Receiving Device by the Wireless Power Transmitting Device (Authentication of PRx by PTx)

When authentication (authentication of PRx by PTx) of the wireless power receiving device by the wireless power transmitting device operates based on in-band communication, a time required for each step are shown in Table 8 or 9.

TABLE 8

| Authentication initiator = PTx | Authentication responder = PRx | Phases | Required time |
| --- | --- | --- | --- |
| GET_DIGESTS | | Negotiation phase | (4 + 2) × 11 × 5 = 330 msec |
| | DIGESTS | | (36 + 3) × 11 × 0.5 = 214.5 msec |

TABLE 8-continued

| Authentication initiator = PTx | Authentication responder = PRx | Phases | Required time |
|---|---|---|---|
| GET_CERTIFICATE | | | (8 + 2) × 11 × 5 = 550 msec |
| | CERTIFICATE | Power transmission phase | (1) 41 × 40 × 11 × 0.5 = 9020 msec (for certificate)<br>(2) 41 × 40 = 1640 msec = 1.6 sec (for ACK)<br>(assuming no CE packets are sent) |
| CHALLENGE | | | (36 + 2) × 11 × 5 = 2090 msec |
| | CHALLENGE_AUTH | | (1) 5 × 40 × 11 × 0.5 = 1100 msec (for challenge_auth)<br>(2) 5 × 40 = 200 msec (for ACK) |

Table 8 represents an example of a time required for each authentication message in the case where a power contract is made based on the results of GET_DIGESTS during the negotiation phase. When the wireless power transmitting device already knows the DIGEST of the wireless power receiving device, a transmitting/receiving step of GET_CERTIFICATE and CERTIFICATE may be omitted. Further, a power contract may be renewed in a renegotiation phase according to the authentication result.

TABLE 9

| Authentication initiator = PTx | Authentication responder = PRx | Phases | Required time |
|---|---|---|---|
| | DIGESTS | Negotiation phase | (32 + 3) × 11 × 0.5 = 192.5 msec |
| | CE | Power transmission phase | (1 + 3) × 11 × 0.5 = 22 msec |
| Reqest_COMM | ACK | Power transfer phase | (1) 8 × 5 = 40 ms (Request for Comm.)<br>(2) (1 + 3) × 11 × 0.5 = 22 ms (ACK)<br>(3) (2 + 2) × 11 × 5 = 220 ms (Get_Certificate) |
| GET_CERTIFICATE | Certificate | | (3) (40 + 3) × 11 × 0.5 = 236.5 ms (Certificate)<br>(4) 540.5 × 39 = 21079.5 ms = 21 s (assuming sending certificate by 40 Bytes) |
| | CE | | (1 + 3) × 11 × 0.5 = 22 ms |
| Reqest_COMM | ACK | | (1) 8 × 5 = 40 ms (Request for Comm.)<br>(2) (1 + 3) × 11 × 0.5 = 22 ms (ACK) |
| CHALLENGE [n], n = 0 . . . 7 | ACK | | (3) (4 + 2) × 11 × 5 = 330 ms (Challenge)<br>(4) (1 + 3) × 11 × 0.5 = 22 ms (ACK)<br>(5) 436 × 8 = 3488 ms = 3 s (assuming sending Challenge by 4 Bytes) |
| | CE | | (1 + 3) × 11 × 0.5 = 22 ms |

TABLE 9-continued

| Authentication initiator = PTx | Authentication responder = PRx | Phases | Required time |
|---|---|---|---|
| Reqest_COMM | ACK | | (1) 8 × 5 = 40 ms (Request for Comm.)<br>(2) (1 + 3) × 11 × 0.5 = 22 ms (ACK)<br>(3) (2 + 2) × 11 × 5 = 220 ms (Get Challenge Auth) |
| GET_CHALLENGE_AUTH | CHALLENGE_AUTH [n] | | (4) (40 + 3) × 11 × 0.5 = 236.5 ms (Challenge_Auth)<br>(5) 540.5 × 4 = 2162 ms ≈ 2 s (assuming sending Challenge_Auth by 40 Bytes) |

Table 9 represents an example of a time required for each authentication message in the case where a power contract is made based on the results of GET_DIGESTS during the negotiation phase. When the wireless power transmitting device already knows DIGEST of the wireless power receiving device, a control error packet transmission step, a communication request step, and a transmitting/receiving step of the GET_CERTIFICATE and the CERTIFICATE may be omitted. Further, a power contract may be renewed in a renegotiation phase according to the authentication result. Hereinafter, an authentication procedure for satisfying the required time will be described.

Figure 27:
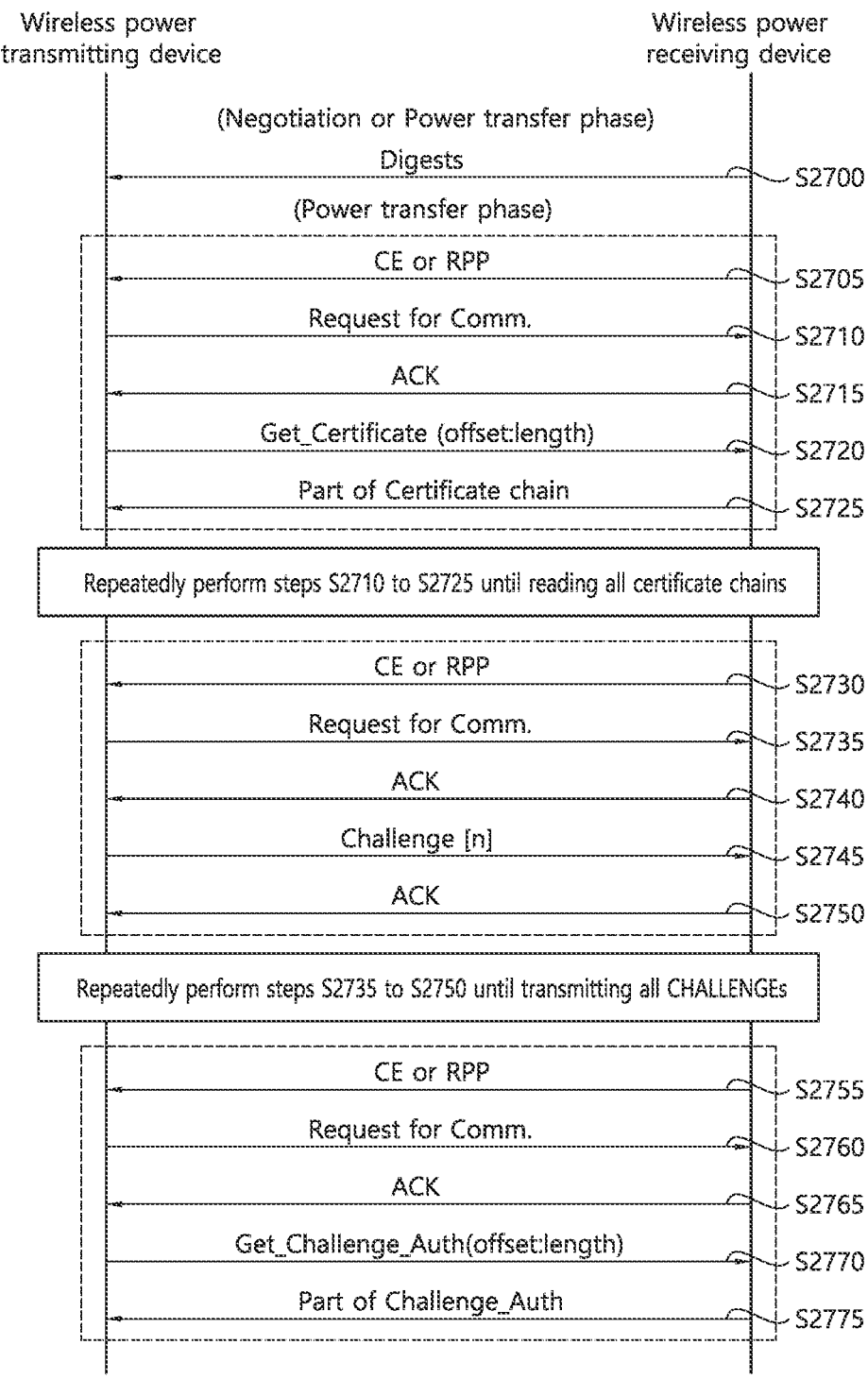
FIG. 27 is a flowchart illustrating a sequence of transmitted and received packets when a wireless power transmitting device performs authentication (authentication of PRx by PTx) of a wireless power receiving device according to an embodiment.

FIG. 27 is a flowchart illustrating a sequence of transmitted and received packets when the wireless power transmitting device performs authentication (authentication of PRx by PTx) of the wireless power receiving device according to an embodiment.

Referring to FIG. 27, the wireless power transmitting device receives DIGESTS transmitted from the wireless power receiving device (S2700). DIGESTS is used when the authentication responder transmits a report on certificate chain digests and a slot including valid certificate chain digests. A parameter of DIGESTS may be 32 bytes of a hash value of the certificate chain. Predefined operations for step S2700 may include an operation of determining authentication function support in a capability packet in which the wireless power receiving device receives from the wireless power transmitting device and an operation in which the wireless power transmitting device transmits GET_DIGESTS to the wireless power receiving device. Step S2700 may be performed in a negotiation or renegotiation phase, or a power transfer phase.

FIG. 28 illustrates an example of a message structure of GET_DIGESTS transmitted by the wireless power transmitting device. Referring to FIG. 28, GET_DIGESTS is configured with, for example, 1 byte and includes a request field. The GET_DIGESTS includes reserved and a slot number. The slot number identifies a slot in which a requested certificate chain is stored and may be configured with, for example, 3 bits.

Referring again to FIG. 27, during the power transfer phase, the wireless power receiving device transmits a control error packet and a received power packet to the wireless power transmitting device (S2705).

The wireless power transmitting device transmits a request for communication in response to the control error packet or the received power packet (S2710). The request for communication may be, for example, a bit pattern response.

When the wireless power receiving device responds to ACK to the request for communication (S2715), in order to obtain a certificate chain or a CHALLENGE_AUTH response of the wireless power receiving device, the wireless power transmitting device transmits GET_CERTIFICATE to the wireless power receiving device (S2720). Here, the GET_CERTIFICATE may be set by an offset and a length. The GET_CERTIFICATE is used for reading a segment of a target certificate chain.

Figure 29:
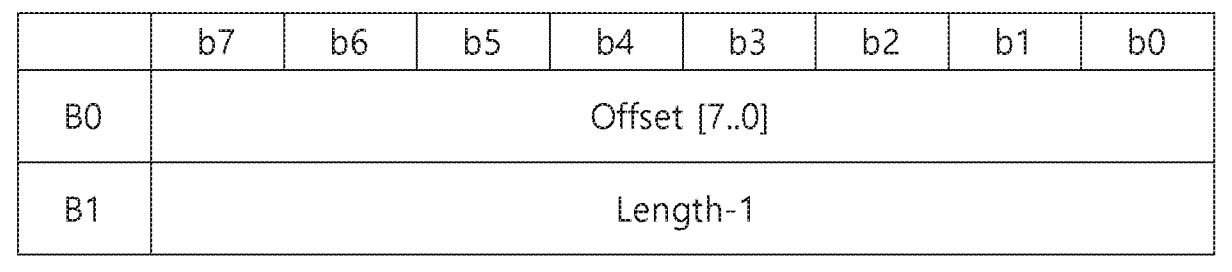

FIG. 29 illustrates an example of a GET_CERTIFICATE message structure in which the wireless power transmitting device transmits. Referring to FIG. 29, the GET_CERTIFICATE is configured with, for example, 2 bytes and may include offset and length fields. Here, the offset is an offset from a start position of the certificate chain to a start position of a read request and an indication unit thereof is a byte. The length is a length of the read request and an indication unit thereof is a byte. For example, in order to read 40 bytes from a start position of the certificate chain, an offset [7 . . . 0] of GET_CERTIFICATE may have a value of 00b, and a length thereof may have a value of 110000b.

Referring again to FIG. 27, the wireless power receiving device transmits at least a portion of the certificate chain to the wireless power transmitting device in response to the GET_CERTIFICATE (S2725). In this case, a portion of the certificate chain may be initiated after an offset from a time point initiated in a length of a byte unit.

Figure 30:
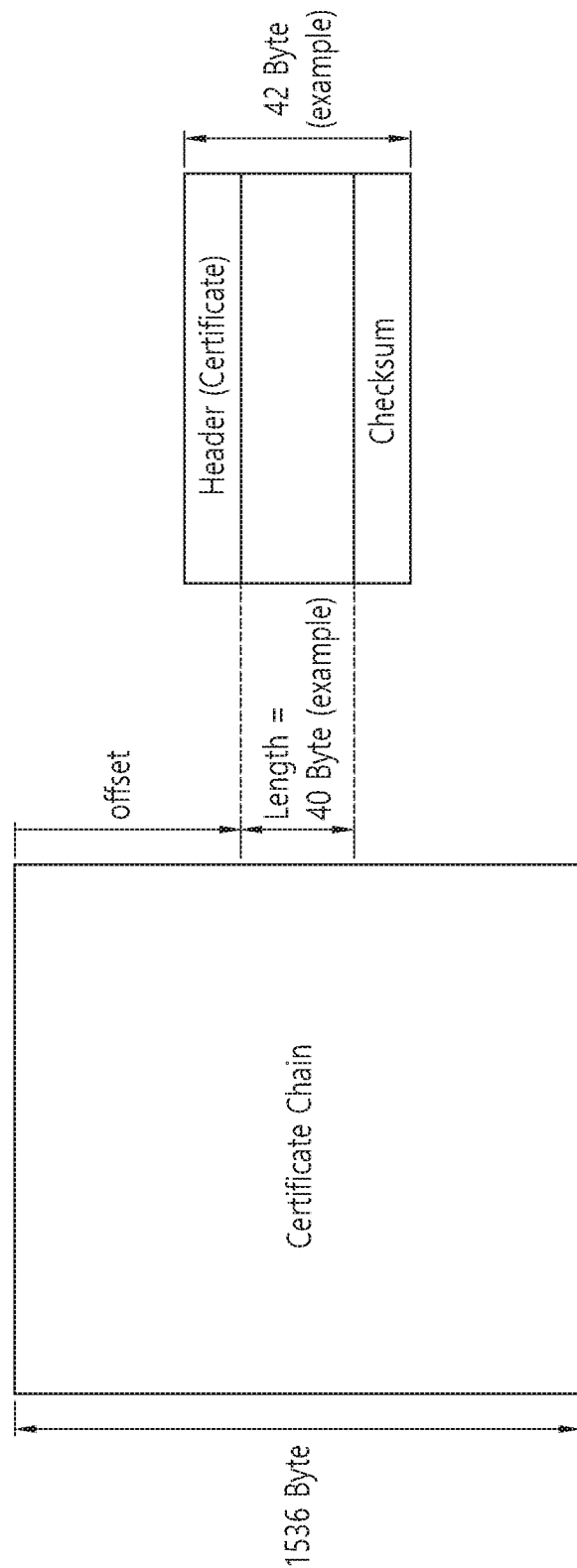
FIG. 30 illustrates an example of a physical packet structure that transmits a certificate of a wireless power receiving device and a method of transmitting the physical packet structure.

FIG. 30 illustrates an example of a physical packet structure in which a certificate of a wireless power receiving device is transmitted and a method of transmitting the physical packet structure. Referring to FIG. 30, when transmitting 1536 bytes of certificate packet, the wireless power receiving device extracts a certificate of a length 40 bytes from an offset point of the certificate packet, adds a header (i.e., 1 byte) indicating the certificate to the front end thereof, and adds a checksum (i.e., 1 byte) to the rear end thereof to generate and transmit a certificate segment having a length of total 42 bytes.

Referring again to FIG. 27, the wireless power transmitting device may repeatedly perform steps S2710 to S2725 until reading all certificate chains.

If necessary, the wireless power receiving device may transmit a control error (CE) packet and/or a received power packet (RPP) to the wireless power transmitting device (S2730).

The wireless power transmitting device transmits a request for communication in response to the CE packet and the RPP (S2735). The request for communication may be, for example, a bit pattern response.

When the wireless power receiving device responds to ACK to the request for communication (S2740), the wireless power transmitting device transmits CHALLENGE [n] to the wireless power receiving device (S2745). CHALLENGE is used for initiating authentication of the product.

Figure 31:
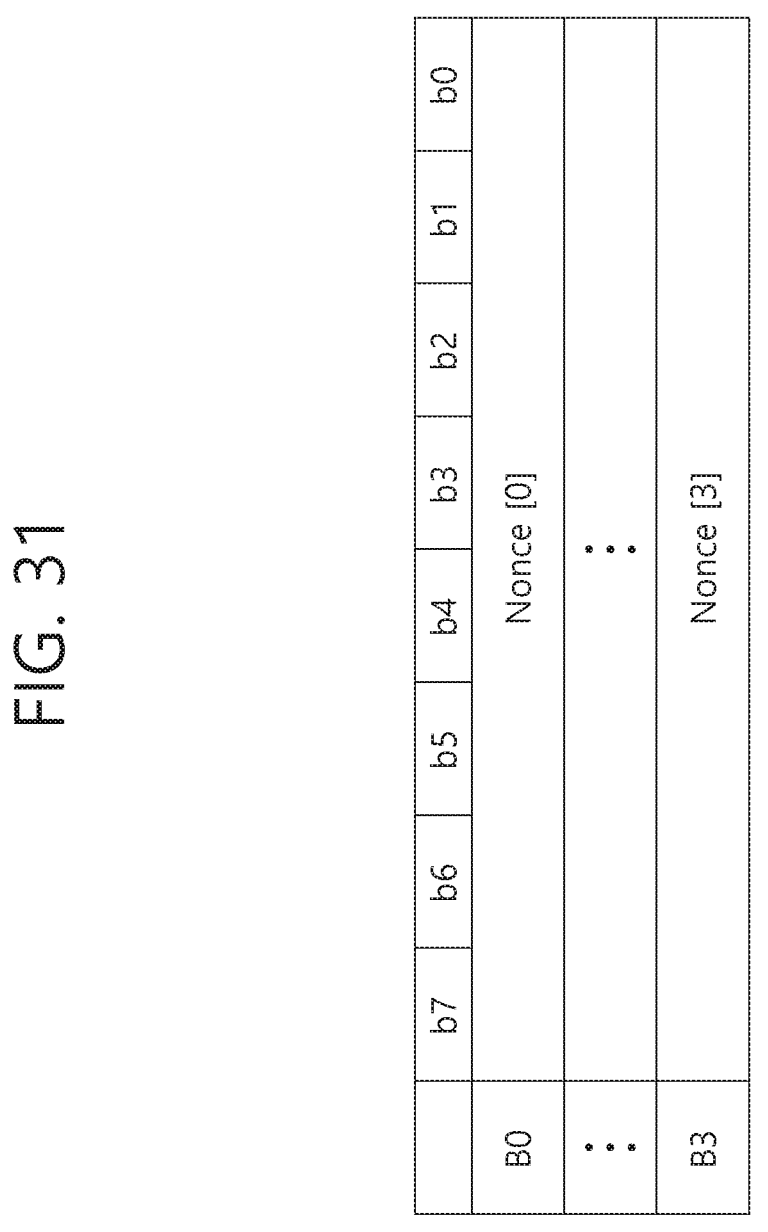

FIG. 31 illustrates an example of a CHALLENGE message structure in which the wireless power transmitting device transmits. Referring to FIG. 31, CHALLENGE is configured with, for example, 32 bits (4 bytes) and may include four Nonce fields. The Nonce is a binary random number selected by the authentication initiator. By transmitting 8 CHALLENGE packets, the wireless power transmitting device may provide total 32 bytes of Nonce to the wireless power receiving device.

Referring again to FIG. 27, after receiving ACK from the wireless power receiving device, the wireless power transmitting device may perform repeatedly steps S2735 to S2750 until transmitting all CHALLENGEs.

The wireless power receiving device may transmit a control error packet and/or a received power packet to the wireless power transmitting device (S2755). The wireless power transmitting device transmits a request for communication in response to the control error packet and the received power packet (S2760). The request for communication may be, for example, a bit pattern response.

When the wireless power receiving device responds to ACK to the request for communication (S2765), in order to obtain CHALLENGE_AUTH, the wireless power transmitting device transmits GET_CHALLENGE_AUTH to the wireless power receiving device (S2770). Here, GET_CHALLENGE_AUTH may be set to an offset and a length.

The wireless power receiving device transmits at least a portion of CHALLENGE_AUTH to the wireless power transmitting device in response to the GET_CHALLENGE_AUTH (S2775). In this case, at least a portion of CHALLENGE_AUTH may be initiated after an offset from a time point initiated in a length of a byte unit.

Figure 32:
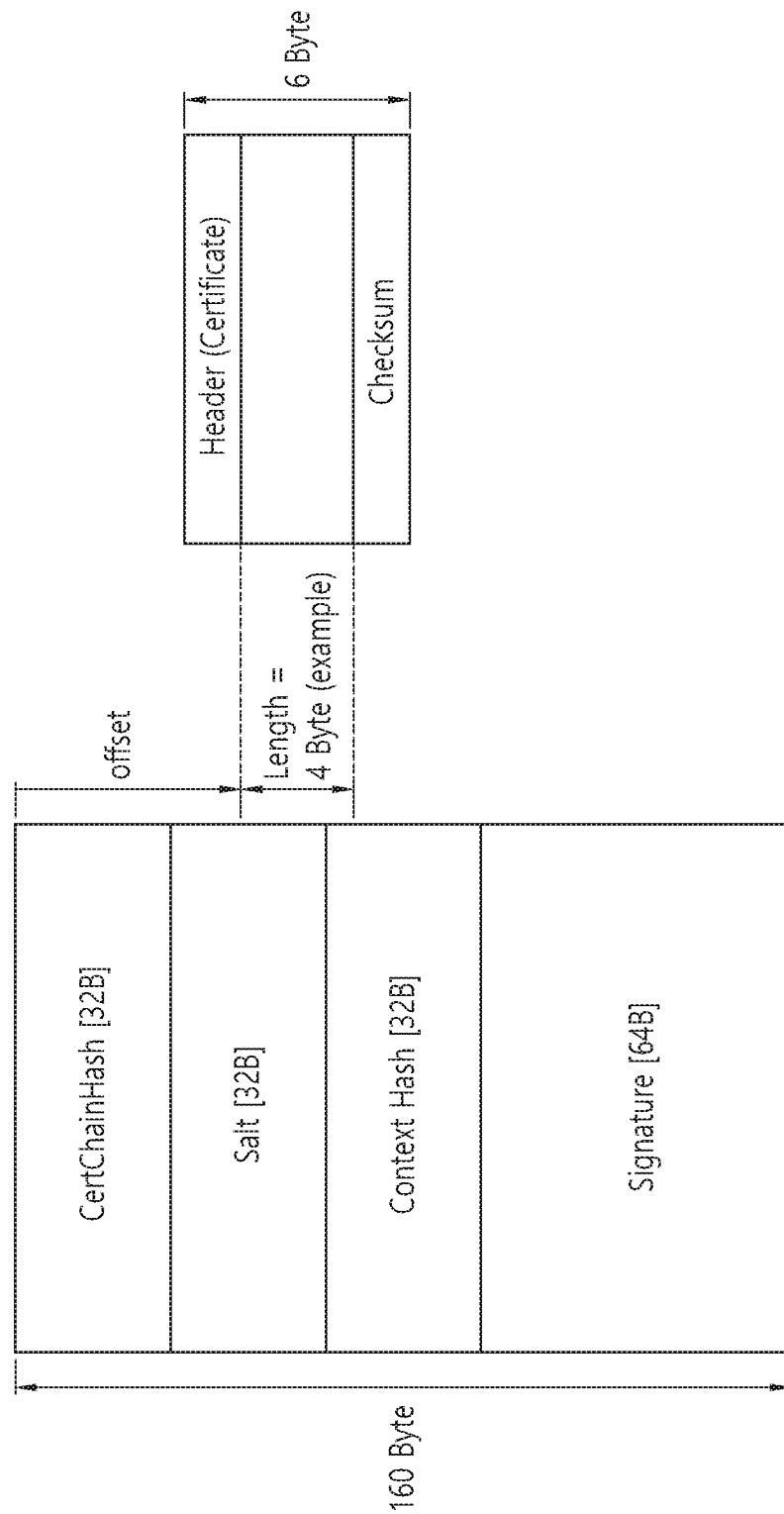
FIG. 32 illustrates an example of a physical packet structure that transmits CHALLENGE_AUTH of a wireless power receiving device and a method of transmitting the physical packet structure.

FIG. 32 illustrates an example of a physical packet structure in which CHALLENGE_AUTH of the wireless power receiving device is transmitted and a method of transmitting the physical packet structure. Referring to FIG. 32, a CHALLENGE_AUTH packet (i.e. 160 bytes) may include a certificate chain hash (i.e. 32 bytes), Salt (i.e. 32 bytes), a context hash (i.e. 32 bytes), and a signature (i.e. 64 bytes). The wireless power transmitting device extracts a specific length (e.g., 40 bytes) from the offset of such a CHALLENGE_AUTH packet based on the offset and the length indicated in GET_CHALLENGE_AUTH, adds a header (i.e. 1 byte) indicating the CHALLENGE_AUTH packet to the front end thereof, and adds a checksum (i.e. 1 byte) to the rear end thereof to generate and transmit a certificate segment having a length of total 42 bytes.

Thereafter, the wireless power transmitting device may repeatedly perform from steps S2760 to S2775 until reading all CHALLENGE_AUTH.

Figure 33:
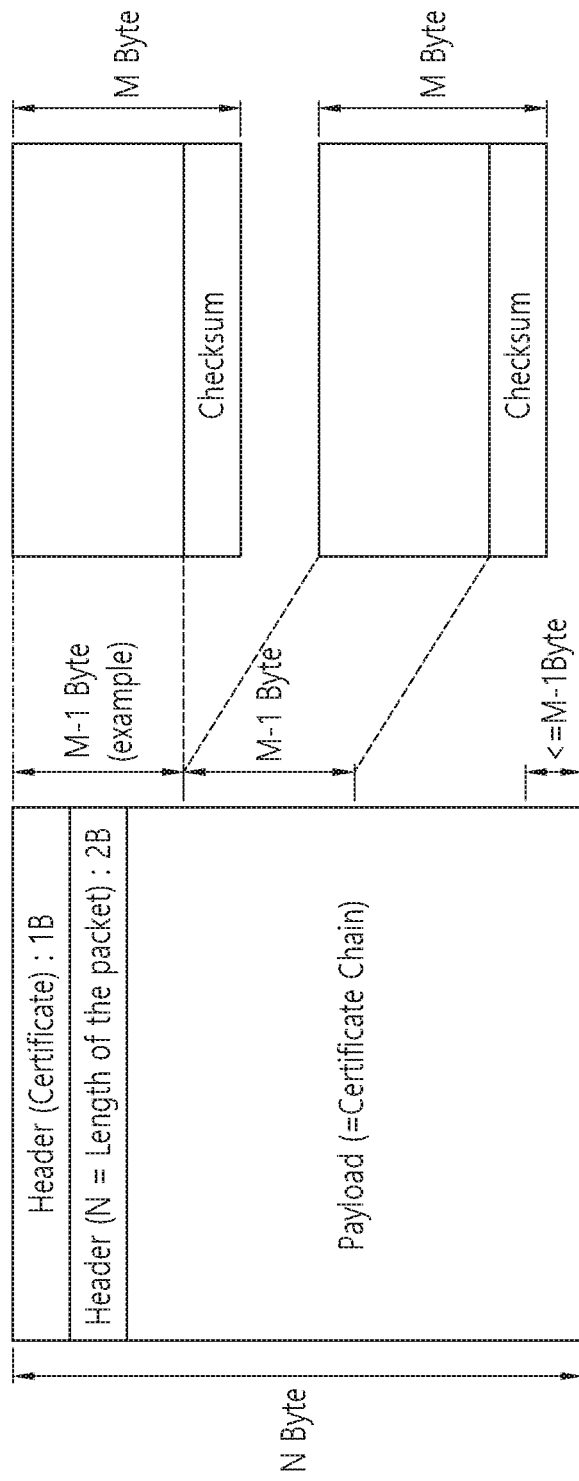
FIG. 33 illustrates an example of a physical packet structure that transmits an authentication response message of a wireless power receiving device and a method of transmitting the physical packet structure.

FIG. 33 illustrates an example of a physical packet structure in which an authentication response message of a wireless power receiving device is transmitted and a method of transmitting the physical packet structure. Referring to FIG. 33, for example, a certificate packet (i.e. N bytes) may include a certificate chain, a header (i.e. 1 byte) indicating the certificate, and a header (i.e. 2 bytes) indicating a length of a certificate packet. The wireless power receiving device divides such a certificate packet into a plurality of small packets of a specific length (e.g., M−1 bytes) and adds a checksum of 1 byte to the end of small packets to transmit the packet to a sequence of M bytes of certificate small packets. A size of a last small packet of the sequence may be smaller than M bytes. The small packet may be referred to as a segment. An illustration of FIG. 33 is to limit a size of a transmission packet of the wireless power receiving device such that a single authentication response is configured with M bytes. To divide a single response message into a series of small packets is to allow timing in which the wireless power receiving device transmits a (extended) control error packet (CEP) and a (extended) received power packet (RPP) to be periodically (about 250 ms) transmitted to the wireless power transfer device, whereby foreign object detection and an operating point for power transfer of the wireless power transmitting device may be efficiently managed.

Figure 34:
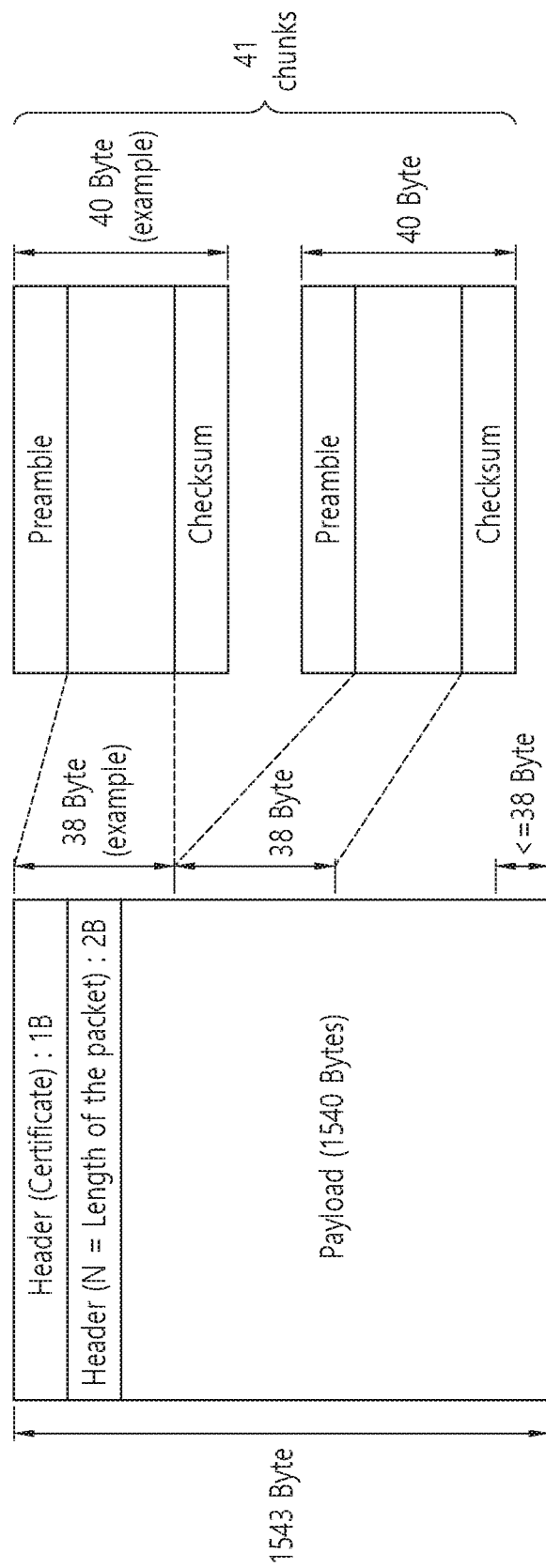
FIG. 34 illustrates another example of a physical packet structure that transmits an authentication response message of a wireless power receiving device and a method of transmitting the physical packet structure.

FIG. 34 illustrates another example of a physical packet structure in which an authentication response message of a wireless power receiving device is transmitted and a method of transmitting the physical packet structure. Referring to FIG. 34, for example, a certificate packet (i.e. 1543 bytes) may include a certificate chain (i.e. 1540 bytes), a header (i.e. 1 byte) indicating the certificate, and a header (i.e. 2 bytes) indicating a length of a certificate packet. The wireless power receiving device divides such a certificate packet into a plurality of small packets of a specific length (e.g., 38 bytes), adds a preamble (i.e. 1 byte) to the front end of small packets, and adds a checksum (i.e. 1 byte) to the rear end of small packets to transmit the packet to a sequence of 40 bytes of certificate small packets. In this case, each of total 41 data chunks is transmitted. A size of a last small packet of the sequence may be smaller than 40 bytes. The small packet may be referred to as a segment. An illustration of FIG. 34 is to limit a size of the transmission packet of the wireless power receiving device such that a single authentication response is configured with 40 bytes. To divide a single response message into a series of small packets is to allow timing in which the wireless power receiving device transmits a (extended) control error packet (CEP) and a (extended) received power packet (RPP) to be periodically (about 250 ms) transmitted to the wireless power transfer device, whereby foreign object detection and an operating point for power transfer of the wireless power transmitting device may be efficiently managed.

Figure 35:
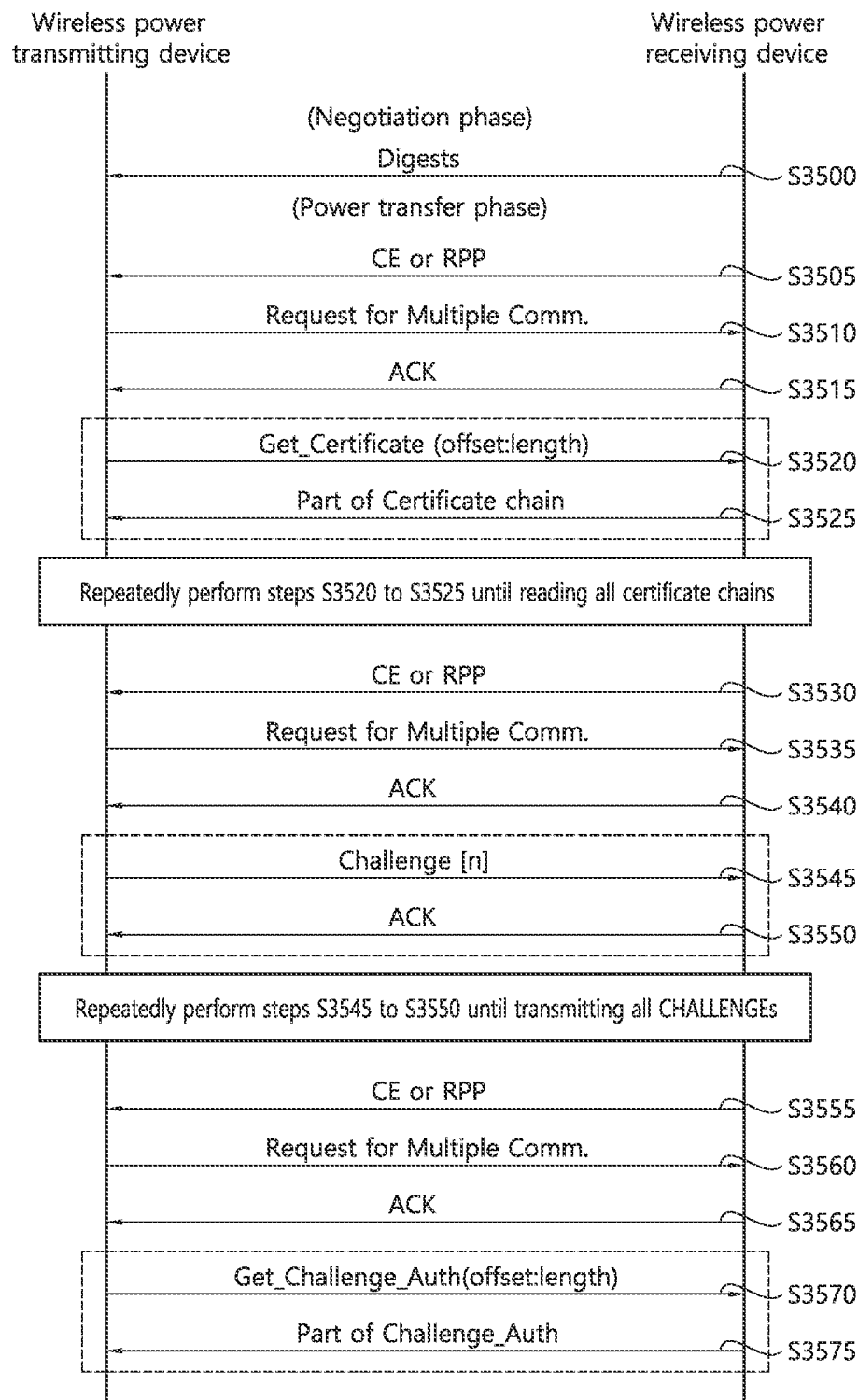
FIG. 35 is a flowchart illustrating a sequence of transmitted and received packets when a wireless power transmitting device performs authentication (authentication of PRx by PTx) of a wireless power receiving device according to another embodiment.

FIG. 35 is a flowchart illustrating a sequence of transmitted and received packets when the wireless power transmitting device performs authentication (authentication of PRx by PTx) of a wireless power receiving device according to another embodiment.

Referring to FIG. 35, the wireless power transmitting device receives DIGESTS transmitted from the wireless power receiving device (S3500). Predefined operations for step S3500 may include an operation in which the wireless power receiving device determines authentication function support in a capability packet received from the wireless power transmitting device and an operation in which the wireless power transmitting device transmits GET_DIGESTS to the wireless power receiving device. Step S3500 may be performed in a negotiation phase or a power transfer phase.

During the power transfer phase, the wireless power receiving device transmits the CEP and the RPP to the wireless power transmitting device (S3505).

The wireless power transmitting device transmits a request for multiple communications in response to the CEP and the RPP (S3510). The request for multiple communications may be, for example, a bit pattern response.

When the wireless power receiving device responds to ACK to the request for multiple communications (S3515), in order to obtain a certificate chain or a CHALLENGE_AUTH response of the wireless power receiving device, the wireless power transmitting device transmits GET_CERTIFICATE to the wireless power receiving device (S3520). Here, the GET_CERTIFICATE may be set by an offset and a length. The GET_CERTIFICATE is used for reading a segment of a target certificate chain.

The wireless power receiving device transmits at least a portion of the certificate chain to the wireless power transmitting device in response to the GET_CERTIFICATE (S3525). In this case, a portion of the certificate chain may be initiated after an offset from a time point initiated in a length of a byte unit.

The wireless power transmitting device may repeatedly perform steps S3520 to S3525 until reading all certificate chains.

If necessary, the wireless power receiving device may transmit a control error (CE) packet and/or a received power packet (RPP) to the wireless power transmitting device (S3530).

The wireless power transmitting device transmits a request for multiple communications in response to the CE packet and the RPP (S3535). The request for multiple communications may be, for example, a bit pattern response.

When the wireless power receiving device responds to ACK to the request for multiple communications (S3540), the wireless power transmitting device transmits CHALLENGE[n] to the wireless power receiving device (S3545). The CHALLENGE is used for initiating authentication of a product.

The wireless power transmitting device receives ACK from the wireless power receiving device (S3550) and may repeatedly perform steps S3545 to S3550 until transmitting all CHALLENGEs.

The wireless power receiving device may transmit the CE packet and/or the RPP to the wireless power transmitting device (S3555). The wireless power transmitting device transmits a request for multiple communications in response to the CE packet and the RPP (S3560). The request for multiple communications may be, for example, a bit pattern response.

When the wireless power receiving device responds to ACK to the request for multiple communications (S3565), in order to obtain CHALLENGE_AUTH, the wireless power transmitting device transmits GET_CHALLENGE_AUTH to the wireless power receiving device (S3570). Here, the GET_CHALLENGE_AUTH may be set to an offset and a length.

The wireless power receiving device transmits at least a portion of CHALLENGE_AUTH in response to the GET_CHALLENGE_AUTH to the wireless power transmitting device (S3575). In this case, at least a portion of CHALLENGE_AUTH may be initiated after an offset from a time point initiated in a length of a byte unit.

Thereafter, the wireless power transmitting device may repeatedly perform steps S3570 to S3575 until reading all CHALLENGE_AUTHs.

5. Lower Level Protocol that Supports Authentication Procedure

Because a packet transmission protocol of a low level that supports an authentication procedure may be configured based on in-band communication, it is necessary to configure a packet structure used in in-band communication to be appropriate to the authentication procedure and the authentication message.

Figure 36:
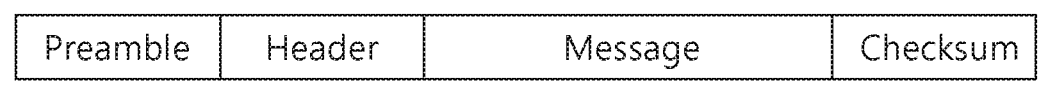

FIG. 36 illustrates a structure of a packet in which the wireless power receiving device transmits to the wireless power transmitting device in-band communication. A packet according to FIG. 36 may be modulated by an ASK scheme.

Referring to FIG. 36, a bit rate is 2 Kbps, and the packet includes a preamble, a header, a message, and a checksum. For example, the preamble may be set to 11 bits, the header may be set to 1B, and the checksum may be set to 1B (1B→11 bits).

Figure 37:
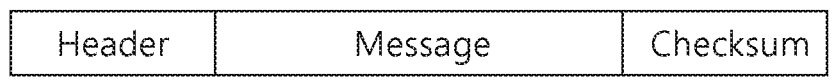
FIG. 37 illustrates a structure of a packet in which a wireless power transmitting device transmits to a wireless power receiving device in-band communication.

FIG. 37 illustrates a structure of a packet in which the wireless power transmitting device transmits to the wireless power receiving device in-band communication. The packet according to FIG. 37 may be modulated by an FSK scheme.

Referring to FIG. 37, a bit rate in an operation frequency of 100 kHz is 200 bps, and the packet includes a header, a message, and a checksum. For example, the header may be set to 1B, and the checksum may be set to 1B (1B→11 bits).

(1) Low Level Authentication Sequence

1) Authentication of the Wireless Power Transmitting Device by the Wireless Power Receiving Device (Authentication of PTx by PRx)

When the wireless power receiving device is an authentication initiator, the wireless power transmitting device becomes an authentication responder. Alternatively, the wireless power transmitting device may be represented with a (authentication) target device. As the authentication initiator, the wireless power receiving device transmits a message (or packet) necessary for authentication of the wireless power transmitting device as a message (or packet) that requests to the wireless power transmitting device. As an authentication responder, the wireless power transmitting device transmits an authentication response message configured with a sequence of several packets to the wireless power receiving device. A transmitting and receiving process of such a series of messages may be defined by a packet transmission protocol of a lower level.

Figure 38:
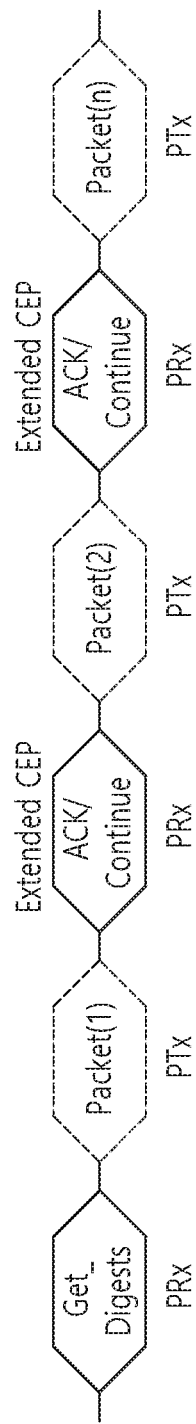
FIG. 38 illustrates a transmission and reception sequence of a packet between a wireless power receiving device and transmitting device from a lower level viewpoint according to an embodiment.

FIG. 38 illustrates a transmission and reception sequence of a packet between a wireless power receiving device and transmitting device from a lower level viewpoint according to an embodiment. FIG. 38 illustrates a process in which the wireless power transmitting device transmits an authentication response packet (DIGESTS) to the wireless power receiving device when the wireless power receiving device transmits GET_DIGESTS to the wireless power transmitting device.

Referring to FIG. 38, after transmitting every packet of a sequence, the wireless power transmitting device stands by transmission of ACK/NACK or continue/stop from the wireless power receiving device. ACK/NACK or continue/stop is included and transmitted in the (extended) CEP of FIG. 39. Until transmitting all packets of the sequence, the wireless power transmitting device and/or the wireless power receiving device repeat(s) the following procedure.

If the wireless power transmitting device receives "ACK and continue", the wireless power transmitting device transmits a next packet.

If the wireless power transmitting device receives "ACK and stop", the wireless power transmitting device stands by until receiving a next extended CEP including "ACK and continue".

If the wireless power transmitting device receives "NACK and continue", the wireless power transmitting device retransmits a previous packet.

If the wireless power transmitting device receives "NACK and stop", the wireless power transmitting device stands by until receiving a next extended CEP including "ACK and continue".

Figure 39:
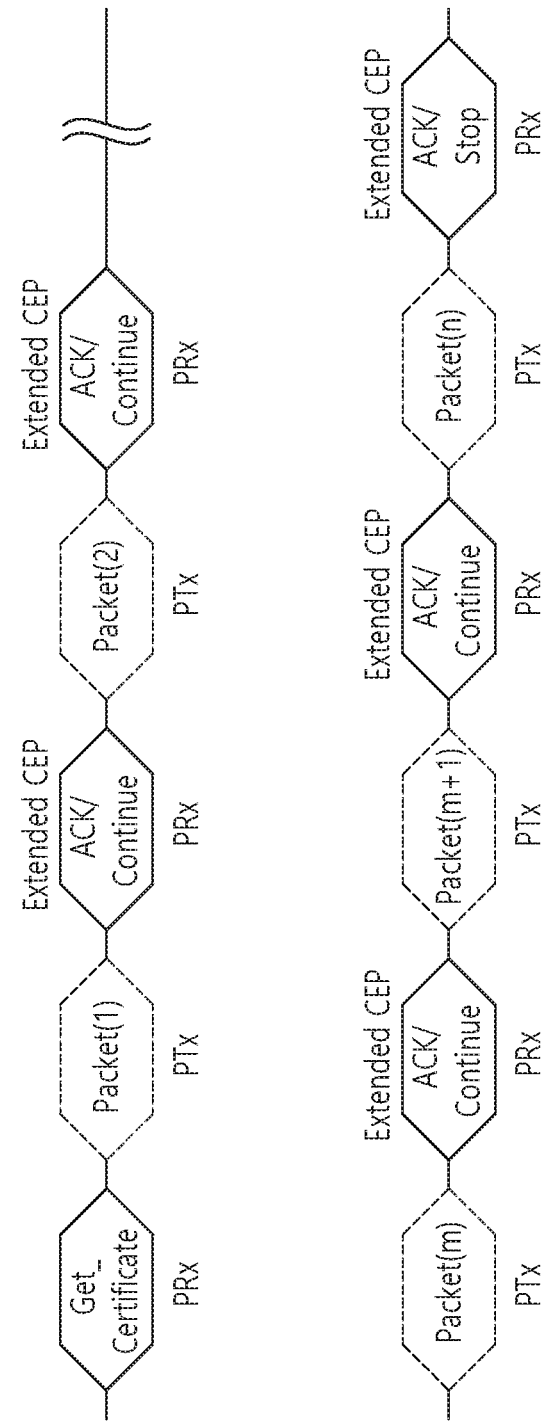
FIG. 39 illustrates a transmission and reception sequence of a packet between a wireless power receiving device and transmitting device from a lower level viewpoint according to another embodiment.

FIG. 39 illustrates a transmission and reception sequence of a packet between a wireless power receiving device and transmitting device from a lower level viewpoint according to another embodiment. FIG. 39 illustrates a process in which the wireless power transmitting device receives an authentication response packet (CERTIFICATE) to the wireless power receiving device when the wireless power receiving device transmits GET_CERTIFICATE to the wireless power transmitting device.

Referring to FIG. 39, after transmitting every packet of the sequence, the wireless power transmitting device stands by transmission of ACK/NACK or continue/stop from the wireless power receiving device. ACK/NACK or continue/stop is included and transmitted in the extended CEP of FIG. 39. The wireless power transmitting device and/or receiving device repeat(s) the following procedure until transmitting all packets of the sequence.

If the wireless power transmitting device receives "ACK and continue", the wireless power transmitting device transmits a next packet. For example, for a packet 1, the wireless power transmitting device may receive "ACK and continue" through the extended CEP, and for a packet m, the wireless power transmitting device may receive "ACK and continue" through the extended RPP of FIG. 42.

If the wireless power transmitting device receives "ACK and stop", the wireless power transmitting device stands by until receiving a next extended CEP including "ACK and continue". For example, for a packet n, the wireless power transmitting device receives "ACK and stop" through an extended CEP.

If the wireless power transmitting device receives "NACK and continue", the wireless power transmitting device retransmits a previous packet.

If the wireless power transmitting device receives "NACK and stop", the wireless power transmitting device stands by until receiving a next extended CEP including "ACK and continue".

FIG. 40 illustrates a structure of the extended CEP according to an embodiment.

Referring to FIG. 40, the wireless power receiving device transmits the extended CEP in response to the packet of the wireless power transmitting device. In this case, the extended CEP includes at least one of ACK/NACK or continue/stop as well as a control error value that adjusts an operating point of the wireless power transmitting device.

For example, the stop is configured with 1 bit, and when a value thereof is Tb, it indicates that the wireless power transmitting device stops transmission of a packet, and when a value thereof is '0'b, it indicates that the wireless power transmitting device transmits (i.e., continue of transmission) a next packet of a sequence. Here, in order for the wireless power receiving device to quickly adjust an operating point of the wireless power transmitting device, when it is necessary to transmit a CEP with a short period or when receiving all response packets, the wireless power receiving device may set stop to 1 to enforce the wireless power transmitting device to suspend transmission of a packet in a next sequence.

ACK/NACK is configured with, for example, 4 bit, and when a value thereof is '0000'b, the value may indicate ACK, and when a value thereof is '1111'b, the value may indicate NACK. ACK represents that the wireless power receiving device successfully receives a packet without an error condition, and NACK represents that the wireless power receiving device requests retransmission of a packet to the wireless power transmitting device due to occurrence of a packet reception error.

FIG. 41 illustrates a structure of an end power transfer (EPT) packet according to an embodiment.

Referring to FIG. 41, the EPT packet corresponding to a header value 0x02 may indicate a code value required for an authentication procedure. For example, when authentication of the wireless power transmitting device is failed, the wireless power receiving device may set an EPT code value to indicate a code value different from an existing code value as in 0x0E. By transmitting a new EPT code value, the wireless power receiving device may remove power transfer.

FIG. 42 illustrates a structure of the extended received power packet according to an embodiment.

Referring to FIG. 42, the extended received power packet is configured with 24 bits and may include a first reserved bit, a mode, a received power value, a second reserved bit, stop, and ACK/NACK. That is, the extended received power packet includes a received power value related to FOD of the wireless power transmitting device and includes at least one of ACK/NACK or continue/stop.

For example, the stop is configured with 1 bit, and when a value thereof is Tb, the wireless power transmitting device stops transmission of a packet, and when a value thereof is '0'b, the wireless power transmitting device transmits (i.e., continue of transmission) a next packet of a sequence. Here, in order for the wireless power receiving device to quickly adjust an operating point of the wireless power transmitting device, when it is necessary to transmit a CEP with a short period or when receiving all response packets, the wireless power receiving device may set stop to 1 to enforce the wireless power transmitting device to suspend transmission of a packet in a next sequence.

ACK/NACK is configured with, for example, 4 bits, and when a value thereof is '0000'b, the value may indicate ACK, and when a value thereof is '1111'b, the value may indicate NACK. ACK represents that the wireless power receiving device successfully receives a packet without an error condition, and NACK represents that the wireless power receiving device requests retransmission of a packet to the wireless power transmitting device due to occurrence of a packet reception error.

2) Authentication of the Wireless Power Receiving Device by the Wireless Power Transmitting Device (Authentication of PRx by PTx)

When the wireless power transmitting device is an authentication initiator, the wireless power receiving device becomes an authentication responder. Alternatively, the wireless power receiving device may be represented with a (authentication) target device. As an authentication initiator, the wireless power transmitting device transmits a message (or packet) required for authentication of the wireless power receiving device as a message (or packet) requesting to the wireless power receiving device. An authentication responder, the wireless power receiving device transmits an authentication response message configured with a sequence of several packets to the wireless power transmitting device. A transmitting and receiving process of such a series of messages may be defined by a packet transmission protocol of a lower level.

Figure 43:
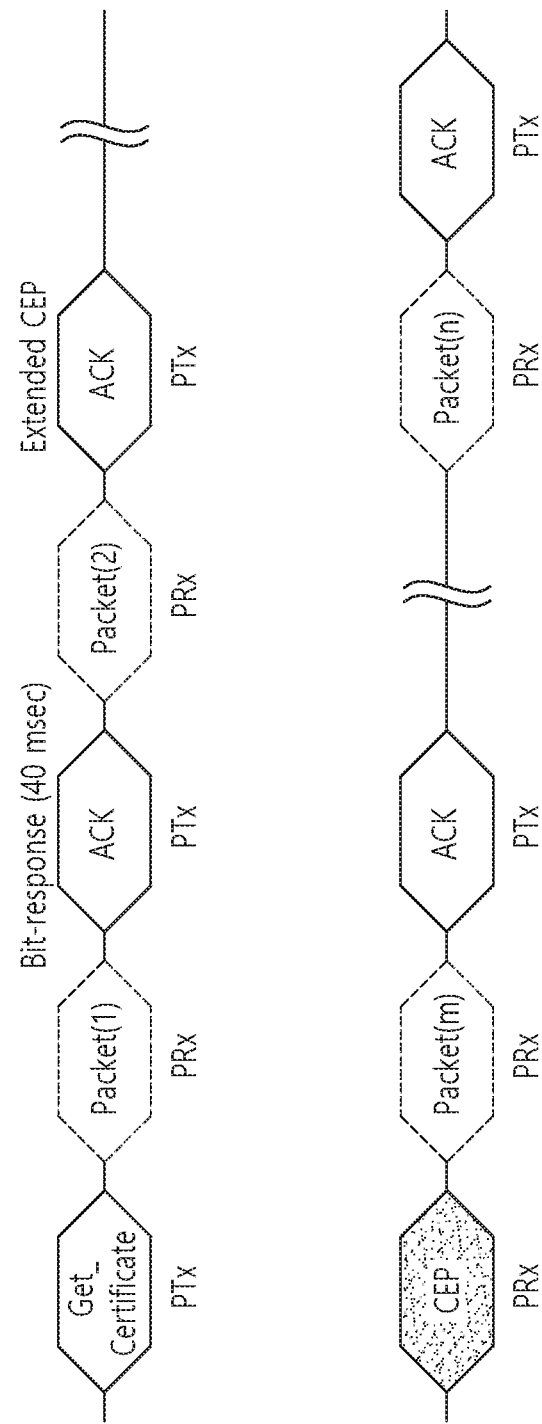
FIG. 43 illustrates a transmission and reception sequence of a packet between the wireless power receiving device and transmitting device from a lower level viewpoint according to an embodiment.

FIG. 43 illustrates a transmission and reception sequence of a packet between the wireless power receiving device and transmitting device from a lower level viewpoint according to an embodiment. FIG. 43 illustrates a process in which the wireless power receiving device transmits an authentication response packet (CERTIFICATE) to the wireless power transmitting device when the wireless power transmitting device transmits GET_CERTIFICATE to the wireless power receiving device.

Referring to FIG. 43, after transmitting every packet of the sequence, the wireless power receiving device stands by transmission of ACK/NACK (bit-pattern response) from the wireless power transmitting device. A bit response time may be, for example, 40 ms. The wireless power transmitting device and/or receiving device may repeat the following procedure until transmitting all packets of the sequence. Between the authentication response packets, the wireless power receiving device may transmit the CEP and/or the RPP.

If the wireless power receiving device receives 'ACK', the wireless power receiving device transmits a next packet. For example, for a packet 1, when the wireless power receiving device receives ACK, the wireless power receiving device transmits a packet 2 at next transmission timing.

If the wireless power receiving device receives 'NACK', the wireless power receiving device retransmits a previous packet.

(2) Protocol for Data Transaction in a Lower Level

Hereinafter, a data transaction protocol will be described. For data transaction in a lower level, the present embodiment may consider four rules.

Rule 1 is that the wireless power receiving device operates as a master. When the wireless power receiving device operates as a master and the wireless power transmitting device operates as a slave, the wireless power receiving device determines when communication of the wireless power transmitting device is allowed.

The wireless power receiving device may transmit a start of data stream (SOD) ADT_CTRL packet to inquire whether there is data stream in which the wireless power transmitting device is to transmit. Alternatively, in order to pool to the wireless power transmitting device on whether there is a packet in which the wireless power transmitting device is to transmit, the wireless power receiving device may transmit a general request packet (GRP) in which a request is set to '0xFF'.

Rule 2 is communication error control. The wireless power receiving device or transmitting device may rewrite an ADT packet until receiving ACK. Further, when a communication error does not occur, an "ACK" ADT_CTRL packet is transmitted, and when a communication error is detected, a "NACK" ADT_CTRL packet is transmitted.

Rule 3 is synchronization of data stream. For synchronization, whenever a new data packet is transmitted, a header of the ADT data packet may be toggled.

Rule 4 is to mark the end of data stream or to mark the end and the start of data stream. Specifically, a start of the data stream (SOD) ADT_CTRL packet may be added to the start of the data stream. Alternatively, an end of data stream (EOD) ADT_CTRL packet may be added to the end of the data stream. Here, the SOD and the EOD may be added when a length of the data stream is greater than 1 packet.

Data transport and a packet structure based on the above rules may be defined as follows.

1) Data Transport and Packet Structure of a Lower Level for Authentication

Hereinafter, low level data transport and packet structure for authentication will be described in detail. Two design methods of the low level data transport include a dedicated mapping method and a generic bit pipe method. The generic bit pipe method has the advantage that the generic bit pipe method provides application-agnostic data transmission and may be used for other applications in the future in addition to authentication.

Design requirements for a general bit pipe based low level data transport is i) to minimize an interaction between a high level and a low level and ii) to ensure an error-recovery and synchronized low level data transport. In relation to i), a higher level encodes data stream to push the data stream to a lower level (write) and decodes the data stream provided from the low level (read). Further, the lower level writes or reads data stream using a plurality of auxiliary data transport (ADT) data packets (write/read). In relation to ii), a simple and robust communication-error-recovery mechanism include an operating of rewriting an ADT packet until the wireless power transmitting device or receiving device receives ACK and an operating of re-reading the ADT packet until there is no communication error. Further, simple synchronization of data stream between the wireless power transmitting device and receiving device includes an operation of toggling a header of the data packet when transporting a new ADT data packet.

Figure 44:
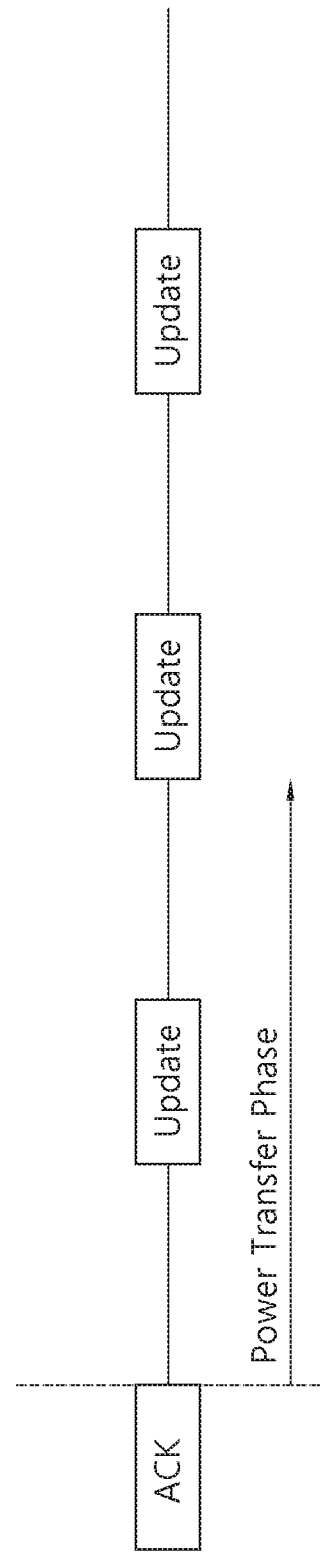
FIG. 44 illustrates data transport according to an embodiment.

FIG. 44 illustrates data transport according to an embodiment. FIG. 44 illustrates update transport data (UDT).

Referring to FIG. 44, UDT is used for carrying update data. The update data includes some data packets. For example, the update data may include a control error packet (CEP), a received power packet (RPP) optionally including ACK or NACK, auxiliary data transport (ADT), a charge status packet (CSP), a proprietary packet, a renegotiation (RNG) packet optionally including ACK or NACK, and a reserved packet (the wireless power transmitting device should be resilient to reserved bits).

The ADT is a low level data packets or transport for a higher level application and includes the same logical layer packet as that of a capability packet of the wireless power transmitting device.

Figure 45:
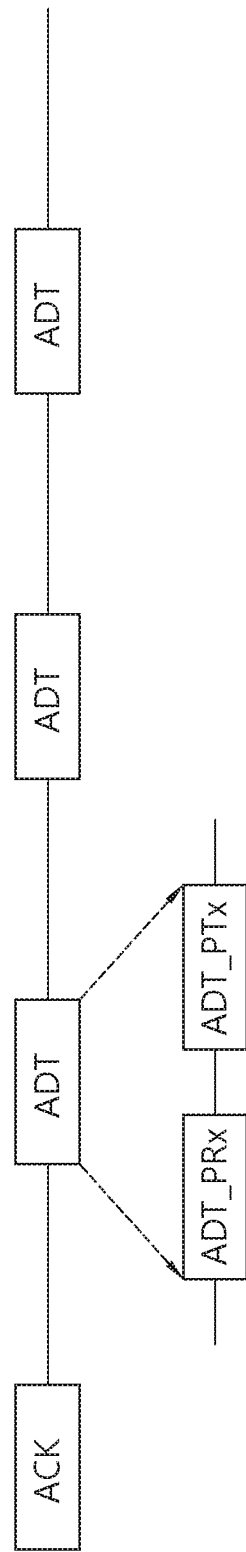
FIG. 45 illustrates data transport according to another embodiment.

FIG. 45 illustrates data transport according to another embodiment. FIG. 45 illustrates auxiliary data transport (ADT).

Referring to FIG. 45, the ADT includes ADT (ADT_PRx) of the wireless power receiving device and ADT (ADT_PTx) of the wireless power transmitting device.

The ADT of the wireless power receiving device carries data, a response (e.g., ACK, NACK, RFA) packet, or a control packet from the wireless power receiving device.

The ADT of the wireless power transmitting device carries data, a response (e.g., ACK, NACK, RFA) packet, a control packet, or an ACK/NACK/RFA bit pattern response from the wireless power transmitting device.

As an example, the header of the ADT packet may indicate a lower level data packet for a higher level application (e.g., a low level data packet of the wireless power receiving device and a low level data packet of the wireless power transmitting device). The higher level application may include, for example, an authentication procedure, proprietary information exchange, firmware update, and power capability control of the wireless power transmitting device.

As another example, the header of the ADT packet may indicate a logical layer data packet (e.g., a packet of the wireless power receiving device or a packet of the wireless power transmitting device). As another example, the header of the ADT packet may include a control packet.

As another example, the header of the ADT packet may indicate an ADT data packet, and in this case, the header of the ADT data packet may include multiple types of headers (e.g., two types of headers such as a header A and a header B). Whenever a new ADT data packet is transmitted, the header of the ADT data packet is toggled to A→B or B→A and thus synchronization of the data stream may be achieved.

As another example, the header of the ADT packet may indicate an ADT control packet, and in this case, the header of the ADT packet may include a single type of header.

Hereinafter, an ADT packet structure as low level data transport will be described. As described above, the ADT is configured with a pair of ADT (ADT_PRx) of the wireless power receiving device and ADT (ADT_PTx) of the wireless power transmitting device, and the ADT (ADT_PRx) of the wireless power receiving device will be first described.

Figure 46:
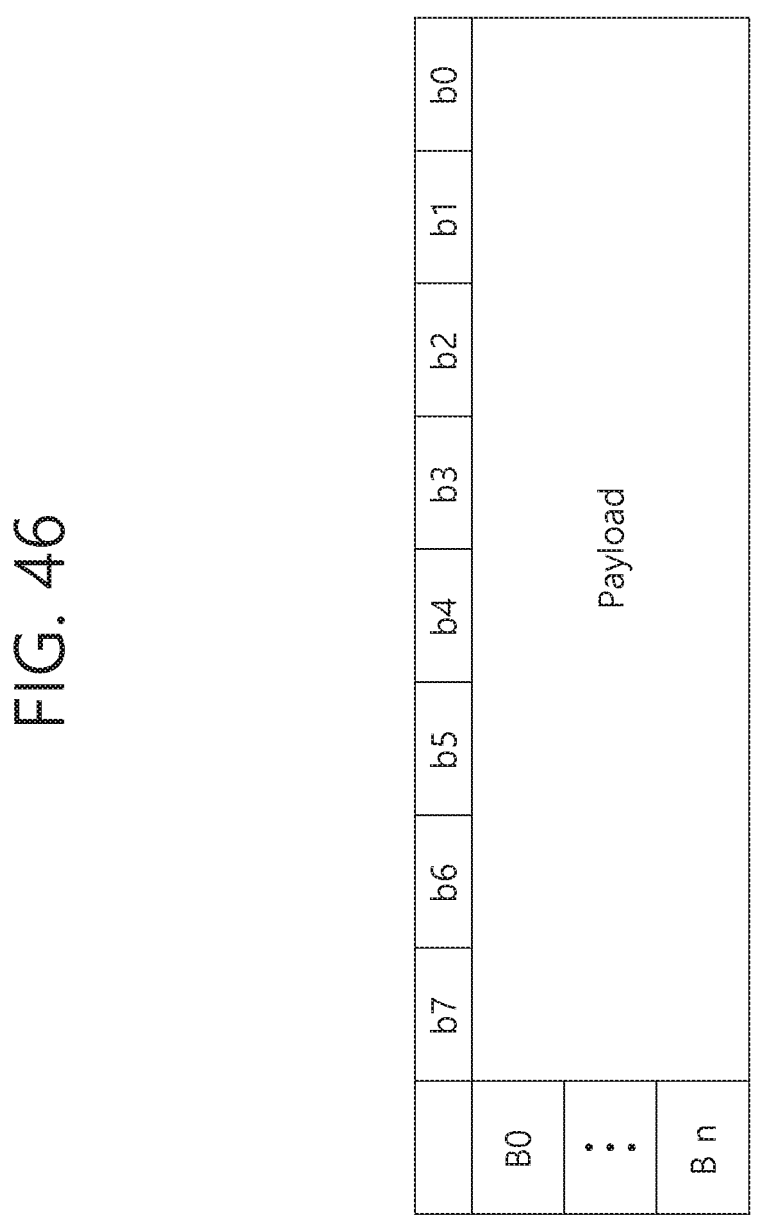

FIG. 46 illustrates a structure of an ADT data packet (ADT_PRx data packet) of the wireless power receiving device according to an embodiment.

Referring to FIG. 46, the ADT data packet includes, for example, (n+1) bytes of payload, and each payload may correspond to any one of a plurality of header types. Table 10 represents a corresponding relationship between a header and a payload size (when n=15, maximum 16 bytes) of the ADT data packet.

TABLE 10

| Payload Size (byte) | Header A | Header B |
| --- | --- | --- |
| 1 | 0x1C | 0x1D |
| 2 | 0x2C | 0x2D |
| 3 | 0x3C | 0x3D |
| 4 | 0x4C | 0x4D |
| ... | ... | ... |
| 13 | 0xAC | 0xAD |
| 14 | 0xB4 | 0xB5 |
| 15 | 0xBC | 0xBD |
| 16 | 0xC4 | 0xC5 |

Referring to Table 10, when a payload of a particular byte is included and transmitted in the ADT data packet, a header A or B may be used. A payload size may be 1 byte to 16 bytes. When transmitting a new data packet and retransmitting an immediately preceding ADT data packet, the wireless power receiving device and the wireless power transmitting device specifically promise a pattern of a header value to pursue synchronization therebetween. For example, in a situation in which the wireless power receiving device transmits 1 byte of payload to the ADT data packet, when the wireless power receiving device transmits a new ADT data packet, the wireless power receiving device toggles a header value from the header A (=0x1C) to the header B (=0x1D) or from the header B (=0x1D) to the header A (=0x1C), and when the wireless power receiving device retransmits the immediately preceding ADT data packet, the wireless power receiving device may maintain an immediately preceding header value. A situation of retransmitting the immediately preceding ADT data packet may be when the wireless power receiving device receives a NACK response from the wireless power transmitting device or when the wireless power receiving device finds a decoding error of the wireless power transmitting device.

Figure 47:
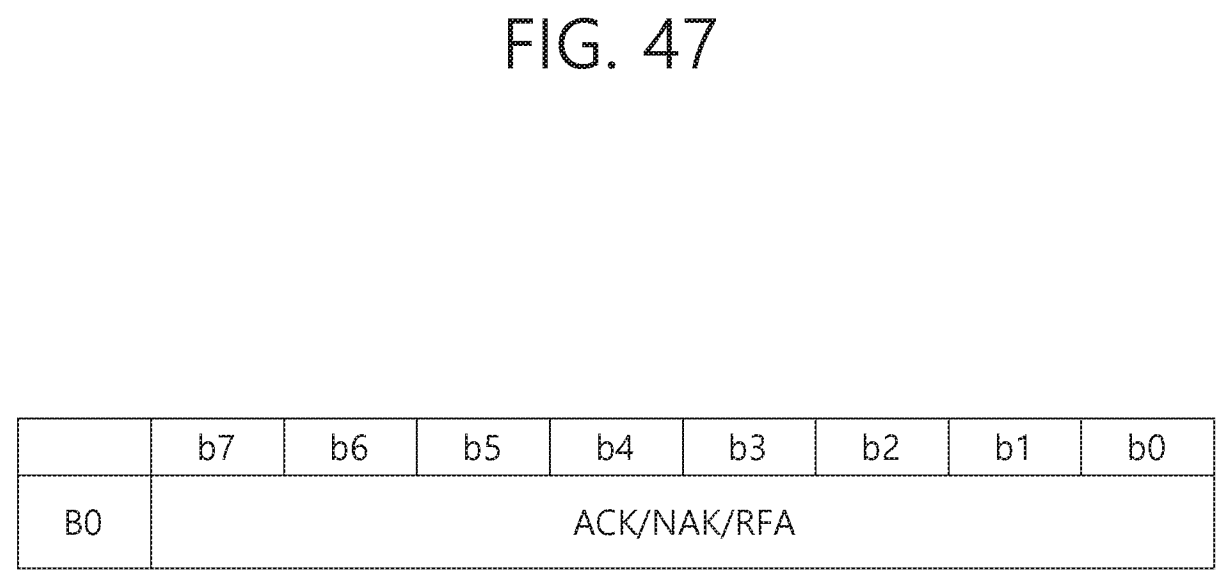

FIG. 47 illustrates a structure of an ADT response packet (ADT_PRx response packet) of the wireless power receiving device according to an embodiment.

Referring to FIG. 47, the ADT response packet of the wireless power receiving device is configured with, for example, 1 byte, and a value thereof may indicate ACK, NACK, and RFA. Table 11 represents the corresponding relationship between a payload value of the ADT response packet and indication content thereof.

TABLE 11

| Payload value | Indication content |
| --- | --- |
| '11111111'b | ACK |
| '00000000'b | NACK |
| '00110011'b | RFA |

In Table 11, when a payload value is '11111111'b, the payload value represents that the wireless power receiving device has successfully received and decoded the ADT data packet transmitted by the wireless power transmitting device at an immediately preceding ADT (ACK). When the payload value is '00000000'b, the payload value represents that the wireless power receiving device has not successfully received and decoded the ADT data packet transmitted by the wireless power transmitting device at an immediately preceding ADT (NACK). In this case, the wireless power transmitting device retransmits the immediately preceding ADT data packet at a current ADT, and in this case, the header of the ADT data packet has a value corresponding to retransmission of the immediately preceding data packet (e.g., 0x1C). When the payload value is '00110011'b, the payload value represents that the wireless power receiving device requests to transmit response data to the wireless power transmitting device (RFA). In Table 11, the payload value and instruction content thereof are an example, and as a payload value corresponding to each instruction content, different values may be used and correspond to the technical scope of the present invention.

An ADT control packet structure of the wireless power receiving device may be the same as that of FIG. 47.

Figure 48:
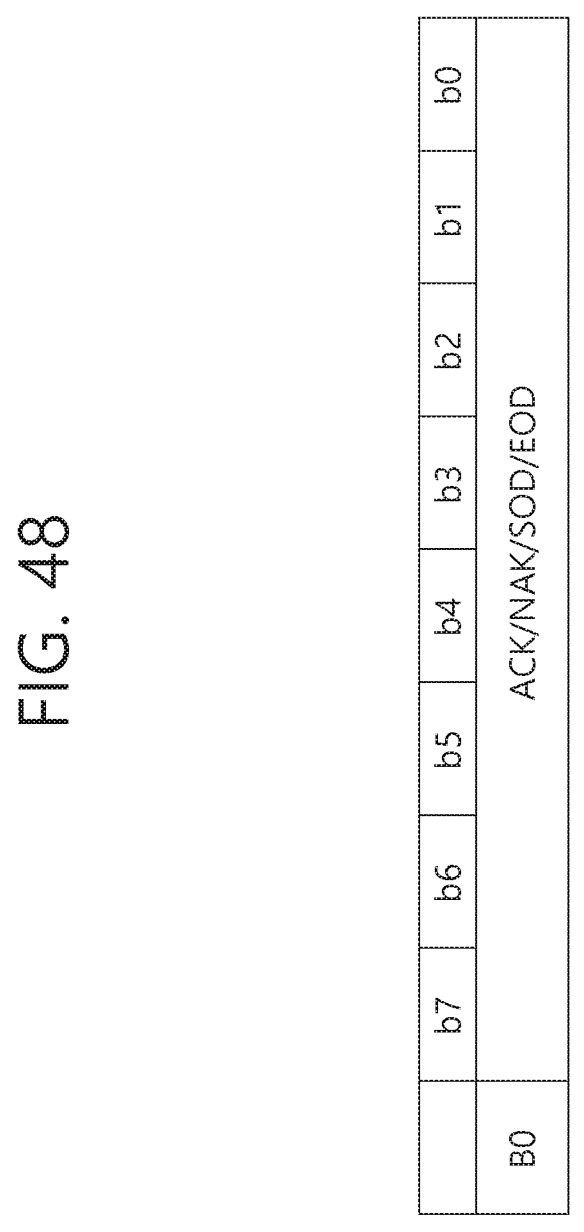

FIG. 48 illustrates a structure of an ADT control packet (ADT_PRx control packet) of the wireless power receiving device according to an embodiment.

Referring to FIG. 48, the ADT control packet of the wireless power receiving device is configured with, for example, 1 byte, and a value thereof may indicate ACK, NACK, SOD, and EOD. Table 12 represents the corresponding relationship between a payload value of the ADT control packet and an instruction content thereof.

TABLE 12

| Payload value | Indication content |
| --- | --- |
| '11111111'b | ACK |
| '00000000'b | NACK |
| '00110011'b | SOD |
| '11001100'b | EOD |

In Table 12, when the payload value is '11111111'b, the payload value represents that the wireless power receiving device has successfully received and decoded the ADT data packet transmitted by the wireless power transmitting device at an immediately preceding ADT (ACK). When the payload value is '00000000'b, the payload value represents that the wireless power receiving device has not successfully received and decoded the ADT data packet transmitted by the wireless power transmitting device at an immediately preceding ADT (NACK). In this case, the wireless power transmitting device retransmits the immediately preceding ADT data packet at a current ADT, and in this case, the header of the ADT data packet has a value corresponding to retransmission of the immediately preceding data packet (e.g., 0x1C). When the payload value is '00110011'b, the payload value represents a request of the start of ADT data stream (SOD). When the payload value is '11001100'b, the payload value represents the end of the ADT data stream (EOD).

In Table 12, the payload value and instruction content thereof are an example, and as a payload value corresponding to each instruction content, different values may be used and correspond to the technical scope of the present invention.

Hereinafter, ADT (ADT_PTx) of the wireless power transmitting device will be described.

Figure 49:
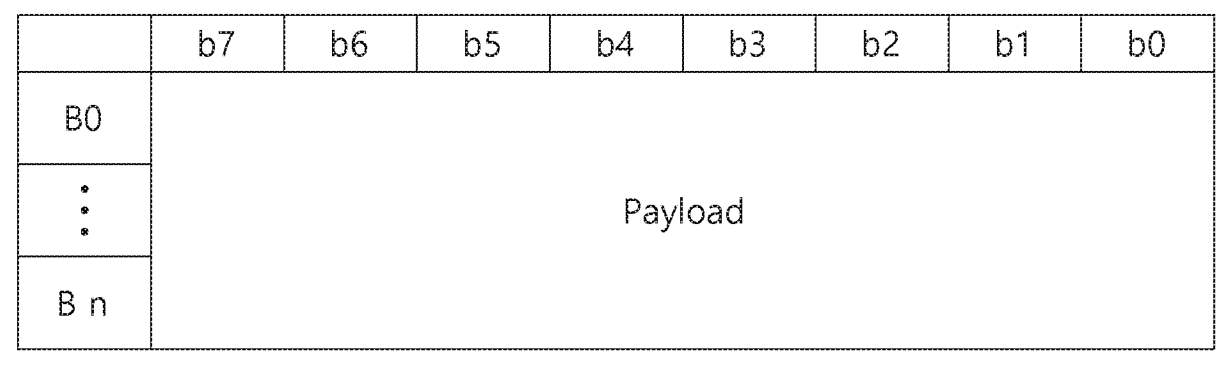

FIG. 49 illustrates a structure of an ADT data packet (ADT_PTx data packet) of the wireless power transmitting device according to an embodiment.

Referring to FIG. 49, the ADT data packet includes, for example, (n+1) bytes of payload, and each payload may correspond to any one of multiple header types. Table 13 represents the corresponding relationship between a header and a payload size of the ADT data packet (when n=3, maximum 4 bytes).

TABLE 13

| Payload Size (byte) | Header A | Header B |
|---|---|---|
| 1 | 0x1C | 0x1D |
| 2 | 0x2C | 0x2D |
| 3 | 0x3C | 0x3D |
| 4 | 0x4C | 0x4D |

Referring to Table 13, when a payload of a particular byte is included and transmitted in the ADT data packet, a header A or B may be used. A payload size may be 1 byte to 4 bytes. The wireless power transmitting device and the wireless power receiving device may pursue synchronization between each other by specifically promising a pattern of a header value when transmitting a new ADT data packet and when retransmitting an immediately preceding ADT data packet. For example, in a situation where the wireless power transmitting device transmits 1 byte of payload to the ADT data packet, when transmitting a new ADT data packet, the wireless power transmitting device may toggle a header value from a header A (=0x1C) to a header B (=0x1D) or from a header B (=0x1D) to a header A (=0x1C), and when retransmitting an immediately preceding ADT data packet, the wireless power transmitting device may maintain an immediately preceding header value. A situation of retransmitting the immediately preceding ADT data packet may be when the wireless power transmitting device receives a NACK response from the wireless power receiving device or when the wireless power transmitting device finds a decoding error of the wireless power receiving device.

Figure 50:
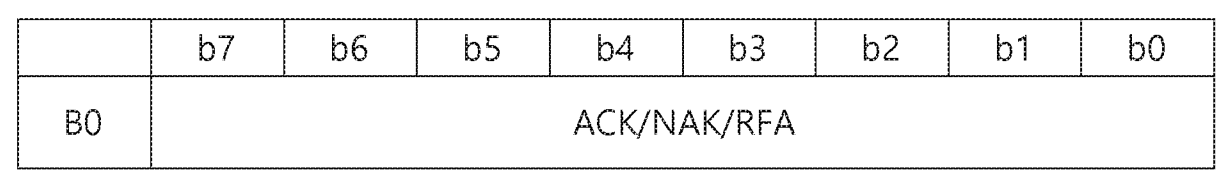

FIG. 50 illustrates a structure of an ADT response packet (ADT_PTx response packet) of the wireless power transmitting device according to an embodiment.

Referring to FIG. 50, the ADT response packet of the wireless power transmitting device is configured with, for example, 1 byte, and a value thereof may indicate ACK, NACK, and RFA. Table 14 represents the corresponding relationship between a payload value of the ADT response packet and indication content thereof.

TABLE 14

| Payload value | Indication content |
|---|---|
| '11111111'b | ACK |
| '00000000'b | NACK |
| '00110011'b | RFA |

In Table 14, when a payload value is '11111111'b, the payload value represents that the wireless power transmitting device has successfully received and decoded an ADT data packet transmitted by the wireless power receiving device at an immediately preceding ADT (ACK). When the payload value is '00000000'b, the payload value represents that the wireless power transmitting device has not successfully received and decoded an ADT data packet transmitted by the wireless power receiving device at an immediately preceding ADT (NACK). In this case, the wireless power receiving device retransmits the immediately preceding ADT data packet at a current ADT, and in this case, the header of the ADT data packet has a value corresponding to retransmission of the immediately preceding data packet (e.g., 0x1C). When the payload value is '00110011'b, the payload value represents that the wireless power transmitting device requests the wireless power receiving device to provide a ADT transaction (RFA). In Table 14, the payload value and instruction content thereof are an example, and as a payload value corresponding to each instruction content, different values may be used and correspond to the technical scope of the present invention.

Figure 51:
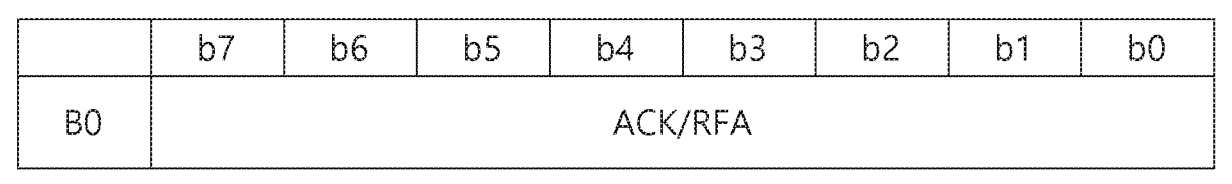

FIG. 51 illustrates a structure of an ADT response/control packet (ADT_PTx response/control packet) of the wireless power transmitting device according to an embodiment.

Referring to FIG. 51, the ADT response packet of the wireless power transmitting device is configured with, for example, 1 byte, and a value thereof may indicate ACK and RFA. Table 15 represents the corresponding relationship between a payload value of the ADT response packet and indication content thereof.

TABLE 15

| Payload value | Indication content |
|---|---|
| '11111111'b | ACK |
| '00110011'b | RFA |

In Table 15, when the payload value is '11111111'b, the payload value represents that the wireless power transmitting device has successfully received and decoded an ADT data packet transmitted by the wireless power receiving device at an immediately preceding ADT (ACK). When the payload value is '00110011'b, the payload value represents that the wireless power transmitting device requests to transmit response data to the wireless power receiving device (RFA). According to the present embodiment, when the wireless power transmitting device has not successfully received and decoded an ADT data packet transmitted by the wireless power receiving device at an immediately preceding ADT, the wireless power transmitting device does not transmit a separate communication error signal (NACK). In Table 15, the payload value and the instruction content thereof are an example, as a payload value corresponding to each instruction content, different values may be used and correspond to the technical scope of the present invention.

Figure 52:
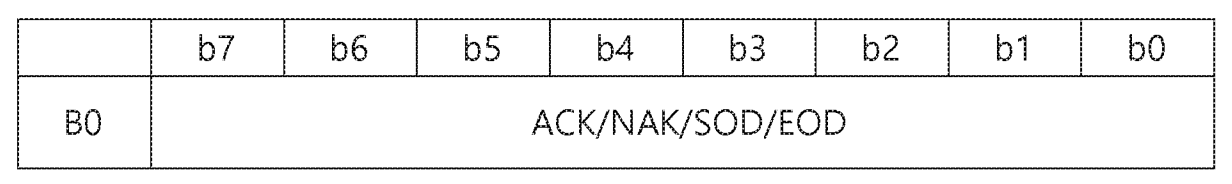

FIG. 52 illustrates a structure of an ADT control packet (ADT_PTx control packet) of a wireless power transmitting device according to an embodiment.

Referring to FIG. 52, the ADT control packet of the wireless power transmitting device is configured with, for example, 1 byte, and a value thereof may indicate ACK, NACK, SOD, and EOD. Table 16 represents the corresponding relationship between a payload value of the ADT control packet and instruction content thereof.

TABLE 16

| Payload value | Indication content |
|---|---|
| '11111111'b | ACK |
| '00000000'b | NACK |
| '00110011'b | SOD |
| '11001100'b | EOD |

In Table 16, when a payload value is '11111111'b, the payload value represents that the wireless power transmitting device has successfully received and decoded an ADT data packet transmitted by the wireless power receiving device at an immediately preceding ADT (ACK). When a payload value is '00000000'b, the payload value represents that the wireless power transmitting device has not successfully received and decoded an ADT data packet transmitted by the wireless power receiving device at an immediately preceding ADT (NACK). In this case, the wireless power receiving device retransmits an immediately preceding ADT data packet in a current ADT, and in this case, the header of the ADT data packet has a value corresponding to retransmission of the immediately preceding data packet (e.g., 0x1C). When the payload value is '00110011'b, the payload value represents a request of the start of ADT data stream (SOD). When the payload value is '11001100'b, the payload value represents the end of the ADT data stream (EOD). In Table 16, the payload value and the indication content are an example, and as a payload value corresponding to each instruction content, different values may be used and correspond to the technical scope of the present invention.

The following description discloses embodiments of implementing an authentication sequence based on data transport and a packet structure of the same low level as that of the above-described ADT.

2) Data Transaction Sequence of a Lower Level for Authentication (Based on ADT)

Figure 53:
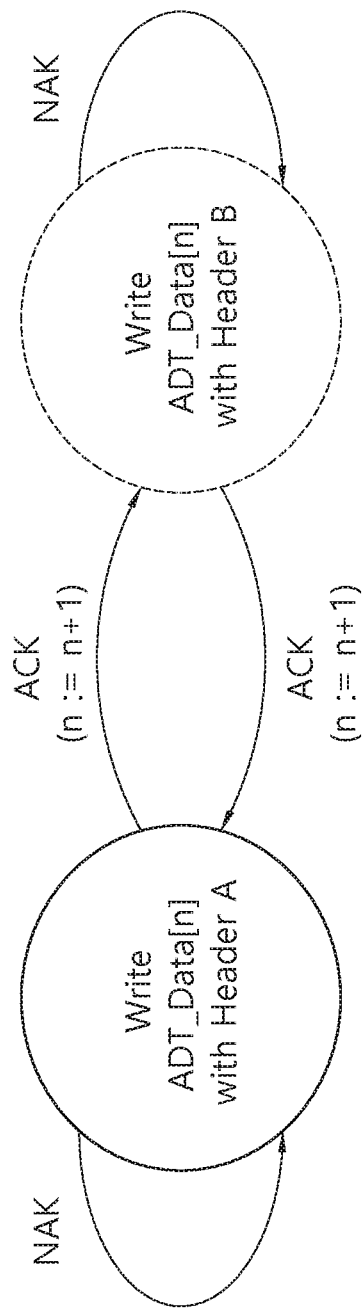
FIG. 53 is a diagram illustrating a state machine of ADT data packet write according to an embodiment.

FIG. 53 is a diagram illustrating a state machine on ADT data packet write according to an embodiment.

Referring to FIG. 53, the transmission side and/or the receiving side performs synchronization of data stream according to the rule 3, as shown in FIG. 53. That is, whenever a new ADT data packet [n] is transmitted for synchronization, a header of the ADT data packet [n] may be toggled. The header of the ADT packet may indicate the ADT data packet, and in this case, the header of the ADT data packet may include multiple types of headers (e.g., two types of headers of a header A and a header B). Whenever a new ADT data packet is transmitted successfully (ACK), the header of the ADT data packet is toggled to A→B or B→A and thus synchronization of the data stream may be achieved. When the wireless power receiving device receives a NACK response from the wireless power transmitting device or when the wireless power receiving device finds a decoding error of the wireless power transmitting device, the wireless power receiving device retransmits an immediately preceding ADT data packet, and in this case, an immediately preceding header value may be maintained.

2-1) Authentication of the Wireless Power Transmitting Device by the Wireless Power Receiving Device (Authentication of PTx by PRx)

As an ADT-based low level authentication sequence, authentication of the wireless power receiving device by the wireless power receiving device (PRx=Initiator/PTx=Responder) will be first described.

Figure 54:
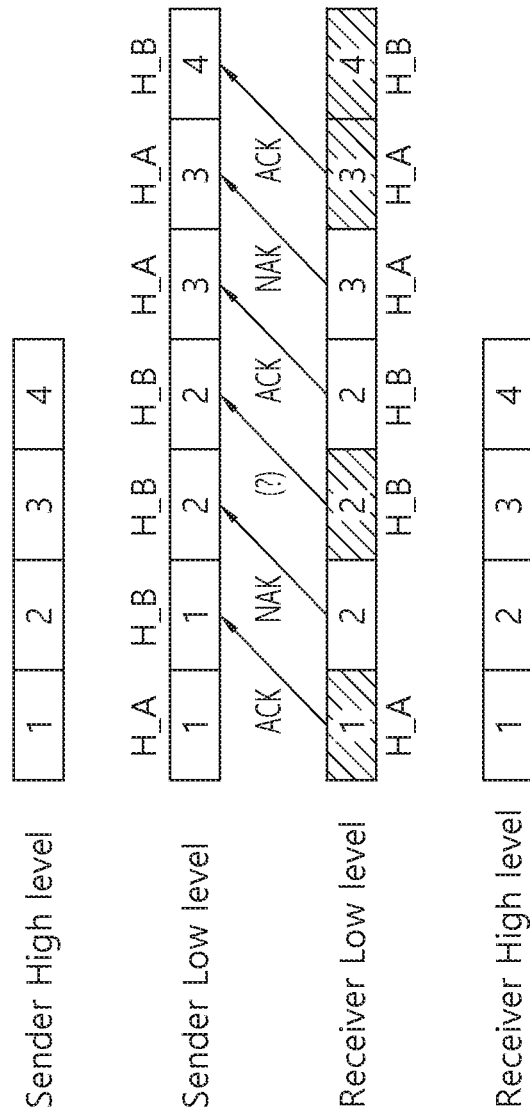
FIG. 54 illustrates a transmission sequence of a high level and a low level of a wireless power transmitting device and a wireless power receiving device upon exchanging an ADT data packet according to an embodiment.

FIG. 54 illustrates a transmission sequence of a high level and a low level of a wireless power transmitting device and the wireless power receiving device upon exchanging an ADT data packet according to an embodiment.

Referring to FIG. 54, H_A represents an A-type header, and H_B represents a B-type header. In the wireless power receiving device (sender), when data 1 of a higher level are transmitted to a lower level and are transmitted to the wireless power transmitting device together with the header A, a lower level of the wireless power transmitting device transmits data 1 to the upper level. When reception of the data 1 is successful, the wireless power transmitting device transmits ACK of the data 1 to the wireless power receiving device. The wireless power receiving device transfers new data 2 from the higher level to the lower level and transmits the new 2 data together with the header B to the wireless power transmitting device, and in this case, when the wireless power transmitting device fails in reception of the data 2, the wireless power transmitting device transmits NACK to the wireless power receiving device. Because the wireless power receiving device received NACK, the wireless power receiving device retransmits the data 2 together with an immediately preceding header B. In this way, the wireless power receiving device and the wireless power transmitting device may obtain synchronization and implement simple and robust error recovery and synchronization mechanism.

Figure 55:
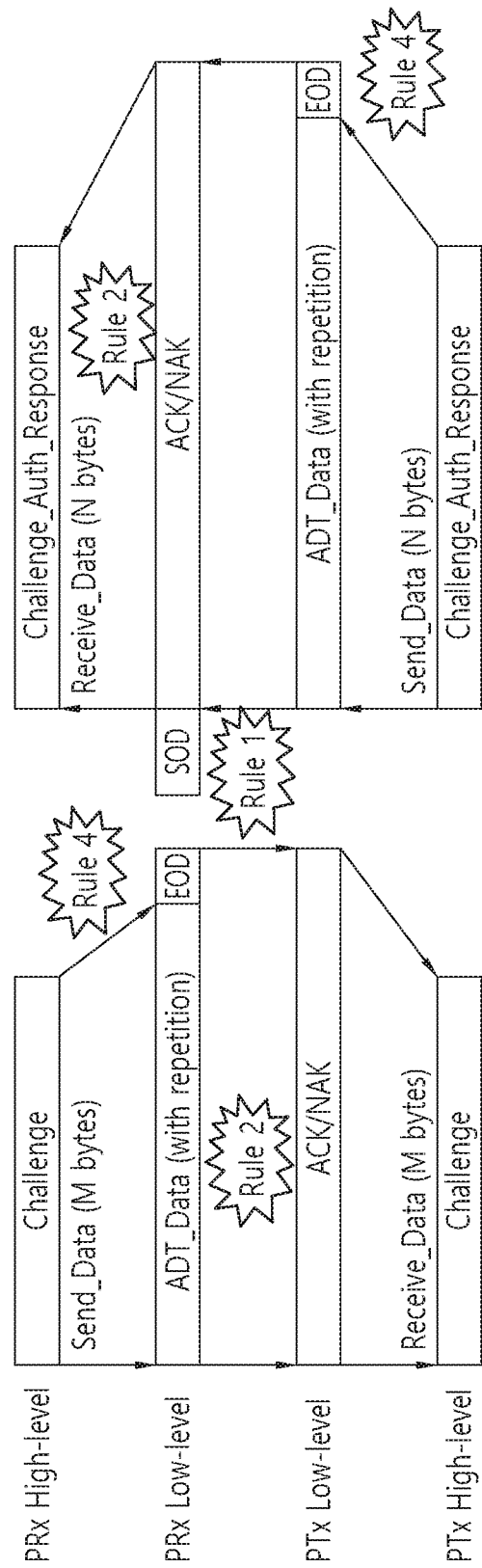
FIG. 55 illustrates a transmission sequence of a high level and a low level of a wireless power transmitting device and a wireless power receiving device upon exchanging an ADT data packet according to another embodiment.

FIG. 55 illustrates a transmission sequence of a high level and a low level of the wireless power transmitting device and the wireless power receiving device upon exchanging an ADT data packet according to another embodiment. Here, the wireless power receiving device is an authentication initiator, and the wireless power transmitting device is an authentication responder. ADT data packet exchange between the wireless power receiving device and transmitting device is performed according to the above (1) low level authentication sequence and (2) lower level data transaction protocol.

Referring to FIG. 55, the wireless power receiving device generates M bytes of CHALLENGE message at a high level to transfer the CHALLENGE message to the lower level, and the lower level loads the CHALLENGE message in the ADT data packet (or transport) and transmits the ADT data packet (or transport) to the wireless power transmitting device.

The ADT data packet of the CHALLENGE message according to the low level authentication sequence may be transmitted over several times, and while the ADT data packet is transmitted over several times according to the rule 2, the wireless power transmitting device transmits ACK/NACK on an ADT data packet of each turn at a lower level to the wireless power receiving device and transfers the ADT data packet to the higher level. When transmission of the CHALLENGE message (high level viewpoint) or the ADT data packet (lower level viewpoint) of the CHALLENGE message is complete through such a series of processes, the wireless power receiving device adds EOD to the end of the ADT data packet of the CHALLENGE message according to the rule 4 to notify completion of transmission.

The wireless power receiving device inquires whether there is data stream to be transmitted by the wireless power transmitting device, which is a slave according to the rule 1. For this reason, the wireless power receiving device may transmit the SOD. In this case, the wireless power receiving device may transmit repeatedly the SOD until the wireless power transmitting device responds to the data packet or until time-out occurs. When the wireless power transmitting device receives the SOD, the wireless power transmitting device generates N bytes of CHALLENGE_AUTH_RESPONSE at a high level to transfer the CHALLENGE_AUTH_RESPONSE to the lower level, and the lower level loads the CHALLENGE_AUTH_RESPONSE in the ADT data packet (or transport) and transmits the ADT data packet (or transport) to the wireless power receiving device.

The ADT data packet of the CHALLENGE_AUTH_RESPONSE message may be transmitted over several times according to a low level authentication sequence, and while the ADT data packet is transmitted over several times according to the rule 2, the wireless power receiving device transmits ACK/NACK of the ADT data packet of each turn at a lower level to the wireless power transmitting device and transfers the ADT data packet to the upper level. When transmission of a CHALLENGE_AUTH_RESPONSE message (high level viewpoint) or an ADT data packet (lower level viewpoint) of the CHALLENGE_AUTH_RESPONSE message is completed through such a series of process, the wireless power transmitting device adds EOD to the end of the ADT data packet of the CHALLENGE_AUTH_RESPONSE message according to the rule 4 to notify completion of transmission.

Figure 56:
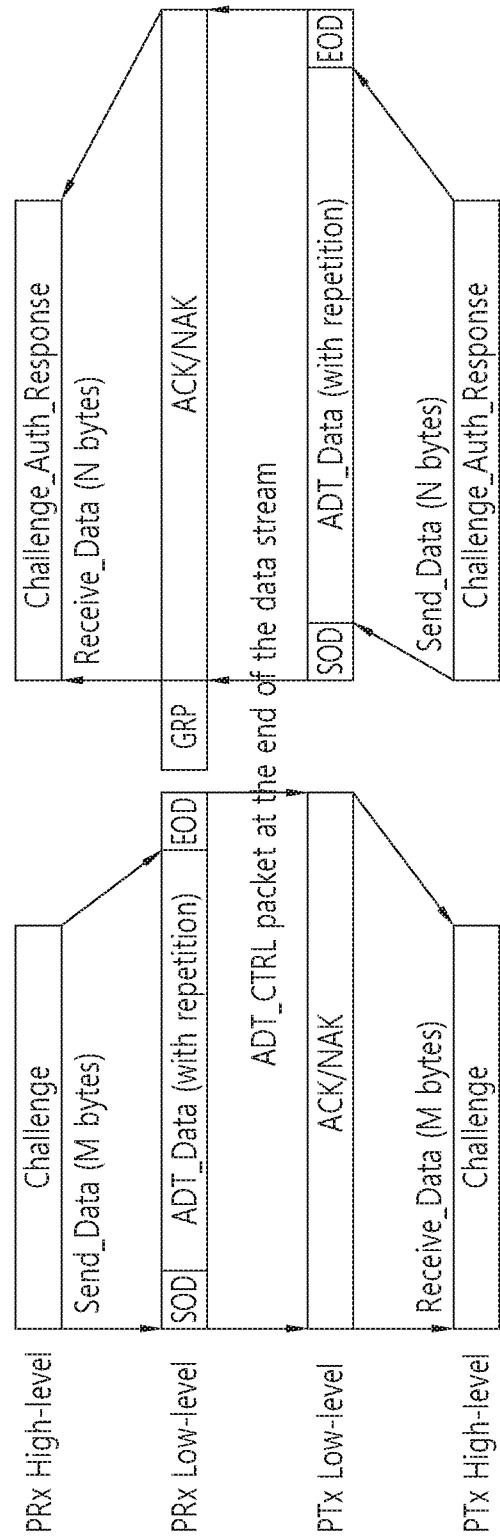
FIG. 56 illustrates a transmission sequence of a high level and a low level of a wireless power transmitting device and a wireless power receiving device upon exchanging an ADT data packet according to another embodiment.

FIG. 56 illustrates a transmission sequence of a high level and a low level of a wireless power transmitting device and the wireless power receiving device upon exchanging an ADT data packet according to another embodiment.

The embodiment of FIG. 56 is different from the embodiment of FIG. 55 in that addition of SOD and EOD according to the rule 4 is strictly followed and a general request packet (GRP) is used instead of SOD for inquiry (or polling) according to the rule 1 upon transmitting every ADT data packet.

Figure 57:
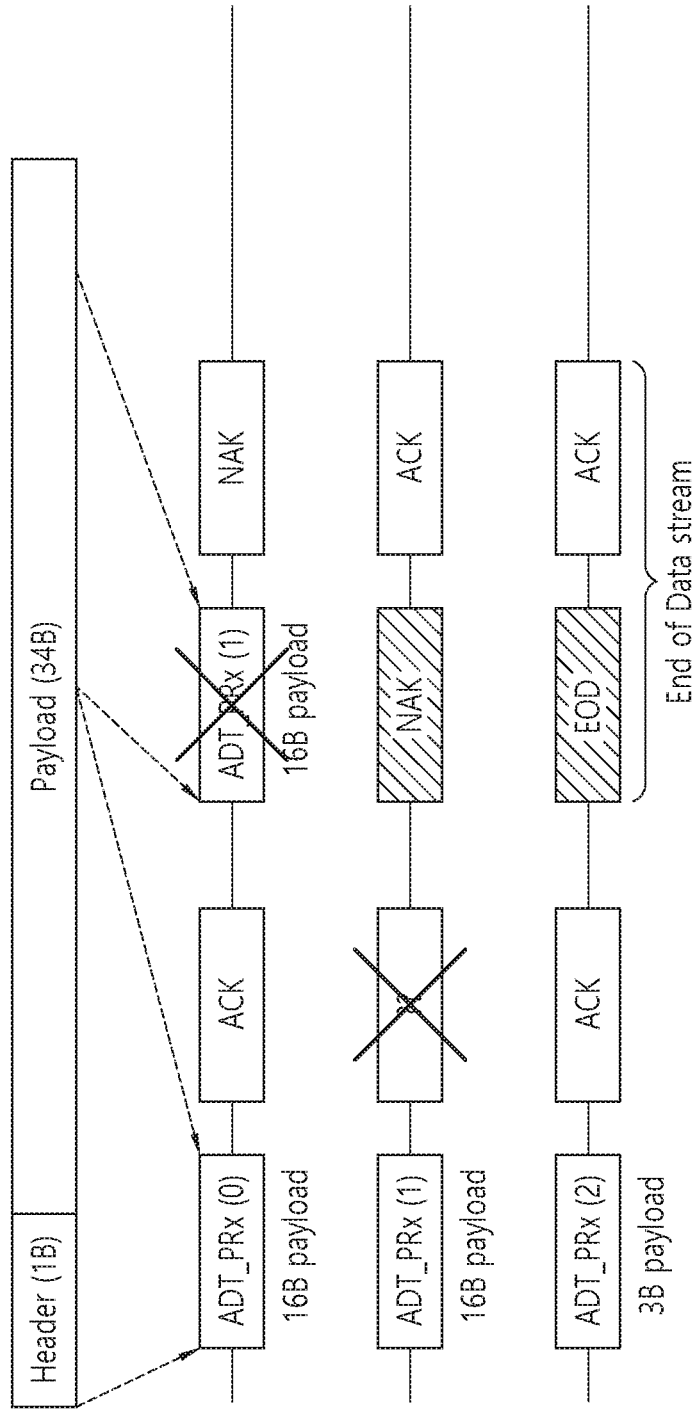
FIG. 57 illustrates an exchange sequence of an ADT data packet of an authentication request message according to an embodiment.

FIG. 57 illustrates an exchange sequence of an ADT data packet of an authentication request message according to an embodiment.

Referring to FIG. 57, when bit stream (i.e. 35 bytes) for an authentication message is prepared, the wireless power receiving device transmits an ADT data packet including a header (i.e. 1 byte) and a payload (i.e. 34 bytes) at a low level. Here, the authentication message may be, for example, a CHALLENGE message transmitted from the wireless power receiving device to the wireless power transmitting device.

Because the ADT data packet may be transmitted up to 16 bytes, 35 bytes of authentication message is divided and transmitted into 16 bytes of 0th ADT data packet (ADT_PRx (0)), 16 bytes of first ADT data packet (ADT_PRx (1)), and 3 bytes of second ADT data packet (ADT_PRx (2)).

First, in a first line, after successfully transmitting the 0th ADT data packet (ADT_PRx (0)), the wireless power receiving device receives ACK, but fails in transmission of the first ADT data packet (ADT_PRx (1)) and receives NACK. Thereafter, in a second line, the wireless power receiving device retransmits the first ADT data packet (ADT_PRx (1)), but fails in reception of a response (ACK or NACK) thereof and transmits NACK. Therefore, when the wireless power transmitting device responds to ACK, it is determined that retransmission of the first ADT data packet (ADT_PRx (1)) was successful and thus the wireless power receiving device successfully transmits the remaining 3 bytes of second ADT data packet (ADT_PRx (2)) and receives ACK. Therefore, the wireless power receiving device successfully transmits EOD and receives ACK, thereby ending transmission of the authentication message.

Figure 58:
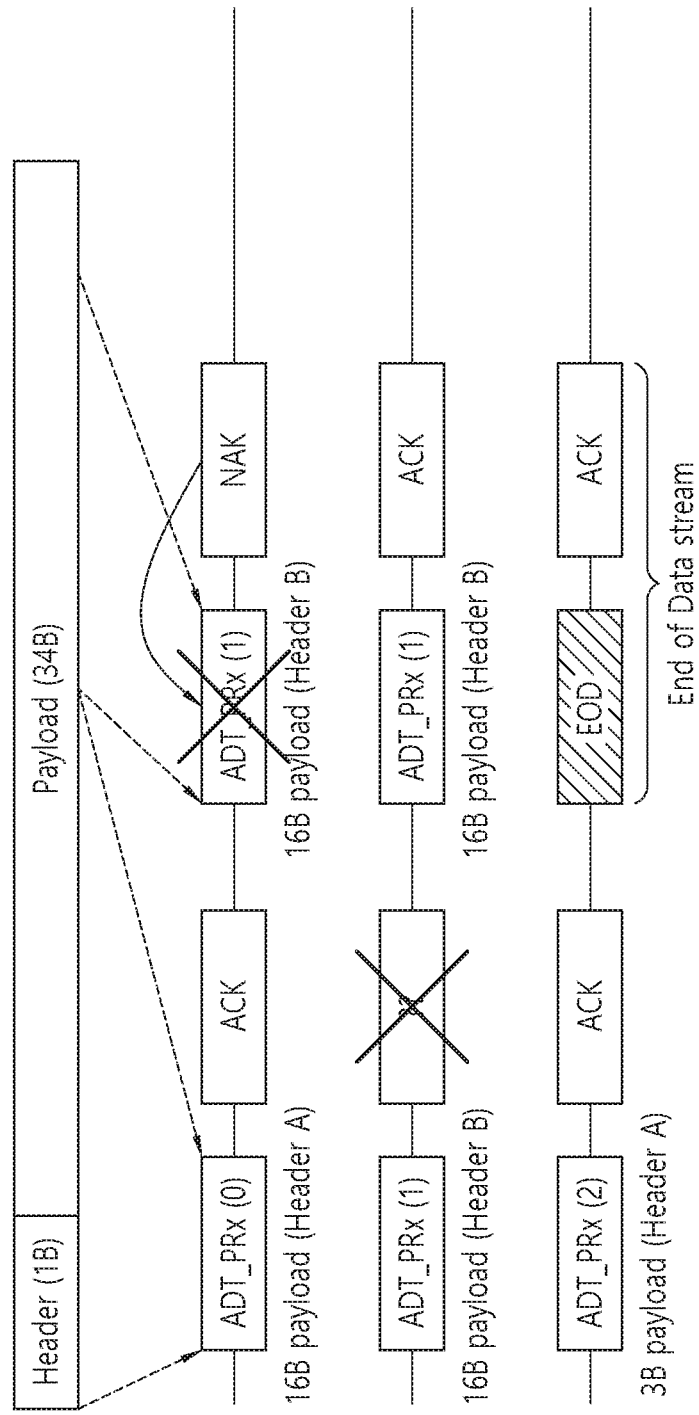
FIG. 58 illustrates an exchange sequence of an ADT data packet of an authentication request message according to another embodiment.

FIG. 58 illustrates an exchange sequence of an ADT data packet of an authentication request message according to another embodiment. The embodiment of FIG. 58 is different from the embodiment of FIG. 57 in that when the wireless power receiving device divides and transmits total 35 bytes of authentication message into 16 bytes of 0th ADT data packet (ADT_PRx (0)), 16 bytes of first ADT data packet (ADT_PRx (1)), and 3 bytes of second ADT data packet (ADT_PRx (2)), if the wireless power receiving device toggles (header A<->header B) a header of every ADT data packet according to the rules 3, but when the wireless power receiving device retransmits the ADT data packet, the wireless power receiving device performs simplified synchronization and indicates retransmission by equally using a previously used header (header B in FIG. 58).

Figure 59:
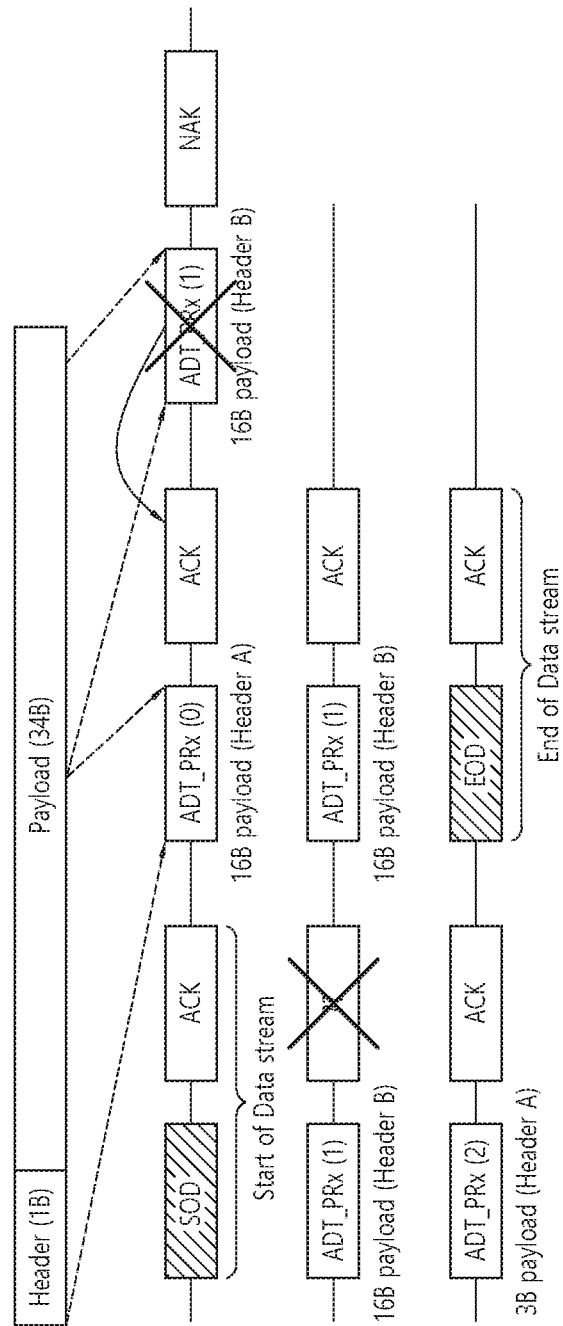
FIG. 59 illustrates an exchange sequence of an ADT data packet of an authentication request message according to another embodiment.

FIG. 59 illustrates an exchange sequence of an ADT data packet of an authentication request message according to another embodiment. The embodiment of FIG. 59 is the same as the embodiment of FIG. 58 in that when the wireless power receiving device divides and transmits total 35 bytes of authentication message into 16 bytes of 0th ADT data packet (ADT_PRx (0)), 16 bytes of first ADT data packet (ADT_PRx (1)), and 3 bytes of second ADT data packet (ADT_PRx (2)), the wireless power receiving device toggles (header A<->header B) a header of every ADT data packet according to the rule 3, but the embodiment of FIG. 59 is different from the embodiment of FIG. 58 in that the wireless power receiving device adds SOD when initiating transmission of the ADT data packet.

Figure 60:
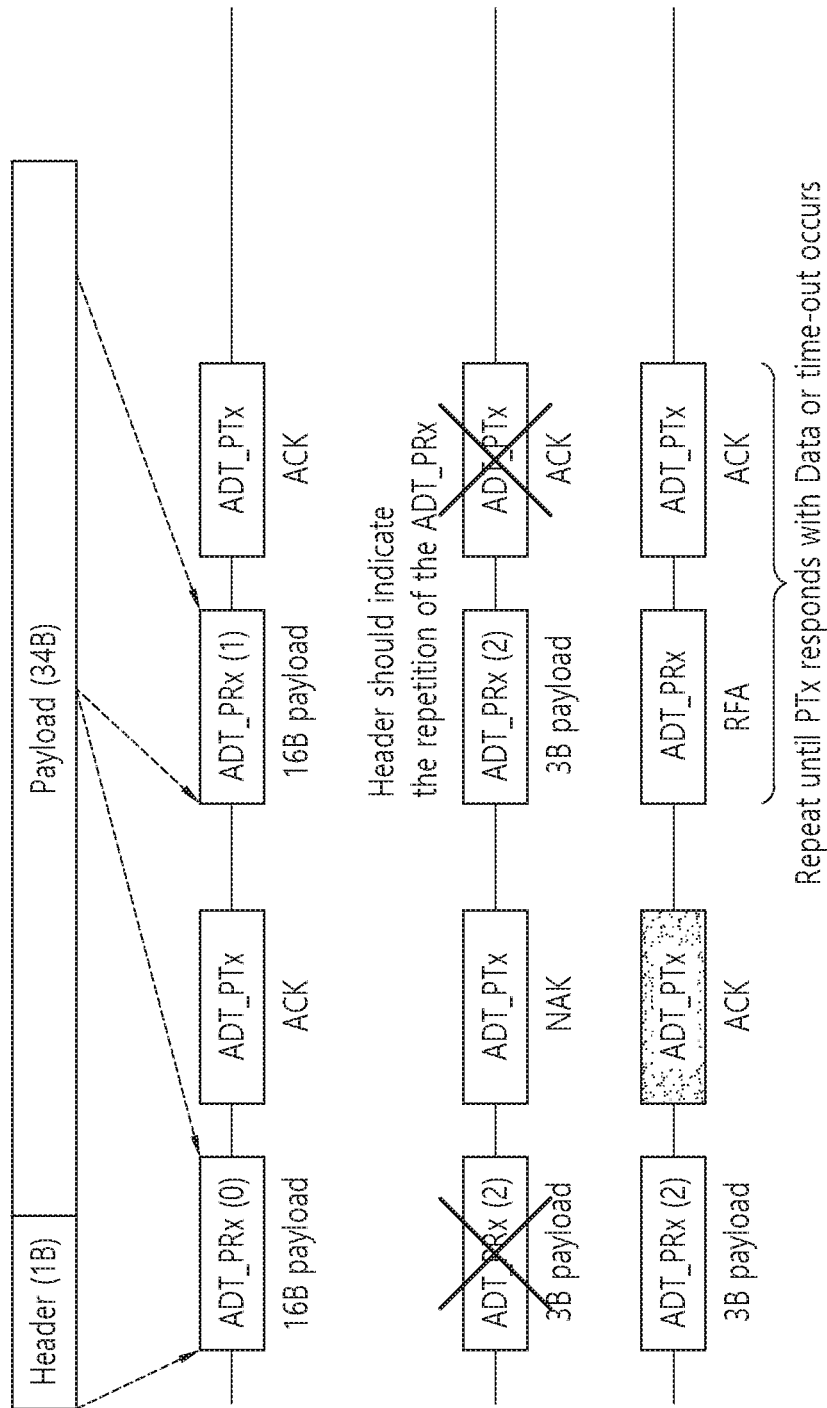
FIG. 60 illustrates an exchange sequence of an ADT data packet of an authentication request message according to another embodiment.

FIG. 60 illustrates an exchange sequence of an ADT data packet of an authentication request message according to another embodiment. The embodiment of FIG. 60 is different from the embodiment of FIG. 58 in that when the wireless power receiving device divides and transmits total 35 bytes of authentication message into 16 bytes of 0th ADT data packet (ADT_PRx (0)), 16 bytes of first ADT data packet (ADT_PRx (1)), and 3 bytes of second ADT data packet (ADT_PRx (2)), if transmission of the second ADT data packet (ADT_PRx (2)) is failed, the header should not be toggled, but in a state in which the header is toggled, retransmission of the second ADT data packet (ADT_PRx (2)) occurs. Here, a bit pattern response may be used instead of an ADT response packet of the wireless power transmitting device and thus an ADT exchange time may be reduced.

Figure 61:
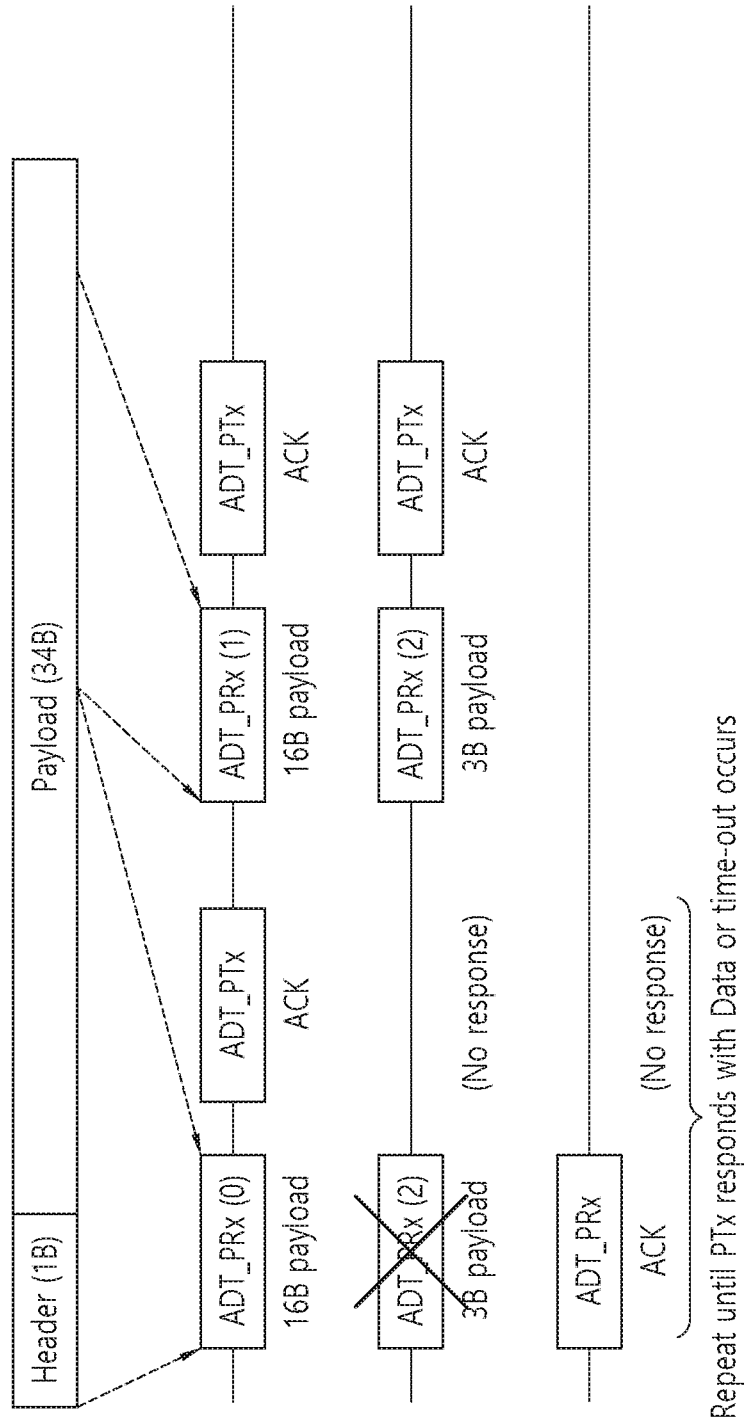
FIG. 61 illustrates an exchange sequence of an ADT data packet of an authentication request message according to another embodiment.

FIG. 61 illustrates an exchange sequence of an ADT data packet of an authentication request message according to another embodiment. The embodiment of FIG. 61 describes a scenario in which when the wireless power receiving device divides and transmits total 35 bytes of authentication message into 16 bytes of 0th ADT data packet (ADT_PRx (0)), 16 bytes of first ADT data packet (ADT_PRx (1)), and 3 bytes of second ADT data packet (ADT_PRx (2)), transmission of the 0th ADT data packet (ADT_PRx (0)) and the 16 bytes of first ADT data packet (ADT_PRx (1)) is successful, but there is no response in transmission of the second ADT data packet (ADT_PRx (2)) and thus transmission is failed.

Figure 62:
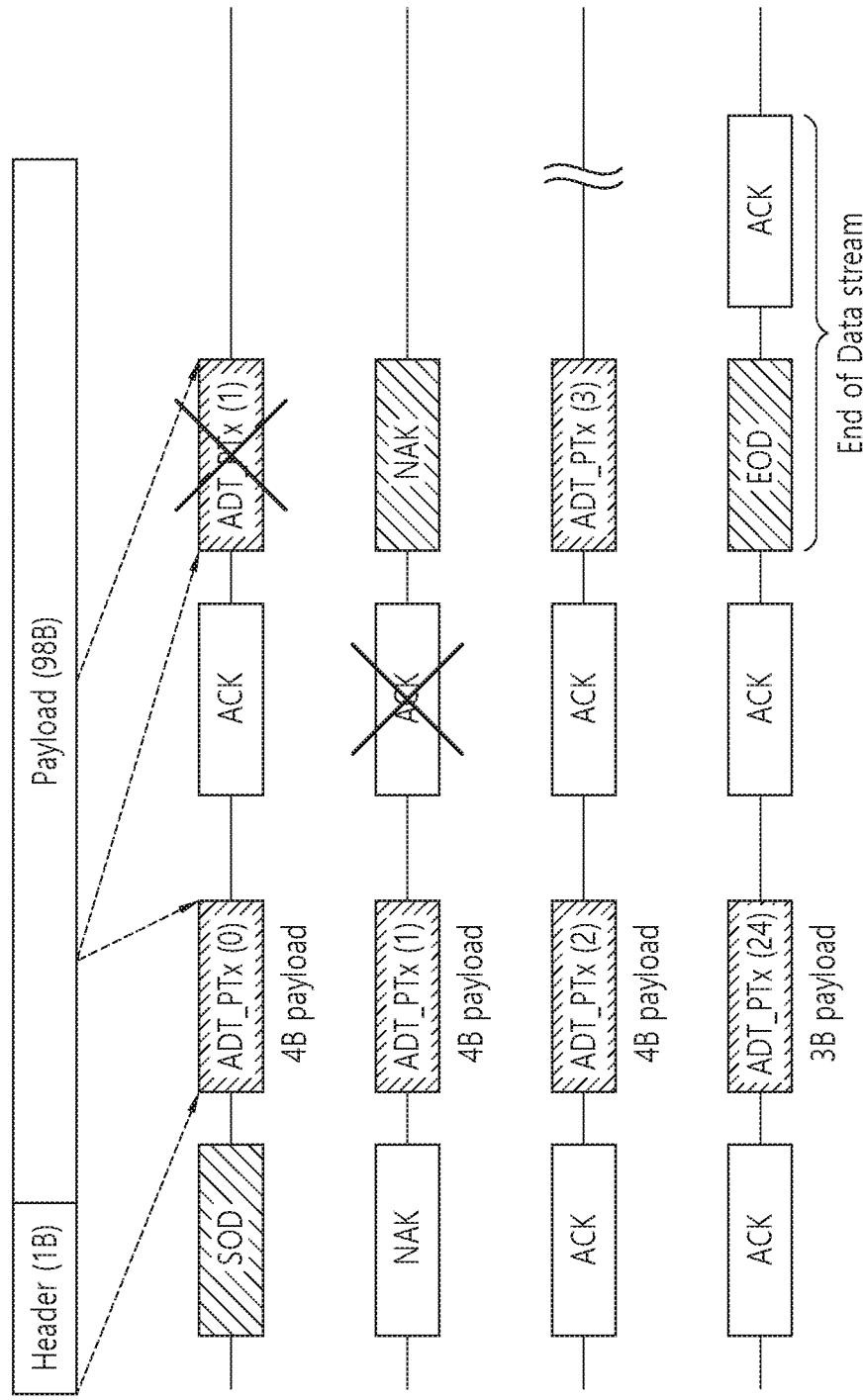
FIG. 62 illustrates an exchange sequence of an ADT data packet of an authentication response message according to an embodiment.

FIG. 62 illustrates an exchange sequence of an ADT data packet of an authentication request message according to an embodiment.

Referring to FIG. 62, bit stream (i.e. 99 bytes) for an authentication response message is prepared. The authentication response message may be, for example, a CHALLENGE_AUTH_RESPONSE message transmitted from the wireless power transmitting device to the wireless power receiving device.

When a communication protocol (i.e. FSK) of PTx→PRx direction is used, an ADT data packet may be transmitted up to 4 bytes and thus 99 bytes of authentication response message is divided and transmitted into 4 bytes of 0th ADT data packet (ADT_PTx (0)), 4 bytes of first ADT data packet (ADT_PTx (1)), . . . , 4 bytes of 23rd ADT data packet (ADT_PTx (23)), and 3 bytes of 24th ADT data packet (ADT_PTx (24)).

First, when the wireless power receiving device transmits SOD to the wireless power transmitting device for polling, after successfully transmitting the 0th ADT data packet (ADT_PTx (0)), the wireless power transmitting device receives ACK. However, the wireless power transmitting device fails in transmission of the first ADT data packet (ADT_PTx (1)) and receives NACK. Thereafter, the wireless power transmitting device retransmits the first data packet ADT (ADT_PTx (1)), but fails in reception of ACK thereof and transmits NACK. Therefore, when the wireless power receiving device responds to ACK, it is determined that retransmission of the first ADT data packet (ADT_PTx (1)) was successful and thus the wireless power transmitting device transmits the second ADT data packet (ADT_PTx (2)). After repeating an ADT packet transmission sequence, the wireless power transmitting device successfully transmits the last remaining 3 bytes of 24 ADT data packet (ADT_PTx (24)) and receives ACK. Therefore, the wireless power transmitting device successfully transmits EOD and receives ACK, thereby ending transmission of the authentication response message.

Figure 63:
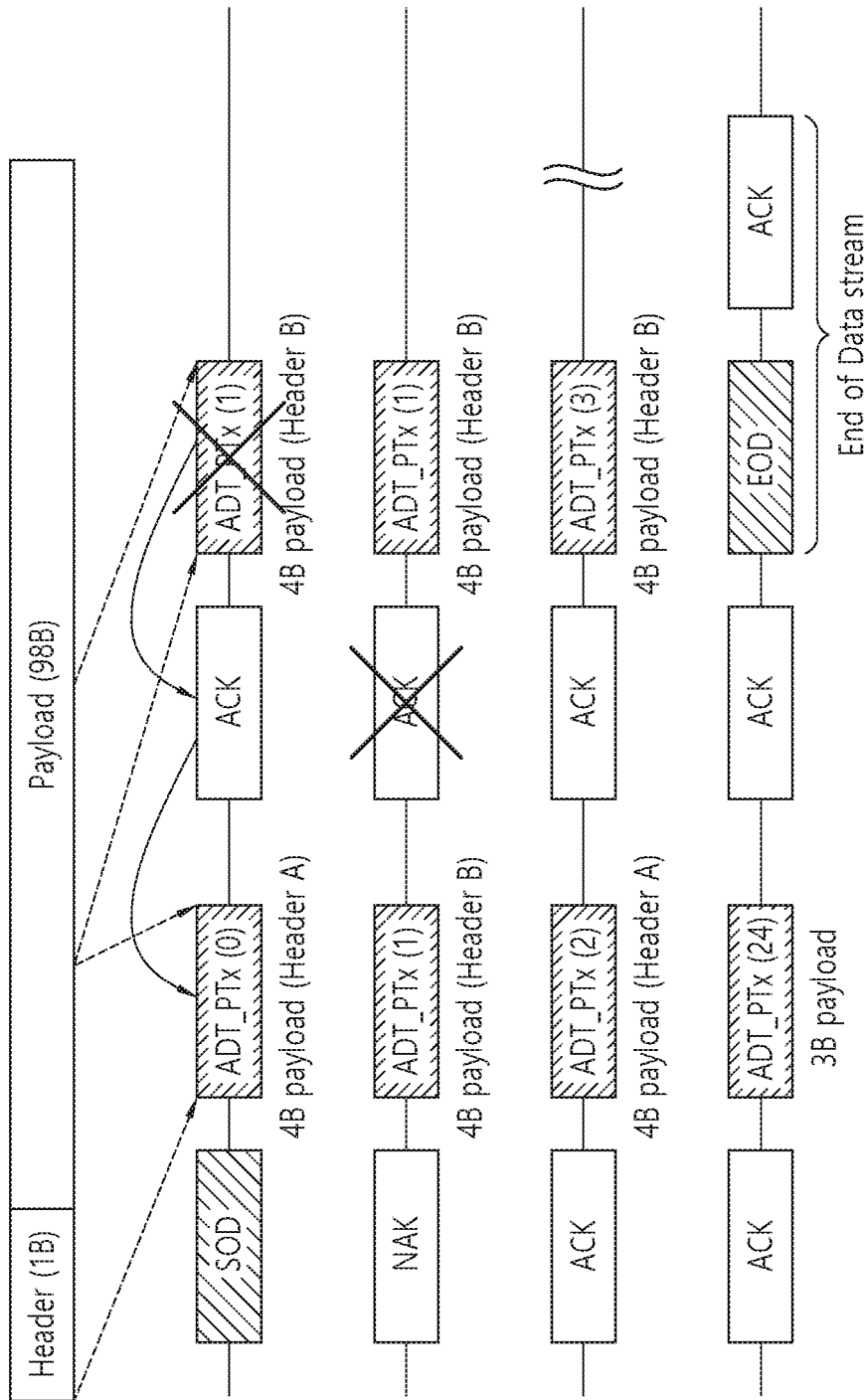
FIG. 63 illustrates an exchange sequence of an ADT data packet of an authentication response message according to another embodiment.

FIG. 63 illustrates an exchange sequence of an ADT data packet of an authentication request message according to another embodiment. The embodiment of FIG. 63 is different from the embodiment of FIG. 62 in that when the wireless power transmitting device divides and transmits total 99 bytes of authentication message into 4 bytes of 0th ADT data packet (ADT_PRx (0)), 4 bytes of first ADT data packet (ADT_PRx (1)), . . . , 4 bytes of 23rd ADT data packet (ADT_PTx (23)), and 3 bytes of 24 ADT data packet (ADT_PTx (24)), the wireless power transmitting device toggles (header A<->header B) a header of every ADT data packet according to the rule 3, but when the wireless power transmitting device performs retransmission of the first ADT data packet, the wireless power transmitting device equally uses a previously used header (header B in FIG. 62), thereby performing simplified synchronization and indicating retransmission.

Figure 64:
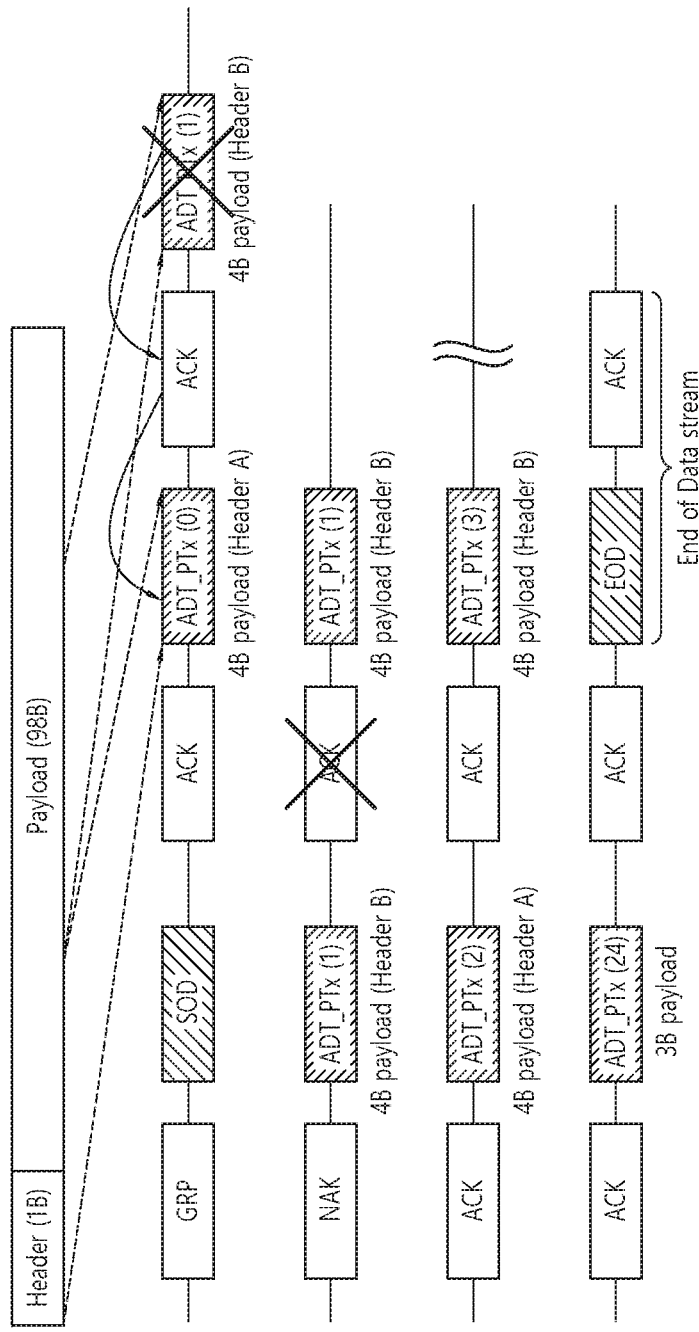
FIG. 64 illustrates an exchange sequence of an ADT data packet of an authentication response message according to another embodiment.

FIG. 64 illustrates an exchange sequence of an ADT data packet of an authentication request message according to another embodiment. The embodiment of FIG. 64 is the same as the embodiment of FIG. 63 in that when the wireless power transmitting device divides and transmits total 99 bytes of authentication message into 4 bytes of 0th ADT data packet (ADT_PRx (0)), 4 bytes of first ADT data packet (ADT_PRx (1)), . . . , 4 bytes of 23rd ADT data packet (ADT_PTx (23)), and 3 bytes of 24 ADT data packet (ADT_PTx (24)), the wireless power receiving device toggles (header A<->header B) a header of every ADT data packet according to the rule 3, but the embodiment of FIG. 64 is different from the embodiment of FIG. 63 in that the wireless power receiving device uses a GRP in polling the wireless power transmitting device and the wireless power transmitting device responds to SOD and thus transmission of the ADT data packet is started.

Figure 65:
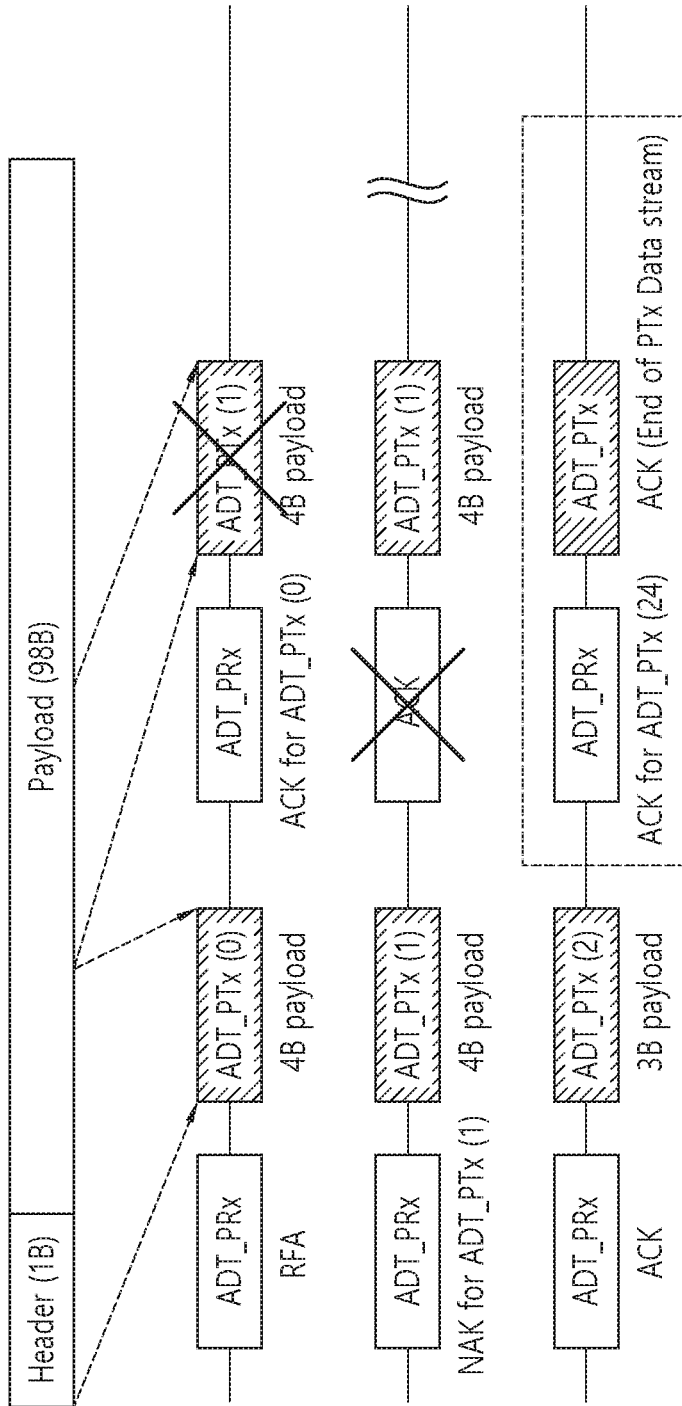
FIG. 65 illustrates an exchange sequence of an ADT data packet of an authentication response message according to another embodiment.

FIG. 65 illustrates an exchange sequence of an ADT data packet of the authentication response message according to another embodiment. The embodiment of FIG. 65 is different from the embodiment of FIG. 64 in that when the wireless power transmitting device divides and transmits total 99 bytes of authentication message into 4 bytes of 0th ADT data packet (ADT_PRx (0)), 4 bytes of first ADT data packet (ADT_PRx (1)), . . . , 4 bytes of 23rd ADT data packet (ADT_PTx (23)), and 3 bytes of 24 ADT data packet (ADT_PTx (24)), if the wireless power receiving device fails in transmission of the first ADT data packet (ADT_PRx (1)), the header should not be toggled, but in a state in which the header is toggled, retransmission of the first data packet ADT (ADT_PTx (1)) occurs.

Figure 66:
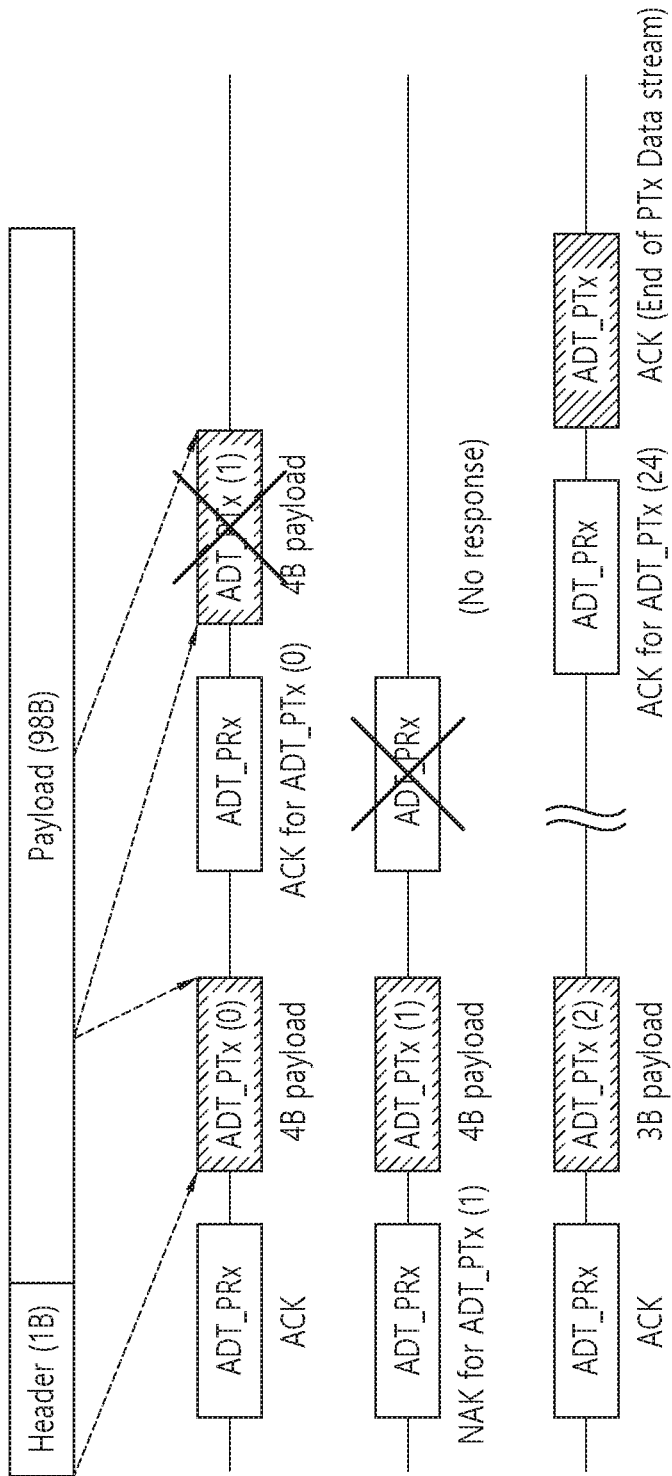
FIG. 66 illustrates an exchange sequence of an ADT data packet of an authentication response message according to another embodiment.

FIG. 66 illustrates an exchange sequence of an ADT data packet of the authentication response message according to another embodiment. The embodiment of FIG. 66 describes a scenario in which when the wireless power transmitting device divides and transmits total 99 bytes of authentication message into 4 bytes of 0th ADT data packet (ADT_PRx (0)), 4 bytes of first ADT data packet (ADT_PRx (1)), . . . , 4 bytes of 23rd ADT data packet (ADT_PTx (23)), and 3 bytes of 24 ADT data packet (ADT_PTx (24)), transmission of the 0th ADT data packet (ADT_PRx (0)) is successful, but there is no response to the first ADT data packet (ADT_PRx (1)) and thus transmission is failed.

2-2) Authentication of the Wireless Power Receiving Device by the Wireless Power Transmitting Device (Authentication of PRx by PTx)

As an ADT-based low level authentication sequence, authentication of the wireless power receiving device by the wireless power transmitting device (PTx=Initiator/PRx=Responder) will be described. When following the rule 1, the wireless power transmitting device is a slave and thus when it is determined that the wireless power transmitting device operates as an authentication initiator based on an AI bit in a capability packet of the wireless power transmitting device, the wireless power receiving device should provide ADT to the wireless power transmitting device.

Figure 67:
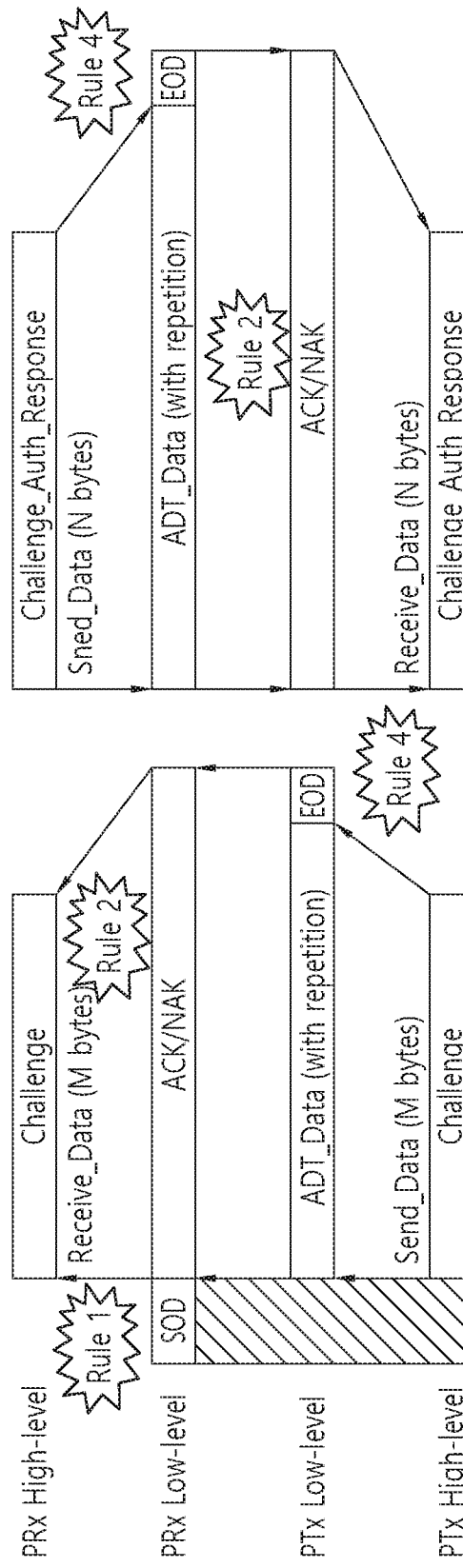
FIG. 67 illustrates a transmission sequence of a high level and a low level of a wireless power transmitting device and a wireless power receiving device upon exchanging an ADT data packet according to an embodiment.

FIG. 67 illustrates a transmission sequence of a high level and a low level of a wireless power transmitting device and the wireless power receiving device upon exchanging an ADT data packet according to an embodiment. Here, the wireless power transmitting device is an authentication initiator, and the wireless power receiving device is an authentication responder. ADT data packet exchange between the wireless power receiving device and transmitting device is performed according to the above (1) low level authentication sequence and (2) lower level data transaction protocol.

Referring to FIG. 67, the wireless power transmitting device is polled by SOD provided by the wireless power receiving device to generate M bytes of CHALLENGE message at a high level and to transfer the CHALLENGE message to a low level, and the low level loads the CHALLENGE message in the ADT data packet (or transport) and transmits the ADT data packet (or transport) to the wireless power receiving device. In this case, the wireless power receiving device may transmit repeatedly SOD until the wireless power transmitting device responds to the ADT data packet or until time-out occur.

ADT data packets of the CHALLENGE message according to the low level authentication sequence may be transmitted over several times, and while the ADT data packet is transmitted over several times according to the rule 2, the wireless power receiving device transmits ACK/NACK of an ADT data packet of each turn at a lower level to the wireless power transmitting device and transfers the ADT data packet to a higher level. When transmission of the CHALLENGE message (high level viewpoint) or the ADT data packet (lower level viewpoint) of the CHALLENGE message is complete through such a series of processes, the wireless power transmitting device adds EOD to the end of the ADT data packet on the CHALLENGE message according to the rule 4 to notify completion of transmission.

Because the wireless power receiving device operates as a master according to the rule 1, the wireless power receiving device generates N bytes of CHALLENGE message at a higher level without separate pooling for a CHALLENGE_AUTH_RESPONSE message to be transmitted and transfers the CHALLENGE message to the lower level, and the lower level loads the CHALLENGE message in the ADT data packet (or transport) and transmits the ADT data packet (or transport) to the wireless power transmitting device.

An ADT data packet of the CHALLENGE_AUTH_RESPONSE message according to the low level authentication sequence may be transmitted over several times, and while the ADT data packet is transmitted over several times according to the rule 2, the wireless power transmitting device transmits ACK/NACK of an ADT data packet of each turn at a lower level to the wireless power receiving device and transfers the ADT data packet to a higher level. When transmission of the CHALLENGE_AUTH_RESPONSE message (high level viewpoint) or the ADT data packet (lower level viewpoint) of the CHALLENGE_AUTH_RESPONSE message is complete through such a series of processes, the wireless power receiving device adds EOD to the end of the ADT data packet of the CHALLENGE_AUTH_RESPONSE message according to the rule 4 to notify completion of transmission.

Figure 68:
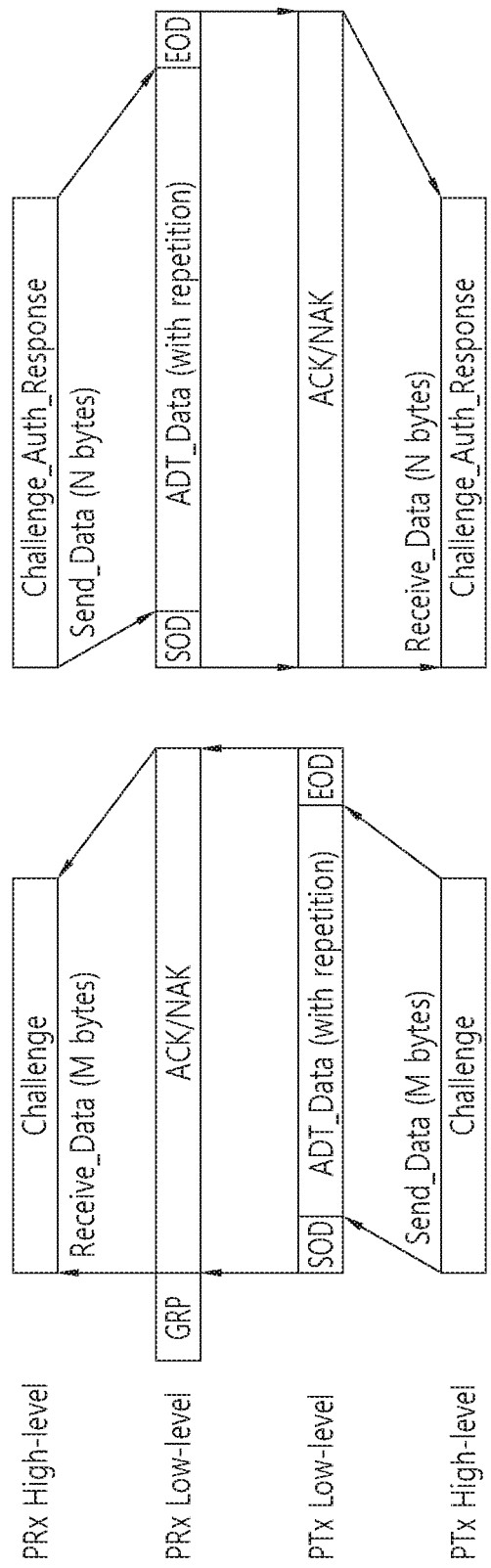
FIG. 68 illustrates a transmission sequence of a high level and a low level of a wireless power transmitting device and a wireless power receiving device upon exchanging an ADT data packet according to another embodiment.

FIG. 68 illustrates a transmission sequence of a high level and a low level of a wireless power transmitting device and the wireless power receiving device upon exchanging an ADT data packet according to another embodiment.

The embodiment of FIG. 68 strictly follows addition of SOD and EOD according to the rule 4 when transmitting every ADT data packet, but is different from the embodiment of FIG. 67 in that the wireless power receiving device uses a general request packet (GRP) instead of SOD for inquiry (or polling) according to the rule 1.

Figure 69:
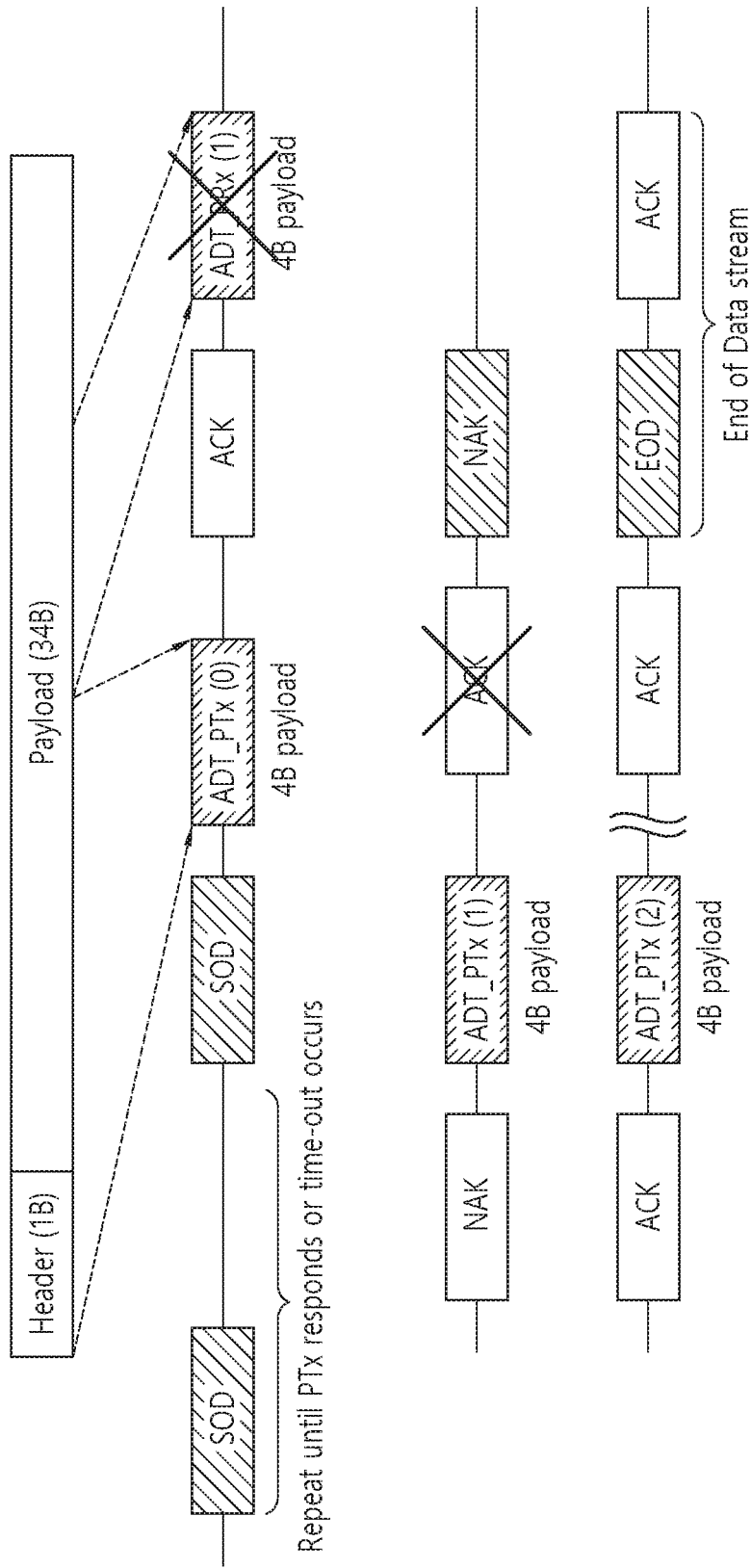
FIG. 69 illustrates an exchange sequence of an ADT data packet of an authentication request message according to an embodiment.

FIG. 69 illustrates an exchange sequence of an ADT data packet of an authentication request message according to an embodiment.

Referring to FIG. 69, when bit stream (i.e. 35 bytes) for an authentication request message is prepared, the wireless power transmitting device stands by to transmit an ADT data packet including a header (i.e. 1 byte) and a payload (i.e. 34 byte) in a lower level. Here, the authentication request message may be, for example, a CHALLENGE message.

In this case, the wireless power receiving device performs a polling operation for determining whether there are data to be transmitted from the wireless power transmitting device, and for this, the wireless power receiving device transmits repeatedly SOD until the wireless power transmitting device responds or until time-out occurs.

When the wireless power transmitting device receives the opportunity to transmit an authentication request message by the SOD, the wireless power transmitting device initiates transmission of an ADT data packet. When using a communication protocol (FSK) of PTx→PRx direction, the ADT data packet may be transmitted up to 4 bytes and thus 35 bytes of authentication message is divided and transmitted into 4 bytes of 0th ADT data packet (ADT_PRx (0)), 4 bytes of ADT first data packet (ADT_PTx (1)), . . . , 4 bytes of 7th ADT data packet (ADT_PTx (7)), and 3 bytes of 8th ADT data packet (ADT_PTx (8)).

First, after successfully transmitting the 0th ADT data packet (ADT_PTx (0)), the wireless power transmitting device receives ACK, but the wireless power transmitting device fails in transmission of the first ADT data packet (ADT_PTx (1)) and receives NACK. Thereafter, the wireless power transmitting device retransmits the first data packet ADT (ADT_PTx (1)), but the wireless power transmitting device fails in reception of an ACK response thereof and transmits NACK. When the wireless power receiving device responds to ACK, it is determined that retransmission of the first ADT data packet (ADT_PTx (1)) was successful and thus the wireless power transmitting device transmits a next second ADT data packet (ADT_PTx (2)). When transmission of all ADT data packets up to the last ADT data packet is completed, the wireless power transmitting device successfully transmits EOD and receives ACK, thereby ending transmission of the authentication request message.

Figure 70:
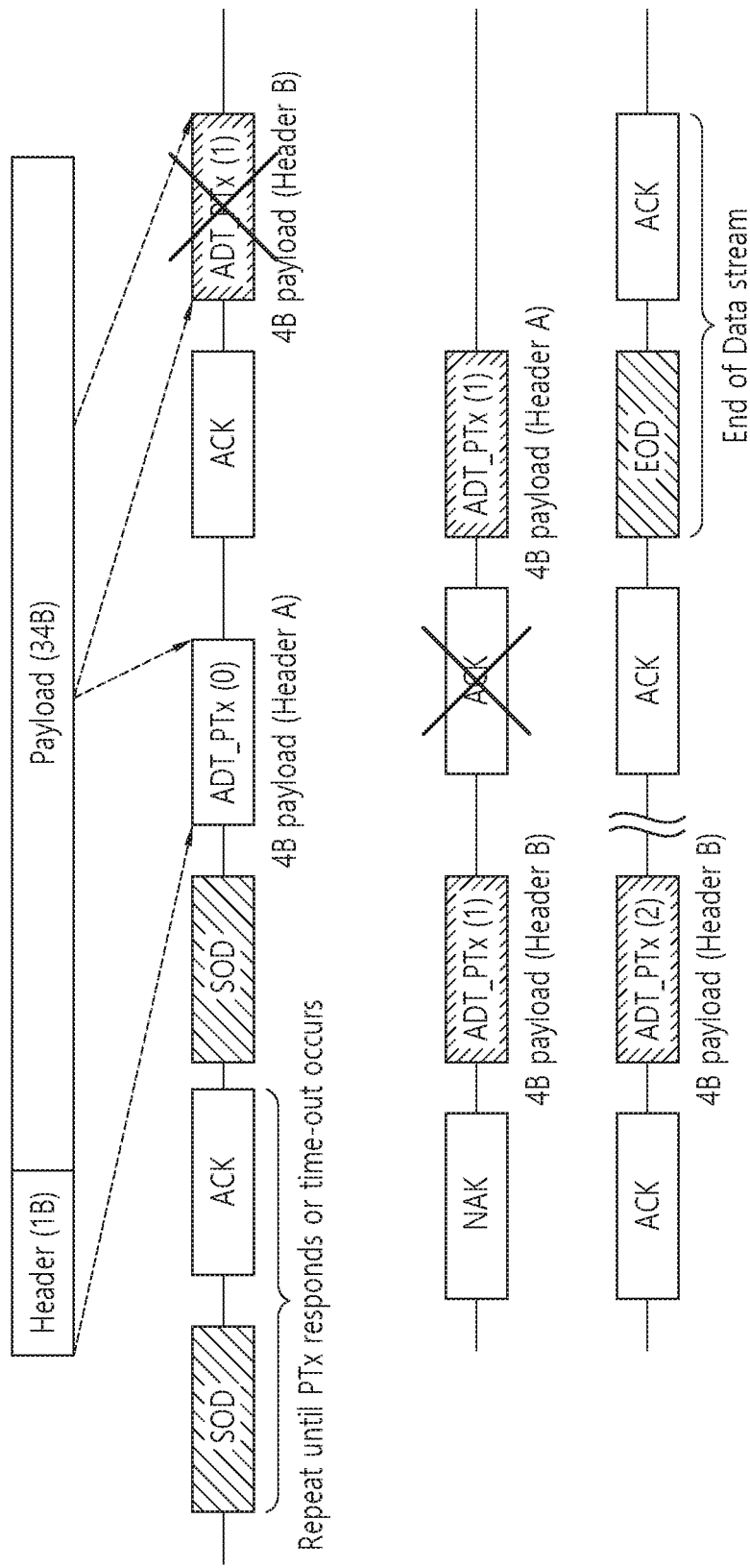
FIG. 70 illustrates an exchange sequence of an ADT data packet of an authentication request message according to another embodiment.

FIG. 70 illustrates an exchange sequence of an ADT data packet of an authentication request message according to another embodiment. The embodiment of FIG. 70 is different from the embodiment of FIG. 69 in that when the wireless power transmitting device divides and transmits total 35 bytes of authentication request message into 4 bytes of 0th ADT data packet (ADT_PTx (0)), 4 bytes of first ADT data packet (ADT_PTx (1)) . . . , 4 bytes of 7th ADT data packet (ADT_PTx (7)), and 3 bytes of 8th ADT data packet (ADT_PTx (8)), the wireless power transmitting device toggles (header A<->header B) a header of every ADT data packet according to the rule 3, but when the wireless power transmitting device performs retransmission of the ADT data packet, the wireless power transmitting device equally uses a previously used header (header B in FIG. 58), thereby performing simplified synchronization and indicating retransmission.

Figure 71:
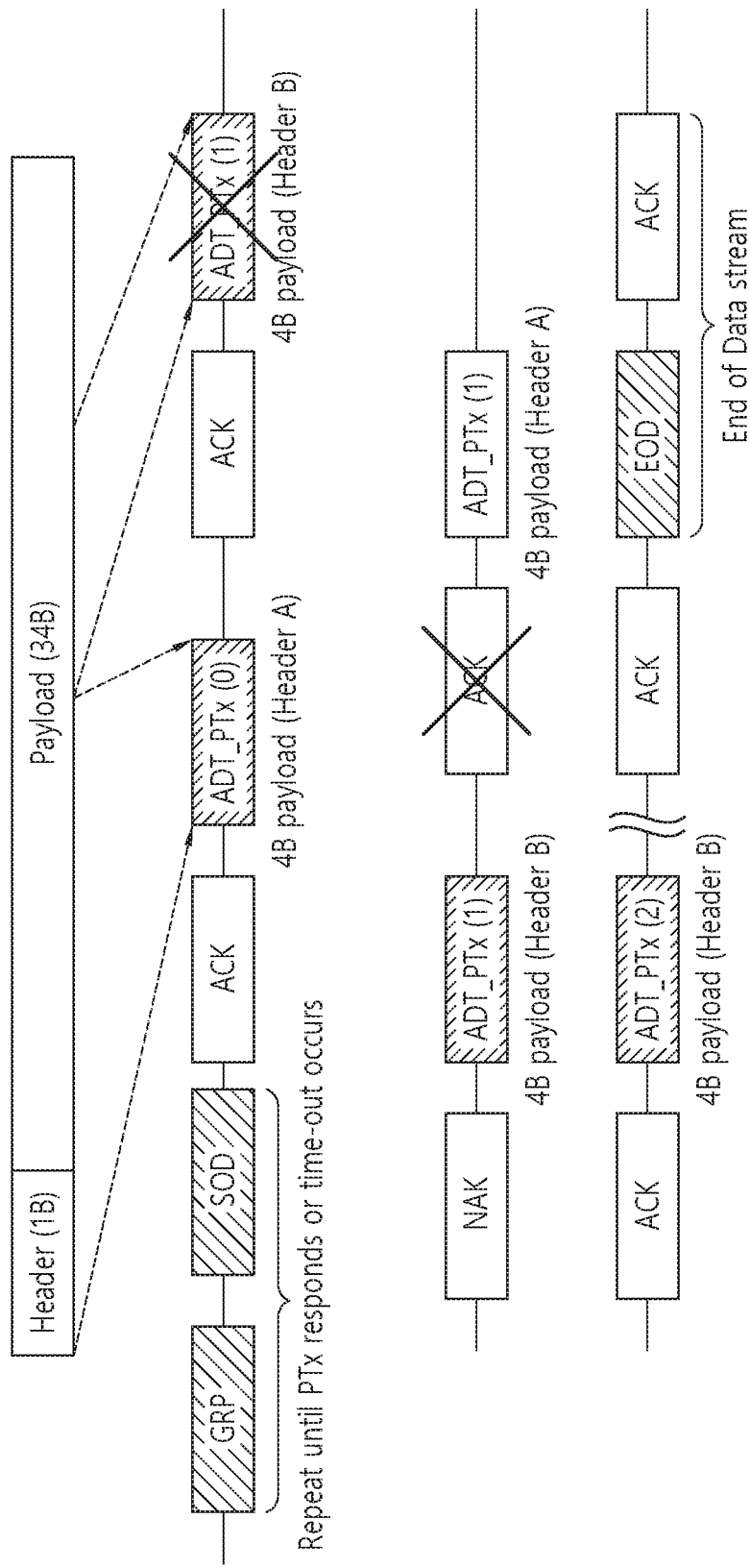
FIG. 71 illustrates an exchange sequence of an ADT data packet of an authentication request message according to another embodiment.

FIG. 71 illustrates an exchange sequence of an ADT data packet of an authentication request message according to another embodiment. The embodiment of FIG. 71 is the same as the embodiment of FIG. 70 in that when the wireless power transmitting device divides and transmits total 35 bytes of authentication request message into 4 bytes of 0th ADT data packet (ADT_PTx (0)), 4 bytes of first ADT data packet (ADT_PTx (1)), . . . , 4 bytes of 7th ADT data packet (ADT_PTx (7)), and 3 bytes of 8th ADT data packet (ADT_PTx (8)), the wireless power transmitting device toggles (header A<->header B) a header of every ADT packet data according to the rule 3, but the embodiment of FIG. 71 is different from the embodiment of FIG. 70 in that the wireless power receiving device uses a GRP in polling the wireless power transmitting device and the wireless power transmitting device responds to SOD and thus transmission of ADT packet data is started.

Figure 72:
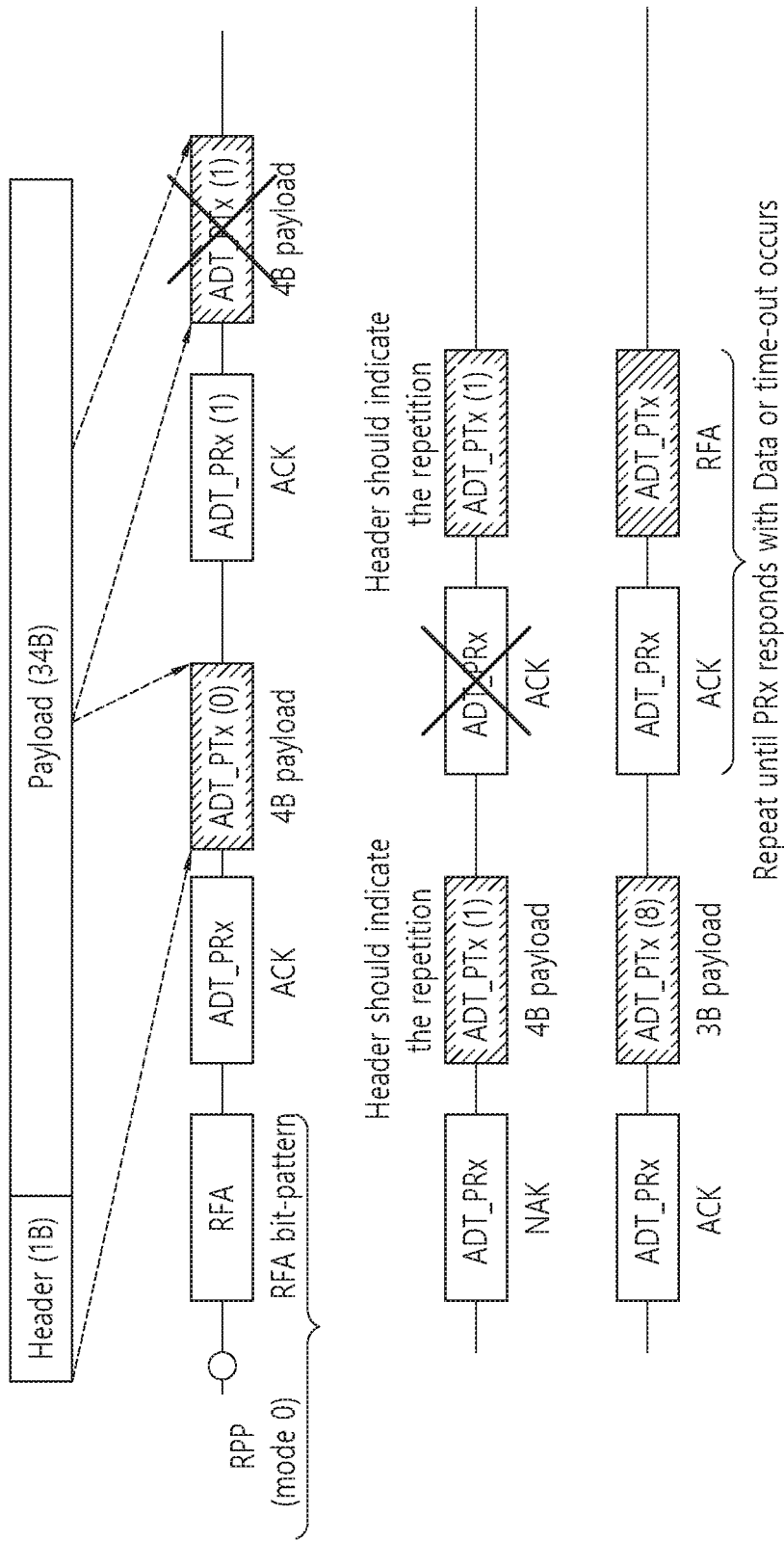
FIG. 72 illustrates an exchange sequence of an ADT data packet of an authentication request message according to another embodiment.

FIG. 72 illustrates an exchange sequence of an ADT data packet of an authentication request message according to another embodiment. The embodiment of FIG. 72 is different from the embodiment of FIG. 71 in that when the wireless power transmitting device divides and transmits total 35 bytes of authentication request message into 4 bytes of 0th ADT data packet (ADT_PTx (0)), 4 bytes of first ADT data packet (ADT_PTx (1)), . . . , 4 bytes of 7th ADT data packet (ADT_PTx (7)), and 3 bytes of 8th ADT data packet (ADT_PTx (8)), the wireless power transmitting device receives a RPP and transmits an RFA bit pattern in a mode 0 to obtain a transmission opportunity of the ADT data packet. Further, the embodiment of FIG. 72 is different from the embodiment of FIG. 71 in that when transmission of the first ADT data packet (ADT_PTx (1)) is failed, the header should not be toggled, but in a state in which the header is toggled, retransmission of the first ADT data packet (ADT_PTx (1)) occurs.

Figure 73:
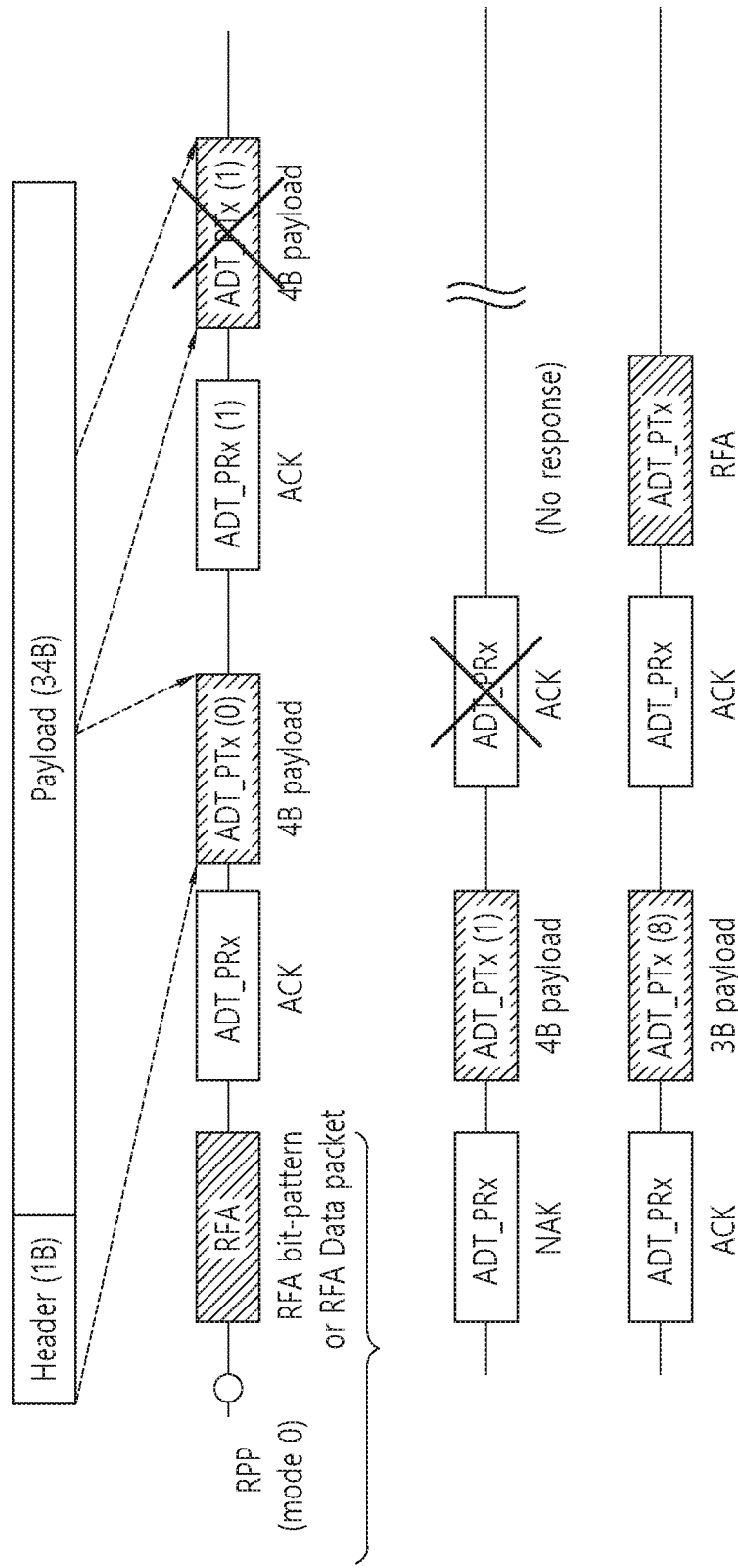
FIG. 73 illustrates an exchange sequence of an ADT data packet of an authentication request message according to another embodiment.

FIG. 73 illustrates an exchange sequence of an ADT data packet of an authentication request message according to another embodiment. The embodiment of FIG. 73 describes a scenario in which when the wireless power transmitting device divides and transmits total 35 bytes of authentication request message into 4 bytes of 0th ADT data packet (ADT_PTx (0)), 4 bytes of first ADT data packet (ADT_PTx (1)), . . . , 4 bytes of 7th ADT data packet (ADT_PTx (7)), and 3 bytes of 8th ADT data packet (ADT_PTx (8)), transmission of the 0th ADT data packet (ADT_PTx (0)) is successful, but in which there is no response to the first ADT data packet (ADT_PTx (1)) and thus transmission is failed.

Figure 74:
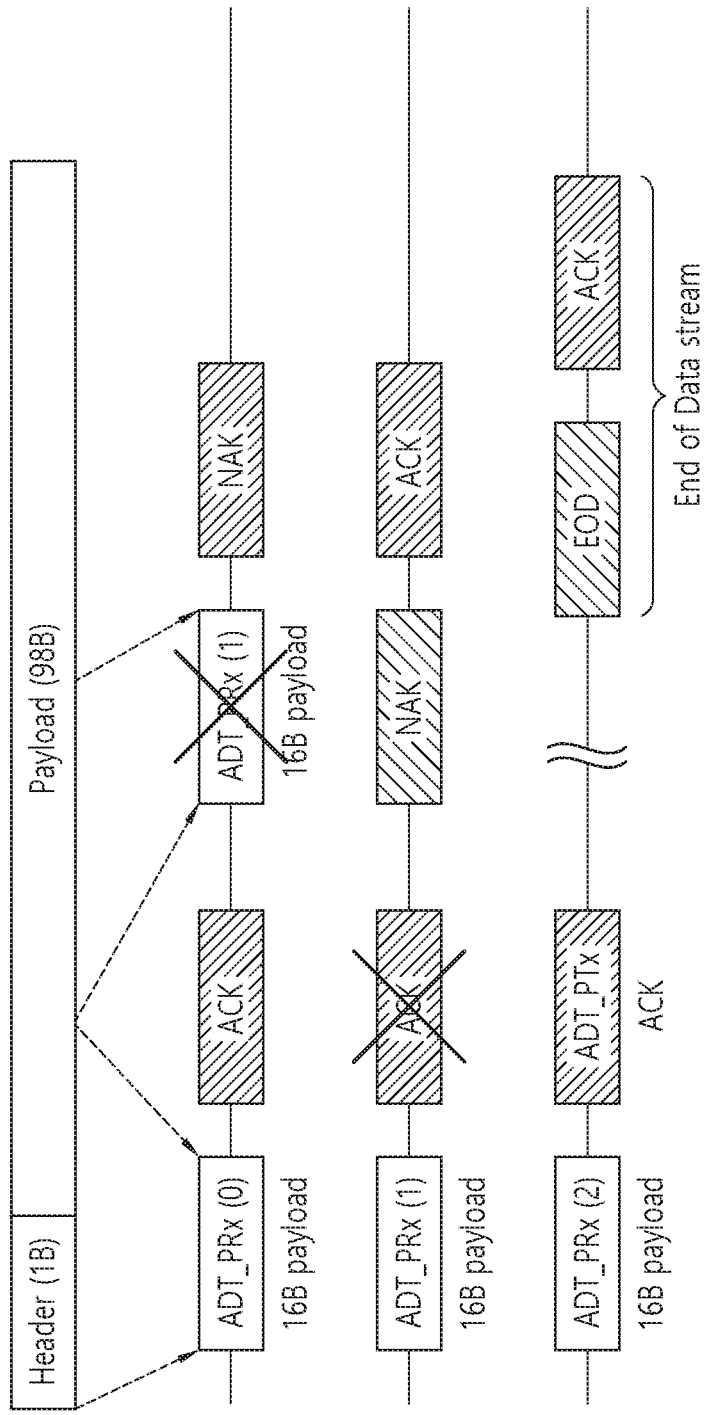
FIG. 74 illustrates an exchange sequence of an ADT data packet of an authentication response message according to an embodiment.

FIG. 74 illustrates an exchange sequence of an ADT data packet of an authentication request message according to an embodiment.

Referring to FIG. 74, when bit stream (i.e. 99 bytes) for an authentication response message is prepared, the wireless power receiving device transmits an ADT data packet including a header (i.e. 1 byte) and a payload (i.e. 34 bytes) at a low level. Here, the authentication response message may be, for example, a CHALLENGE_AUTH_RESPONSE message.

After successfully transmitting the 0th ADT data packet (ADT_PRx (0)), the wireless power receiving device receives ACK. However, the wireless power receiving device fails in transmission of the first ADT data packet (ADT_PRx (1)) and receives NACK. Thereafter, the wireless power receiving device retransmits the first data packet ADT (ADT_PRx (1)), but fails in receiving ACK thereof and transmits NACK. When the wireless power transmitting device responds to ACK, it is determined that retransmission of the first ADT data packet (ADT_PRx (1)) was successful and thus the wireless power receiving device transmits the second ADT data packet (ADT_PRx (2)). After repeating such an ADT packet transmission sequence, the wireless power transmitting device successfully transmits the last remaining ADT data packet (ADT_PRx) and then receives ACK. Therefore, the wireless power receiving device successfully transmits EOD and receives ACK, thereby ending transmission of the authentication response message.

Figure 75:
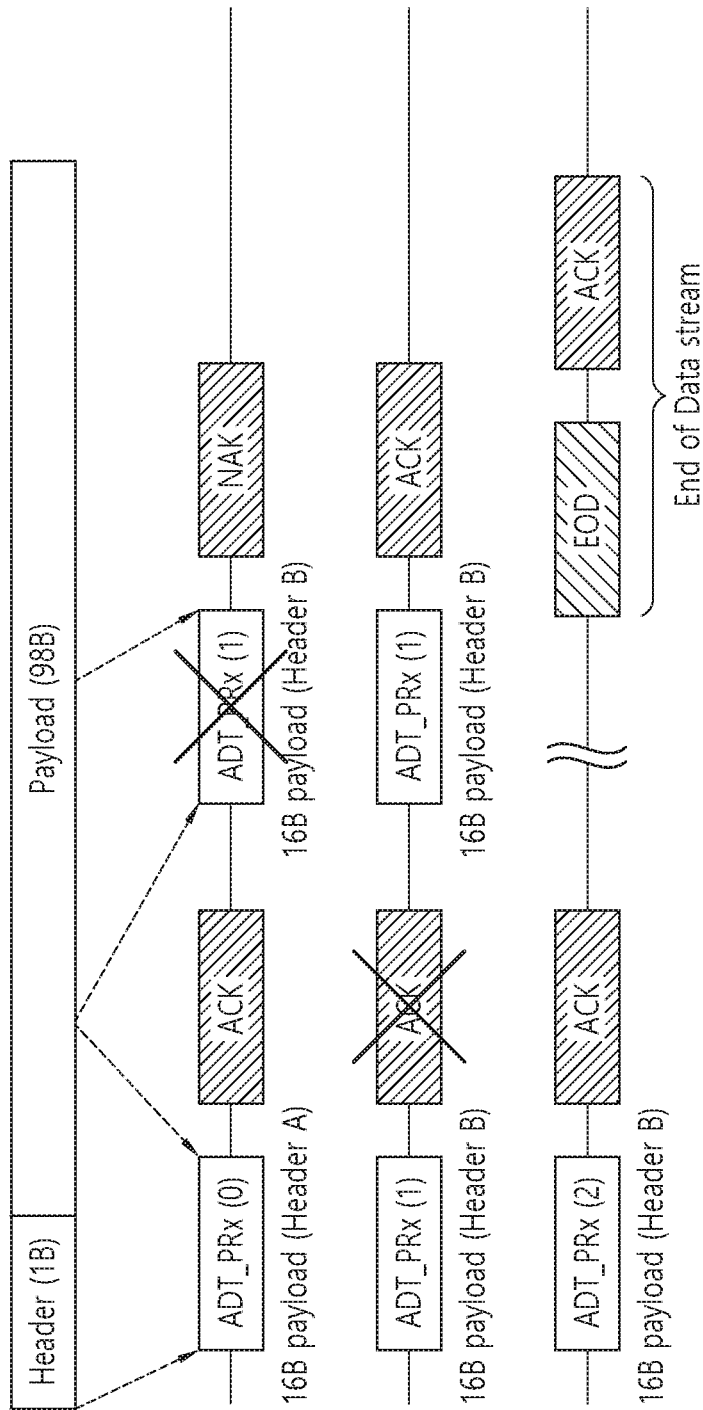
FIG. 75 illustrates an exchange sequence of an ADT data packet of an authentication response message according to another embodiment.

FIG. 75 illustrates an exchange sequence of an ADT data packet of an authentication request message according to another embodiment. The embodiment of FIG. 75 is different from the embodiment of FIG. 74 in that when the wireless power receiving device divides and transmits total 99 bytes of authentication response message into 16 bytes of 0th ADT data packet (ADT_PRx (0)), 16 bytes of first ADT data packet (ADT_PRx (1)), . . . , 16 bytes of 5th ADT data packet (ADT_PRx (5)), and 3 bytes of 6th ADT data packet (ADT_PRx (6)), the wireless power receiving device toggles (header A<->header B) a header of every ADT data packet according to rule 3, but when retransmitting the first ADT data packet, the wireless power receiving device equally uses a previously used header (header B in FIG. 75) and thus simplified synchronization is performed and retransmission is indicated.

Figure 76:
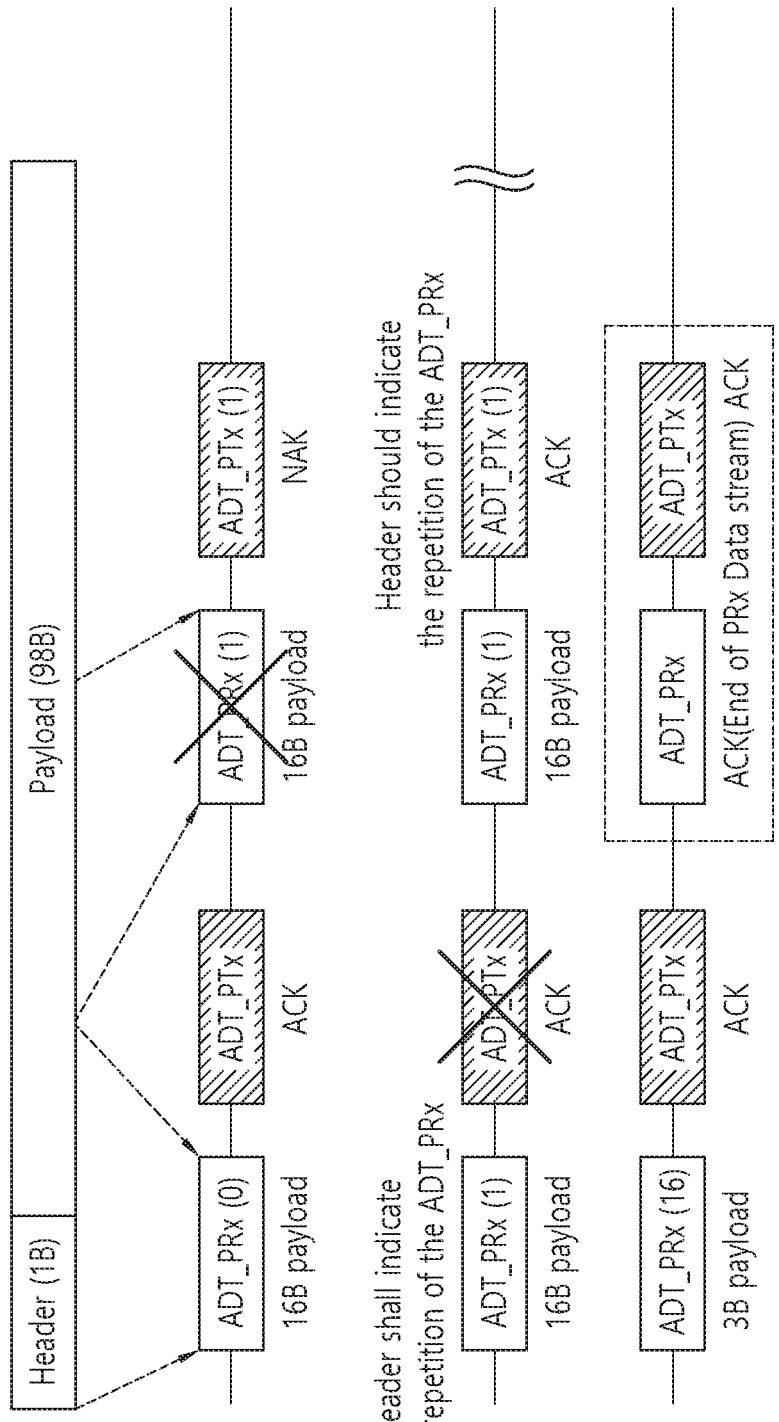
FIG. 76 illustrates an exchange sequence of an ADT data packet of an authentication response message according to another embodiment.

FIG. 76 illustrates an exchange sequence of an ADT data packet of an authentication request message according to another embodiment. The embodiment of FIG. 76 is different from the embodiment of FIG. 75 in that when the wireless power receiving device divides and transmits total 99 bytes of authentication response message into 16 bytes of 0th ADT data packet (ADT_PRx (0)), 16 bytes of first ADT data packet (ADT_PRx (1)), . . . , 16 bytes of 5th ADT data packet (ADT_PRx (5)), and 3 bytes of 6th ADT data packet (ADT_PRx (6)), if transmission of the first ADT data packet (ADT_PRx (1)) is failed, a header should not be toggled, but in a state in which the header is toggled, retransmission of the first data packet ADT (ADT_PRx (1)) occurs.

Figure 77:
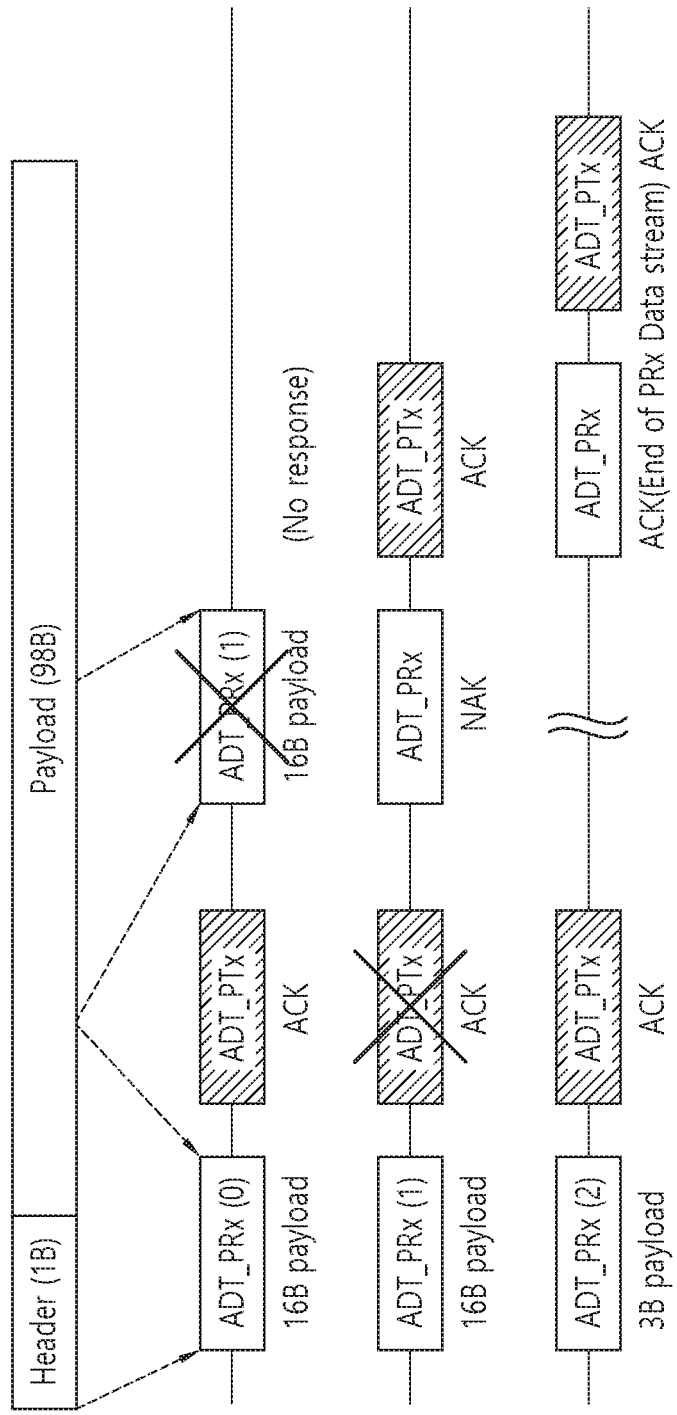
FIG. 77 illustrates an exchange sequence of an ADT data packet of an authentication response message according to another embodiment.

FIG. 77 illustrates an exchange sequence of an ADT data packet of an authentication request message according to another embodiment. The embodiment of FIG. 77 describes a scenario in which when the wireless power receiving device divides and transmits total 99 bytes of authentication response message into 16 bytes of 0th ADT data packet (ADT_PRx (0)), 16 bytes of first ADT data packet (ADT_PRx (1)), . . . , 16 bytes of fifth ADT data packet (ADT_PRx (5)), and 3 bytes of sixth ADT data packet (ADT_PRx (6)), transmission of the 0th ADT data packet (ADT_PRx (0)) is successful, but in which there is no response to transmission of the first ADT data packet (ADT_PRx (1)) and thus transmission is failed.

2-3) Concurrent Authentication Between the Wireless Power Transmitting Device and the Wireless Power Receiving Device (Concurrent Authentication Between PTx and PRx)

Both the wireless power transmitting device and the wireless power receiving device may simultaneously perform operations as an authentication initiator.

As an example, the wireless power transmitting device may transmit ADT including an authentication related packet instead of ADT including ACK for a packet received from the wireless power receiving device. In this case, by receiving ADT including the authentication related packet, it is regarded that the wireless power receiving device has implicitly received ACK and may perform the following operation. That is, when the wireless power transmitting device transmits ADT including data (authentication related packet), even if the wireless power receiving device receives data ADT instead of ACK, the wireless power receiving device may determine that ADT data transmitted immediately before to the wireless power transmitting device were successfully transmitted. However, when a communication error occurs in ADT data received immediately before from the wireless power receiving device, the wireless power transmitting device may transmit NACK. ADT including the authentication related packet may further include ACK.

As another example, the wireless power receiving device may transmit ADT including the authentication related packet instead of ADT including ACK for the packet received from the wireless power transmitting device. In this case, by receiving ADT including the authentication related packet, it is regarded that the wireless power transmitting device has implicitly received ACK and may perform the following operation. That is, when the wireless power receiving device transmits ADT including data (authentication related packet), even if the wireless power transmitting device receives data ADT instead of ACK, the wireless power receiving device may determine that ADT data transmitted immediately before to the wireless power transmitting device was successfully transmitted. ADT including the authentication related packet may further include ACK.

Figure 78:
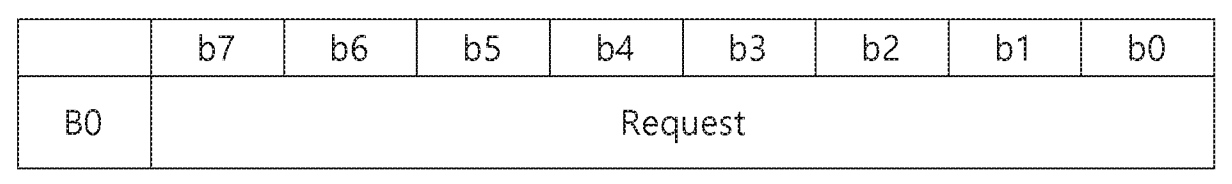

2-4) Communication Initiation Protocol by the Wireless Power Transmitting Device While the wireless power transmitting device operates as a slave based on the rule 1, by performing regular polling, the wireless power receiving device may provide an opportunity of communication (PTx initiated communication) initiated by the wireless power transmitting device. In this case, communication initiation of the wireless power transmitting device has high dependency in the wireless power receiving device. By regularly polling the wireless power transmitting device, the wireless power receiving device may determine whether the wireless power transmitting device has a packet to transmit. In this case, a GRP of FIG. 78 may be used. Referring to FIG. 78, for example, by setting a general request packet to "0xFF", "00", or "FF", the wireless power receiving device may perform polling. When the wireless power transmitting device receives the GRP set to "0xFF", "00", or "FF", the wireless power transmitting device is in a state that may transmit any type of packet to transmit.

As another method for further ensuring a communication opportunity initiated by the wireless power transmitting device, the wireless power transmitting device may transmit a request for communication (RFC) bit pattern in response to an RPP (except for a mode '100'b) of the wireless power receiving device. When the wireless power receiving device receives the RFC response, the wireless power receiving device polls the wireless power transmitting device using a GRP at timing appropriate thereto. The wireless power receiving device may not accurately know a time point in which a value of target power managed by the wireless power transmitting device changes and may relatively well guarantee a desired communication initiation time of the wireless power transmitting device through the RFC response of the wireless power transmitting device.

In particular, polling by the RFC response may be used for power management (PTx-initiated power management) initiated by the wireless power transmitting device. By power management initiated by the wireless power transmitting device, the wireless power transmitting device may change (increase or decrease) target power in consideration of current peripheral charging conditions.

Figure 79:
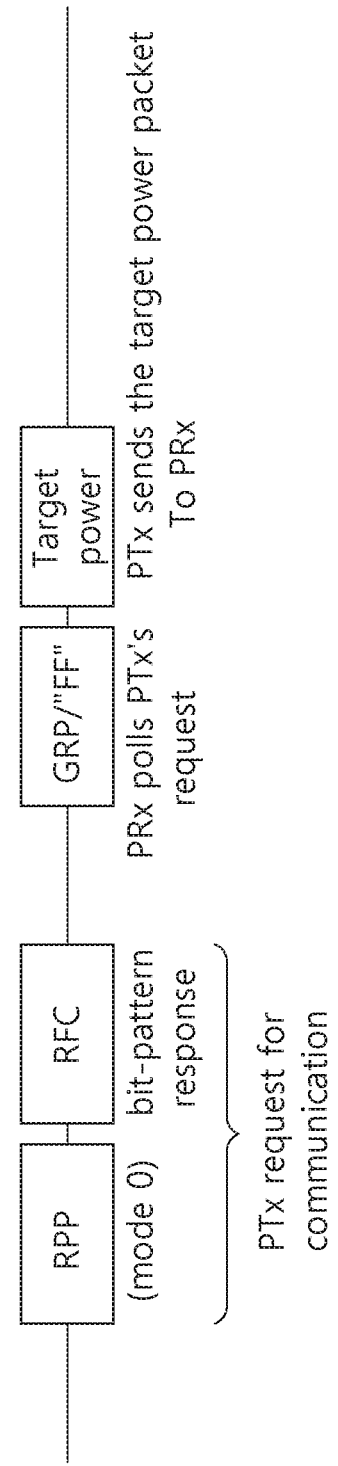
FIG. 79 illustrates a transmission sequence on power management initiated by a wireless power transmitting device according to an embodiment.

FIG. 79 illustrates a transmission sequence of power management initiated by a wireless power transmitting device according to an embodiment.

Referring to FIG. 79, the wireless power transmitting device transmits alert including an RFC response (bit pattern) to the wireless power receiving device in response to the RPP (mode 0) of the wireless power receiving device. The wireless power receiving device transmits a GRP in which a request value is set to "0xFF" to the wireless power transmitting device. Thereafter, the wireless power transmitting device transmits a target power packet to the wireless power receiving device. The wireless power receiving device may control an operation mode according to the changed target power.

6. Application Related to Certification Procedure

An authentication function may be set to On/Off by the user. For example, a smart phone may display activation/deactivation of an authentication function through an application to the user and receive an input of selection information about activation (ON) or deactivation (OFF) from the user to activate or deactivate the authentication function.

Wireless power transmitting and receiving devices may provide a very convenient user experience and interface (UX/UI). That is, a smart wireless charging service may be provided. The smart wireless charging service may be implemented based on UX/UI of the smart phone including the wireless power transmitting device. For such an application, an interface between a processor of the smart phone and the wireless charging receiver device allows two-way communication of "drop and play" between the wireless power transmitting device and receiving device.

As an example, the user may experience a smart wireless charging service at a hotel. When the user enters a hotel room and puts the smart phone on a wireless charger in the room, the wireless charger transmits wireless power to the smart phone, and the smart phone receives wireless power. In this process, the wireless charger transmits information on a smart wireless charging service to the smart phone. When the smart phone detects that the smart phone is positioned on the wireless charger, when the smart phone detects reception of wireless power, or when the smart phone receives information on a smart wireless charging service from the wireless charger, the smart phone enters a state that inquires opt-in of an additional feature to the user. For this purpose, the smart phone may display a message on a screen in a manner that includes or does not include an alarm sound. An example of the message may include phrases such as "Welcome to ###hotel. Select "Yes" to activate smart charging functions: Yes|No Thanks." The smart phone receives the user's input that selects Yes or No Thanks and performs a next procedure selected by the user. When Yes is selected, the smart phone transmits the information to the wireless charger. The smart phone and the wireless charger perform together a smart charging function.

The smart wireless charging service may also include reception of WiFi credentials auto-filled. For example, the wireless charger transmits WiFi credentials to the smart phone, and the smart phone executes an appropriate app to automatically input the WiFi credentials received from the wireless charger.

The smart wireless charging service may also include execution of a hotel application that provides a hotel promotion or acquisition of remote check-in/check-out and contact information.

As another example, the user may experience a smart wireless charging service in a vehicle. When the user boards a vehicle and puts the smart phone on the wireless charger, the wireless charger transmits wireless power to the smart phone, and the smart phone receives wireless power. In this process, the wireless charger transmits information on the smart wireless charging service to the smart phone. When the smart phone detects that the smart phone is positioned on the wireless charger, detects reception of wireless power, or receives information on the smart wireless charging service from the wireless charger, the smart phone enters into a state that inquires identity to the user.

In this state, the smart phone is automatically connected to the vehicle through WiFi and/or Bluetooth. The smart phone may display a message on the screen in a manner that includes or does not include an alarm sound. An example of the message may include phrases such as "Welcome to user car. Select "Yes" to synch device with in-car controls: Yes|No Thanks." The smart phone receives the user's input that selects Yes or No Thanks and performs a next procedure selected by the user. When Yes is selected, the smart phone transmits the information to the wireless charger. The smart phone and the wireless charger may drive application/display software within the vehicle to perform the software together with a smart control function within the vehicle. Users may enjoy favorite music and determine a regular map location. Application/display software within the vehicle may include a capability that provides synchronization access for passers.

As another example, the user may experience smart wireless charging in a home. When the user enters into the room and puts the smart phone on the wireless charger in the room, the wireless charger transmits wireless power to the smart phone, and the smart phone receives wireless power. In this process, the wireless charger transmits information on the smart wireless charging service to the smart phone. When the smart phone detects that the smart phone is positioned on the wireless charger, detects reception of wireless power, or receives information on the smart wireless charging service from the wireless charger, the smart phone enters to a state that inquires opt-in to an additional feature to the user. For this purpose, the smart phone may display a message on a screen in a manner that includes or does not include an alarm sound. An example of the message may include phrases such as "Hi xxx, Would you like to activate night mode and secure the building?: Yes|No Thanks." The smart phone receives the user's input that selects Yes or No Thanks and performs a next procedure selected by the user. When Yes is selected, the smart phone transmits the information to the wireless charger. The smart phone and the wireless charger may recognize at least a user pattern and may recommend to lock doors and windows or to turn off lights or to set an alarm to the user.

In a wireless power transmitting method and device or receiving device and method according to an embodiment of the present invention, because all components or steps are not essential, the wireless power transmitting device and method or receiving device and method may be performed by including some or all of the above-described components or steps. Further, embodiments of the wireless power transmitting device and method or receiving device and method may be performed in combination. Further, it is not necessary that the above components or steps should be performed in the described order, and a step described later may be performed prior to a step described earlier.

The foregoing description is merely illustrative of the technical idea of the present invention, and various changes and modifications may be made by those skilled in the art without departing from the essential characteristics of the present invention. Therefore, the foregoing embodiments of the present invention can be implemented separately or in combination.

Therefore, the embodiments disclosed in the present invention are intended to illustrate rather than to limit the scope of the present invention, and the scope of the technical idea of the present invention is not limited by these embodiments. The scope of protection of the present invention should be construed according to the following claims, and all technical ideas within the scope of equivalents to claims should be construed as falling within the scope of the present invention.

Essential elements, for example, a format of a wireless charging certificate, indication information on authentication function support, timing between an authentication related procedure and a wireless charging phase, an authentication procedure and an authentication message, and a protocol of a lower level supporting the authentication procedure, for mutual authentication between a wireless power transmitting device and receiving device are clearly provided by the present invention and thus even during wireless charging of high power, stability and reliability can be ensured.

What is claimed is:

1. A wireless power transmitter comprising:
a power converter configured to transfer a wireless power to a wireless power receiver; and
a communicator/controller configured to control the wireless power,
wherein the communicator/controller is further configured to:
transmit, to the wireless power receiver, a bit pattern requesting permission to communicate;
receive, from the wireless power receiver, a response packet granting the permission in response to the bit pattern; and
transmit, to the wireless power receiver in a power transfer phase in which the wireless power is transferred, an auxiliary data transport (ADT) data packet after receiving the response packet, and
wherein a header of the ADT data packet is set to a value informing a retransmission of a previous ADT data packet, based on receiving a not acknowledge (NAK) in response to the previous ADT data packet from the wireless power receiver.

2. The wireless power transmitter of claim 1, wherein the bit pattern includes 8 bits.

3. The wireless power transmitter of claim 2, wherein the bit pattern includes four '0's and four '1's.

4. The wireless power transmitter of claim 1, wherein the ADT data packet is a packet to which a bit stream for authentication is divided.

5. A method of transmitting a bit pattern, the method performed by a wireless power transmitter and comprising:
transmitting, to a wireless power receiver, the bit pattern requesting permission to communicate;
receiving, from the wireless power receiver, a response packet granting the permission in response to the bit pattern; and
transmitting, to the wireless power receiver in a power transfer phase in which a wireless power is transferred, an auxiliary data transport (ADT) data packet after receiving the response packet,
wherein a header of the ADT data packet is set to a value informing a retransmission of a previous ADT data packet, based on receiving a not acknowledge (NAK) in response to the previous ADT data packet from the wireless power receiver.

6. The method of claim 5, wherein the bit pattern includes 8 bits.

7. The method of claim 6, wherein the bit pattern includes four '0's and four '1's.

8. The method of claim 5, wherein the ADT data packet is a packet to which a bit stream for authentication is divided.

9. A wireless power receiver comprising:
a power pickup circuit configured to receive a wireless power from a wireless power transmitter; and
a communicator/controller configured to control the wireless power,
wherein the communicator/controller is further configured to:
receive, from the wireless power transmitter, a bit pattern requesting permission to communicate;
transmit, to the wireless power transmitter, a response packet granting the permission in response to the bit pattern; and
receive, from the wireless power transmitter in a power transfer phase in which the wireless power is transferred, an auxiliary data transport (ADT) data packet after transmitting the response packet, and
wherein a header of the ADT data packet is set to a value informing a retransmission of a previous ADT data packet, based on transmitting a not acknowledge (NAK) in response to the previous ADT data packet to the wireless power transmitter.

10. The wireless power receiver of claim 9, wherein the bit pattern includes 8 bits.

11. The wireless power receiver of claim 10, wherein the bit pattern includes four '0's and four '1's.

12. The wireless power receiver of claim 9, wherein the ADT data packet is a packet to which a bit stream for authentication is divided.

* * * * *